United States Patent
Collins et al.

(10) Patent No.: US 11,426,679 B2
(45) Date of Patent: Aug. 30, 2022

(54) CONTINUOUS SAMPLE PURIFICATION SYSTEMS AND METHODS

(71) Applicant: LIFE TECHNOLOGIES CORPORATION, Carlsbad, CA (US)

(72) Inventors: Scott P. Collins, Ogden, UT (US); Federico Carlos Rodriguez Peralta, Logan, UT (US); Nephi D. Jones, Newton, UT (US); Christopher D. Brau, Logan, UT (US)

(73) Assignee: Life Technologies Corporation, Carlsbad, CA (US)

( * ) Notice: Subject to any disclaimer, the term of this patent is extended or adjusted under 35 U.S.C. 154(b) by 686 days.

(21) Appl. No.: 16/067,509

(22) PCT Filed: Dec. 21, 2016

(86) PCT No.: PCT/US2016/068072
§ 371 (c)(1),
(2) Date: Jun. 29, 2018

(87) PCT Pub. No.: WO2017/116911
PCT Pub. Date: Jul. 6, 2017

(65) Prior Publication Data
US 2019/0001237 A1    Jan. 3, 2019

Related U.S. Application Data

(60) Provisional application No. 62/398,172, filed on Sep. 22, 2016, provisional application No. 62/272,589, filed on Dec. 29, 2015.

(51) Int. Cl.
*B01D 11/04*    (2006.01)
*B01D 15/36*    (2006.01)
(Continued)

(52) U.S. Cl.
CPC .......... *B01D 11/0465* (2013.01); *B01D 11/02* (2013.01); *B01D 11/0284* (2013.01);
(Continued)

(58) Field of Classification Search
None
See application file for complete search history.

(56) References Cited

U.S. PATENT DOCUMENTS 3,674,657 A    7/1972    Ezra
5,628,906 A    5/1997    Reuel et al.

FOREIGN PATENT DOCUMENTS

EP    0 245 985 A2    11/1987
WO    2010/062244 A1    6/2010

OTHER PUBLICATIONS

International Search Report and Written Opinion dated Jun. 7, 2017, issued in PCT Application No. PCT/US2016/068072, filed Dec. 21, 2016.

*Primary Examiner* — Kara M Peo
(74) *Attorney, Agent, or Firm* — Workman Nydegger

(57) ABSTRACT

Sample purification systems include a particle extraction assembly having a mixing compartment and a settling compartment. A biological sample is mixed with two liquid phases formulated to effectuate transfer of a biological molecule into a first phase and particulate contaminants into a second phase. The first phase includes a solubilizing salt, the second phase includes an organic molecule, and the mixture can have little or no monoatomic salt or dextran. The molecule-containing first phase can be optionally concentrated without also concentrating the particulate contaminants and introduced into a multi-stage liquid-liquid extractor, by which the biological molecule or molecular contaminants are extracted from the first phase into a third phase, thereby purifying the molecule away from contaminants. The extracted sample can be further purified through (Continued)

a series of processing steps. The system can be run in continuously mode to maintain sterility of the sample.

10 Claims, 9 Drawing Sheets

(51) Int. Cl.
  *B01D 15/38* (2006.01)
  *B01D 11/02* (2006.01)
(52) U.S. Cl.
  CPC ...... *B01D 11/0446* (2013.01); *B01D 11/0457* (2013.01); *B01D 11/0488* (2013.01); *B01D 11/0492* (2013.01); *B01D 15/362* (2013.01); *B01D 15/363* (2013.01); *B01D 15/3847* (2013.01)

CONTINUOUS SAMPLE PURIFICATION SYSTEMS AND METHODS

BACKGROUND

1. Technical Field

The present disclosure relates generally to sample purification and sample purification systems, and more specifically, to continuous (flow) purification of a biological sample and to systems and methods implementing the same.

2. Related Technology

Bioreactors are used in the growth of biological cells such as microorganisms or cell culture cells. In certain bioreactor systems, the cells themselves may be a product (or molecule) of interest. In alternative systems, the cells produce a molecule of interest that must be purified away from contaminants, such as the cells or cellular material, cell culture medium, and other components. Commercial production of biological molecules must meet industry standards of purity in a cost-effective manner. Reduction in the price of purified product is dependent upon reduction in the expense of purification. Accordingly, advances in the purification of biological molecules aim to increase the yield and purity of the product while decreasing production and purification costs.

Existing systems for isolating a molecule of interest employ a multi-stage protocol. In a first stage, a cell culture is used to produce the biological molecule. The cells can be cultured in small batches or larger bioreactors. In a second stage, the cell culture is processed to purify the molecule of interest away from contaminating components. For instance, in a first step of this purification process (or second stage), the cell culture can be centrifuged to remove cells and large particles or aggregates of cellular or culture materials. In a second step, smaller particles are removed by filtering the centrifuged culture.

Centrifugation can be expensive and time-consuming and can increase the concentration of the smaller particles in the centrifuged culture. For instance, continuous culture systems may require a continuous centrifuge, which can be prohibitively expensive to obtain, operate, and maintain. In addition, the shear forces in centrifugation tend to break up the cells and other culture components into smaller particles, which can also be difficult and expensive to purify.

Without being bound to any theory, attempts to eliminate the centrifugation step by filtering the un-centrifuged cultures, such as by depth filtration, have also been met with challenges. For instance, the larger particles and cells tend to clog and foul the filters, which must then be replaced or cleaned before processing can continue. Alternatively, a filtration system which mitigates or reduces fouling, such as an alternating tangential flow filtration (TFF) system, may be used, but such systems may still foul, even if at a slower rate. Furthermore, such systems are scale limited and cannot process extremely dense particulate loads. For example, an alternating tangential flow filtration system may not be amenable to processing culture harvests at, for example, 2000 liters (of liquid culture) containing greater than 10 million cells per milliliter. Thus, standard filtration and (alternating) TFF systems may not be suitable for continuous processing of large-scale cultures over long periods of time.

Moreover, the cost of replacing clogged filters, especially when the rate of clogging is increased by the presence of cells and larger particles, adds time and expense to the purification. Cleaning the filters, such as by scrapping clogged material therefrom, can contaminate or damage the filters, reducing or eliminating the future effectiveness of the filters. Cleaning the filters can also result in the loss of valuable product associated with the clogged material, reducing the efficiency and cost-effectiveness of the system.

To reduce the clogging of the filters, the filter pore size may be increased so as to retain only cells and larger particles. Smaller particles can then be removed by passing the product through a separate filter with a smaller pore size. Oversized filters can also be employed to reduce clogging. Adding additional filters or filter size, however, further increases the time and expense of purification.

The concentration of smaller particles that may foul and clog filters may be reduced during pre-filtration processing. For instance, foregoing a centrifugation step may reduce formation of some of the smaller particles produced by cell breakage, as described above. However, foregoing centrifugation or some other large component removal technique can lead to increased filter clogging by the large components removable thereby. As an alternative, a milder form of culture settling, such as passive settling or slow centrifugation can reduce cell breakage and small particle formation. Such mild techniques are time consuming and slow the purification process dramatically.

In addition, some of the smaller particles that tend to form during cell culture can be reduced by harvesting the culture before the majority of cells begin to break or lyse in culture. In particular, by removing cells before cell breakage- and/or lysis-inducing culture conditions are reached, the majority of cells can remain intact. The intact cells can then be removed by filtration through a large pore filter, but the removal of any smaller particles in the culture may still require a more expensive, complex, and time-consuming small pore filter. As described above, eliminating the large pore filter step in favor of a single small filter step can save time and expense, but filters fine enough to remove smaller particles may be easily clogged by whole cells or large particles that are not removed prior to filtration.

In addition, because the cells described above are harvested from culture at an earlier time point, the production period for the molecule of interest is shortened relative to a full production culture. Accordingly, premature harvest of the cell culture reduces total production of the molecule of interest in the cells, leading to lower overall yield of the production process. Extending the production time in order to increase the concentration of the molecule of interest, however, may also enhance cell lysis and the formation of smaller particles.

Regardless of the culture, centrifugation, and/or filtration parameters employed in the purification of the molecule of interest away from the cells and particles, the molecule of interest may (and almost certainly will) still be contaminated by proteins and other molecular contaminants that are not removed in any of the foregoing steps. Accordingly, in a third step of the purification process (or second stage), a series of chromatographic and/or other targeted to purification steps may be required to achieve industry standard purity of the molecule of interest. For instance, Protein A chromatography may be implemented to retain antibodies, while allowing small molecular contaminants to flow-through the system un-retained. Protein A-conjugated (resin) beads, however, are costly and difficult to scale up for industrial production of antibodies. Liquid-liquid extraction (e.g., aqueous two-phase (ATP) extraction) can (also or alternatively) be used to effectuate transfer of either the molecule of interest or the contaminant from a first (liquid) phase into an immiscible second (liquid) phase, such as through a plurality of alternating mixing and settling stages. The molecule of interest can then be purified away from the contaminant by separating the (liquid) phases.

Additional purification steps and apparatus may also be required to achieve a suitable, highly purified final product. For instance, some processes may include (continuous) viral inactivation. One or more (optional) sterile filtration steps (performed by means of an (optional) sterile filtration component) may also be required to remove certain contaminating components, such as bacteria, from the sample. Bind-and-elute (e.g., ion exchange) or size exclusion chromatography steps may also be necessary to achieve suitable levels of sample purity. Buffer exchange or modification steps may be necessary between some of the foregoing steps. Viral filtration is generally performed towards the end of sample purification, or the second stage, after most contaminants have already been removed, as the ultra-small-pore filters are very expensive and prone to fouling.

Without being bound to any theory, performing these targeted purification steps on insufficiently purified samples, such as crude cell cultures or sample feeds that have not had particulate or other matter removed already, may also include a number of drawbacks. For instance, crude cultures may increase the (back) pressure of such systems, many of which are already high-pressure systems, requiring suitable fluid pumps and sealed containers. Cells and other particulate contaminants in the sample feed may clog the inlet and outlet filters or openings in such systems, even further increasing the pressure. Such pressure increase may require the flow rate of the purification system to be reduced, which increases the time and expense of purification. Moreover, clogged inlet and outlet filters or openings in continuous-flow systems may require a mid-purification interruption to replace the inoperative components. Furthermore, over extended periods of time, especially in continuous-flow systems, crude cultures (or partially purified samples) may foul the system components requiring costly maintenance, cleaning, or replacement.

To reduce the frequency and severity of such problem, the sample can be diluted prior to targeted purification steps. However, dilution of the sample may not be ideal for the stability of the molecule of interest. In addition, dilution of the sample typically requires additional reagents, such as diluting medium, and increases the overall volume of the sample, which then requires additional time to and equipment to purify.

Continuous processing or sample purification, especially in large-scale, commercial operations may be highly desirable to increase product yield or reduce purification time and expense. Continuous processing is an operation mode whereby there are no interruptions in the inflow of sample (e.g., raw materials) and outflow of product (e.g., biological molecule) between a defined starting point and a defined ending point. In a continuous flow system, while all steps within the process do not, necessarily, have to be continuously performed—that is to say some steps can be stop/start—all steps reach a throughput capable of sustaining the continuous inflow and outflow at the terminal ends of the process.

Currently, the adoption of continuous manufacturing techniques for purification of biological molecules is usually limited by the complexity of transitioning bind and elute (e.g., affinity or ion exchange) chromatography or other purification steps into high throughput continuous forms (or form factors). In a bind and elute chromatography system, a first step includes binding the target molecule (e.g., a protein, such as an (monoclonal) antibody or immunoglobulin (e.g., IgG)) to material (e.g., resin beads or a component (or ligand) attached thereto) disposed in the chromatography column (e.g., with a first (loading) buffer). The target molecule is then removed from the column, in a second step, with a second (elution) buffer. An intermediate washing step can also be performed (e.g., using the loading buffer or a separate wash buffer). Accordingly, the product of interest is not continuously flowing through the system.

The transition of bind/elute chromatography columns to a continuous mode generally requires the implementation of complex, multi-column chromatography systems. For instance, to effectuate continuous flow through a bind/elute chromatography system, a fluid valve may selectively (i) direct inflowing sample to a first column (that is already prepared for binding), (ii) direct wash buffer to wash product already bound to a second (loaded) column, (iii) direct elution buffer to elute bound sample from a third column, and (iv) direct loading buffer to prepare a fourth column for sample binding. Additional columns, valves, and fluid paths may also be provided to, for example, strip or wash the column between step (iii)—column elution and step (iv)—column preparation. After the above steps are completed, the valve position can be changed to (i) direct inflowing sample to the fourth (prepared) column, (ii) direct wash buffer to wash product bound to the first (loaded) column, (iii) direct elution buffer to elute bound and washed sample from the second column, and (iv) direct loading buffer to prepare the third column for sample binding. Thus, continuous flow chromatography purification systems typically require a multi-column system with fluid valves and lines to direct sample between the columns fluid coupled thereto.

Multi-column systems are also highly reliant upon (computerized) automation for the many interacting parts. The reliance on automation may result in questionable reliability and difficulty, especially in scaling the system up to a commercial scale of production. Without scale up, a drug proven to work in lab and clinical settings cannot be deployed on a commercial scale.

In addition, at any number of points along the purification process, the sample may become contaminated, such as with bacteria, fungus, or virus, especially when the sample is opened, accessed, transferred, or when reagents are added or sample removed from the purification system. Accordingly, sample purification may be interrupted to test for these detrimental contaminants, further increasing the time and expense associated with product preparation. Once contamination is detected, it may be difficult to determine the amount of contaminated sample that was processed without detection (e.g., between a clean sample read and a contaminated sample read). Accordingly, some products may be tested regularly to avoid loss of undetected, contaminated sample. Such regular testing further increases the time and expense associated with (therapeutic) sample purification.

Thus, the multitude of large devices required to obtain the final product can be prohibitively expensive to acquire and maintain, time consuming to operate, and bulky and inefficient to store in a production facility.

Accordingly, there are a number of disadvantages with conventional purification systems that can be addressed. It would be beneficial to provide a sample purification system that can achieve high levels of sample purity in a small, convenient work space, in a relatively short amount of time, and/or reduce the cost of sample purification.

BRIEF SUMMARY

Embodiments of the present disclosure solve one or more of the foregoing or other problems in the art with sample purification systems, methods, and/or products, and more specifically, continuous (flow) purification systems, methods, and/or products for biological samples.

Some embodiments include a method of purifying a fluid sample. Some embodiments include a method of purifying a biological molecule. Some embodiments include a method of purifying a biological molecule in a fluid sample. Some embodiments include a buffer system. Some embodiments include a two-phase buffer system. Some embodiments include a contaminant removal system. Some embodiments include a two-phase contaminant removal system. Some embodiments include a particulate contaminant removal system. Some embodiments include a two-phase particulate contaminant removal system. Some embodiments include a sample purification system. Some embodiments include a biological molecule purification system.

Embodiments can include a first fluid phase and a second fluid phase. The first fluid phase can be substantially liquid. The second fluid phase can be substantially liquid. The first fluid phase can have a first density. The second fluid phase can have a second density. The second density can be different than the first density. The first phase can be immiscible with the second phase.

At least one of the first phase or the second phase can comprise an organic molecule. The organic molecule can comprise a hydrophilic polymer or polymeric glycol. The hydrophilic polymer or polymeric glycol can be or comprise polyethylene glycol (PEG), polypropylene glycol (PPG), or another suitable hydrophilic polymer or polymeric glycol in certain embodiments. At least one of the first phase or the second phase can comprise a salt. The salt can be or comprise phosphate, sulfate, carbonate, and/or citrate.

Illustratively, one of the first phase or the second phase can comprise PEG having an average molecular weight of or between about 400 and/or 600 kDa at a concentration of about 15-20% by weight and the other of the first phase or the second phase can comprise PO4, SO4 or Citrate at a concentration of about 12.5-17.5% by weight.

Illustratively, one of the first phase or the second phase can comprise PEG having an average molecular weight of or between about 400 and/or 600 kDa at a concentration of about 15-20% by weight and the other of the first phase or the second phase can comprise PO4, SO4 or Citrate at a concentration of about 12.5-17.5% by weight.

Illustratively, one of the first phase or the second phase can comprise PEG having an average molecular weight of about 3350 kDa at a concentration of about 5-9% by weight and the other of the first phase or the second phase can comprise PO4, SO4 or Citrate at a concentration of about 10-13% by weight.

Illustratively, one of the first phase or the second phase can comprise PEG having an average molecular weight of about 1450 kDa at a concentration of about 6-10% by weight and the other of the first phase or the second phase can comprise PO4, SO4 or Citrate at a concentration of about 12-15% by weight.

Illustratively, one of the first phase or the second phase can comprise PEG having an average molecular weight of about 6000 kDa at a concentration of about 4-8% by weight and the other of the first phase or the second phase can comprise PO4, SO4 or Citrate at a concentration of about 9-12% by weight.

It will be appreciated, however, that in certain embodiments, one of the first phase or the second phase can comprise PEG having any suitable average molecular weight, such as between about 20 kDa and about 8000 kDa, or any suitable value or range of values therebetween, at any suitable concentration, such as about 2-30% by weight, or any suitable value or range of values therebetween, and the other of the first phase or the second phase can comprise PO4, SO4 or Citrate at any suitable concentration, such as between about 4-25% by weight, or any suitable value or range of values therebetween.

The contaminant removal (two-phase buffer) system can have a pH less than about 4.5. It will be appreciated, however, that a pH of less than about 4, 3.5, 3, 2.5, or 2, or greater than or equal to about 4.5, 5, 5.5, 6, 6.5, 7, 7.5, 8, 8.5, or 9, or any pH value or range of pH values therebetween is also contemplated herein. The system can have less than about 5% by weight or by volume dextran (if any). The dextran optionally comprising dextran 500000. The system can have 0-12% by weight sodium chloride and/or potassium chloride (if any). Preferably, the system comprises about 0% sodium chloride and/or potassium chloride.

Some embodiments can include a fluid (e.g., substantially liquid), biological sample. The biological sample can comprise a biological molecule and one or more particulate contaminants. The biological molecule can be or have a molecular weight less than about 5 kDa, 10 kDa, 25 kDa, 50 kDa, 100 kDa, 150 kDa, 155 kDa, 160 kDa, 175 kDa, 200 kDa, 225 kDa, or 240 kDa, 250 kDa, 300 kDa, 400 kDa, 500 kDa, 600 kDa, 700 kDa, 800 kDa, 900 kDa, or 1000 kDa. The biological molecule can be less than, between, or about 1 nm, 5 nm, 10 nm, 12 nm, 15 nm, 20 nm, 25 nm, 50 nm, 100 nm, 150 nm, or 200 nm in size (e.g., diameter, cross-sectional length or width, etc.). In one or more embodiments, the biological molecule can be between about 1-200 nm, 5-100 nm, 8-25 nm, or 10-15 nm in size. In some embodiments, the biological molecule can comprise a protein (e.g., a therapeutic protein, monoclonal antibody, and/or immunoglobulin, such as an IgG). The biological molecule can be disposed (substantially) in the aqueous phase or in the organic phase in various embodiments.

In some embodiments, the biological molecule can be produced in a cell culture. The cell culture can be or comprise a suspension cell culture. In some embodiments, the biological molecule can be or comprise at least a portion of the cell culture. The cell culture can include a culture medium and cells growing in or on the medium. The culture medium can be a liquid medium. In some embodiments, the cells can produce the biological molecule. In some embodiments, the cells can produce the biological molecule in the cell culture. The cells can be derived from an animal. The animal can be human, non-human, mammal, insect, etc. The cells can be from a plant. The cells can be from a microbe. The microbe can be bacterial, fungal, etc. In some embodiments, the cells can expel the biological molecule into or onto the medium.

The particulate contaminant can be or comprise cellular material (e.g., cells, cell fragments, and/or one or more (structural) components of the cells, such as cell wall, cell membrane, cell matrix, organelle, etc.). In some embodiments, the cells can be substantially intact. Some embodiments can include cell fragments and/or lysed cells. In some embodiments, the particulate contaminant can be or comprise aggregate biological molecules or biological molecule aggregates. The particulate contaminant can be or have a molecular weight greater than, between, or about 5 kDa, 10 kDa, 25 kDa, 50 kDa, 100 kDa, 150 kDa, 155 kDa, 160 kDa, 175 kDa, 200 kDa, 225 kDa, or 240 kDa, 250 kDa, 300 kDa, 400 kDa, 500 kDa, 600 kDa, 700 kDa, 800 kDa, 900 kDa, 1000 kDa, 1500 kDa, 1750 kDa, 2000 kDa, 2500 kDa, 3000 kDa, 4000 kDa, 5000 kDa, 6000 kDa, 7000 kDa, 8000 kDa, 9000 kDa, or 10,000 kDa. The particulate contaminant can be greater than, between, or about 200 nm, 225 nm, 240 nm, 250 nm, 300 nm, 400 nm, 500 nm, 1 µm, 5 µm, or more, in size (e.g., diameter, cross-sectional length or width, etc.). The particulate contaminant can be less than, between, or about 5 µm, 1 µm, 500 nm, 400 nm, 300, nm, 250 nm, 240 nm, 225 nm, 200 nm or less, in size. In other embodiments, the cells can be or comprise the biological molecule.

At least one embodiment can comprise mixing the biological sample (e.g., cell culture or portion thereof) or an amount thereof with the first phase. Some embodiments can comprise mixing the biological sample (e.g., cell culture or portion thereof) or an amount thereof with the second phase. Mixing the biological sample or an amount thereof with the first phase and/or the second phase can form a first mixture. Some embodiments can comprise mixing the biological sample (e.g., cell culture or portion thereof) or an amount thereof with the first fluid or liquid phase and the second fluid or liquid phase to form a first mixture. In some embodiments, the first mixture can comprise the first fluid phase, the second fluid phase, and (an amount of) the biological sample. In some embodiments, the first mixture can comprise the first fluid phase, the second fluid phase, and at least a portion of the cell culture. In certain embodiments, the first mixture can comprise the first fluid phase, the second fluid phase, the biological molecule or an amount thereof, and one or more particulate contaminants.

In some embodiments, the biological molecule or substantial portion or amount thereof can be disposed in the first phase in the first mixture. In some embodiments, greater than 50%, 55%, 60%, 65%, 70%, 75%, 80%, 85%, 90%, 95%, 96%, 97%, 98%, or 99% of the biological molecule can be disposed in the first phase in the first mixture. The biological molecule can be present in the first phase at a concentration greater than about 100 mg/L. In some embodiments, the particulate contaminant or substantial portion or amount thereof can be disposed in the second phase in the first mixture. In some embodiments, greater than 50%, 55%, 60%, 65%, 70%, 75%, 80%, 85%, 90%, 95%, 96%, 97%, 98%, or 99% of the particulate contaminant can be disposed in the second phase in the first mixture.

In some embodiments, mixing comprises forming an emulsion of the first phase and the second phase. In some embodiments, the biological molecule or amount thereof can be dispersed in the emulsion. In some embodiments, the particulate contaminant or amount thereof can be dispersed in the emulsion. In some embodiments, mixing is performed in a sample mixing compartment of a particulate removal assembly. In some embodiments, mixing is performed by means for mixing the biological sample with the first fluid phase and the second fluid phase. In some embodiments, the mixing compartment has means for mixing the biological sample with the first fluid phase and the second fluid phase.

Some embodiments can include an optional particulate removal assembly. The fluid sample and/or components thereof can be disposed in the particulate removal assembly. The particulate removal assembly can comprise a sample mixing compartment. The particulate removal assembly can comprise means for mixing the fluid sample in the mixing compartment. The particulate removal assembly can comprise a sample settling compartment. The sample settling compartment can be in fluid communication with the sample mixing compartment. A first portion of the fluid sample can be disposed in the sample mixing compartment. The first portion (in the sample mixing compartment) can be in a mixed configuration, such as an emulsion. The mixed first portion can include the first phase and the second phase. The mixed first portion can be or comprise an emulsion of the first phase and the second phase.

A portion or amount of the biological molecule can be dispersed and/or suspended in the mixed first portion (or emulsion). A portion or amount of the particulate contaminant can be dispersed and/or suspended in the mixed first portion (or emulsion). A second portion of the fluid sample can be disposed in the sample settling compartment. The second portion (in the sample mixing compartment) can be in a settled configuration. In the settled configuration, a first phase body can settle or separate (or be settled or separated) from a second phase body. The first phase body can have at least some of the portion or amount of (a first of) the biological molecule and/or the particulate contaminant disposed, dispersed, and/or suspended therein. The second phase body can have at least some of the portion or amount of (the other of) the biological molecule and/or the particulate contaminant disposed, dispersed, and/or suspended therein.

The particulate removal assembly can comprises a mixing container assembly at least partially bounding the mixing compartment. The means for mixing can be disposed in the mixing compartment. The mixing container assembly can have at least one sample inlet. The mixing container assembly can have at least two sample inlets. The mixing container assembly can have at least one mixed sample outlet. The mixing container assembly can have at least two mixed sample outlets. The sample settling compartment can be in fluid communication with the sample mixing compartment. The fluid sample can flow or be flowable from the mixing compartment into the settling compartment.

The particulate removal assembly can include a settling container assembly at least partially bounding the settling compartment. The settling container assembly can have a mixed sample inlet. The mixed sample inlet can be in fluid communication with a mixed sample outlet of the mixing container assembly). The settling container assembly can have a first phase body outlet formed in a first (top or bottom) end of the settling compartment. The settling container assembly can have a second phase body outlet formed in a second (bottom or top) end of the settling compartment. The first end can be separated from the second end by a vertical distance.

Embodiments can include at least one shielding element disposed between the mixing compartment and the settling compartment. The shielding element(s) can at least partially separate the mixing compartment from the settling compartment. The shielding element can be adapted to shield the portion of the sample disposed in the settling compartment from (exposure to) the means for mixing. The shielding element can comprise a wall, barrier, tube, conduit, or other suitable means for shielding the portion of the sample disposed in the settling compartment from (exposure to) the means for mixing.

In at least one embodiment, the first phase and the second phase can be emulsified by the means for mixing in the mixing compartment. In some embodiments, settling of the first and second phases can comprise a less-dense phase of the first and second phases being positioned vertically above a more-dense phase of the first and second phases. In some embodiments, settling of the first and second phases can comprise (the formation of) an at least partially horizontal interface being disposed between the first phase body and the second phase body. In some embodiments, settling of the first and second phases can occur, take place, and/or be performed in the settling compartment.

In some embodiments, the particulate removal assembly (or component(s) thereof) can be adapted for a continuous flow operation or mode. In some embodiments, during one or more period of time, the fluid sample can be (continuously) introduced into the mixing compartment. In some embodiments, during one or more period of time, the biological molecule, particulate contaminant, first fluid phase, and second fluid phase can be (continuously) introduced into the mixing compartment. In some embodiments, during one or more period of time, the fluid sample can be (continuously) mixed by the means for mixing. In some embodiments, during one or more period of time, the fluid sample can be (continuously) mixed in the sample mixing compartment. In some embodiments, during one or more period of time, the biological molecule, particulate contaminant, first fluid phase, and second fluid phase can be (continuously) mixed by the means for mixing. In some embodiments, during one or more period of time, the biological molecule, particulate contaminant, first fluid phase, and second fluid phase can be (continuously) mixed in the sample mixing compartment. In some embodiments, (continuously) mixing can (continuously) form a first mixture.

In some embodiments, during one or more period of time, the fluid sample (continuously) flows from the mixing compartment to the settling compartment. In some embodiments, during one or more period of time, the first mixture (continuously) flows from the mixing compartment to the settling compartment. In some embodiments, during one or more period of time, the biological molecule, particulate contaminant, first fluid phase, and second fluid phase (continuously) flows from the mixing compartment to the settling compartment. In some embodiments, during one or more period of time, the fluid sample is allowed or permitted to (continuously) settle in the settling compartment. In some embodiments, during one or more period of time, the first mixture is allowed or permitted to (continuously) settle in the settling compartment. In some embodiments, during one or more period of time, the fluid sample is allowed or permitted to (continuously) settle into a first phase body and a second phase body. In some embodiments, during one or more period of time, the first mixture is allowed or permitted to (continuously) settle into a first phase body and a second phase body.

In some embodiments, the first phase body comprises the first phase. In some embodiments, at least some of an amount of the biological molecule is disposed in the first phase body. In some embodiments, a majority of the biological molecule is disposed in the first phase body. In some embodiments, the second phase body comprises the second phase. In some embodiments, at least some of an amount of the particulate contaminant is disposed in the first phase body. In some embodiments, a majority of the particulate contaminant is disposed in the first phase body.

In some embodiments, the first phase body (continuously) fluidly exits the settling compartment. In some embodiments, the first phase body (continuously) fluidly exits the settling compartment through a first phase body outlet. In some embodiments, the second phase body (continuously) fluidly exits the settling compartment. In some embodiments, the second phase body (continuously) fluidly exits the settling compartment through a second phase body outlet.

Some embodiments can include an optional bioreactor system. The bioreactor system can be fluid coupled with the particulate removal assembly or sample mixing compartment thereof. The bioreactor system can be disposed and/or fluid coupled up-stream and/or up-flow of the particulate removal assembly or sample mixing compartment thereof. The bioreactor system can be disposed and/or fluid coupled to the particulate removal assembly or sample mixing compartment thereof opposite the settling compartment. The bioreactor assembly can include a bioreactor. Some embodiments can include a cell retention device. In some embodiments, the bioreactor assembly can include the cell retention device. The cell retention device can be disposed between the bioreactor and the particulate removal assembly or sample mixing compartment thereof. The cell retention device can be fluid coupled with the bioreactor or an outlet opening thereof. The cell retention device can be configured to retain and/or recirculate at least some of the cells of a (suspension) cell culture (e.g., back into the bioreactor). The cell retention device can allow or be configured to allow fluid transfer of a liquid culture medium from the bioreactor into the particulate removal assembly or sample mixing compartment thereof. The liquid culture medium can include or have an amount of the biological molecule disposed therein. In some embodiments, the bioreactor system can be or comprise a perfusion cell culture bioreactor system. In some embodiments, the (suspension) cell culture can be or comprise a perfusion (suspension) cell culture.

Some embodiments can include an optional sample concentrating element. The sample concentrating element can be fluid coupled with the particulate removal assembly or settling compartment thereof. The sample concentrating element can be disposed down-stream and/or down-flow of the particulate removal assembly or settling compartment thereof. The sample concentrating element can be fluid coupled with the particulate removal assembly or settling compartment thereof opposite the mixing compartment. The sample concentrating element can comprise a (tangential flow) filtration component or member. The (tangential flow) filtration component can have a nominal molecular weight limit (NMWL) of about 200 kDa or less, about 33.5 kDa or less, about 33 kDa or less, about 15 kDa or less, or about 10 kDa or less. The sample concentrating element can be configured for continuous flow operation. The sample concentrating element can be configured for continuous flow operation.

Some embodiments can include (continuously) concentrating a portion of the amount of the biological molecule. Some embodiments can include concentrating the portion of the amount of the biological molecule in the first phase body. Some embodiments can include concentrating a portion of the amount of the biological molecule in the sample concentrating element. Some embodiments can include concentrating a portion of the amount of the biological molecule at least 1.5-fold. Some embodiments can include concentrating a portion of the amount of the biological molecule at least 2-fold. Some embodiments can include concentrating a portion of the amount of the biological molecule at least 3-fold. Some embodiments can include concentrating a portion of the amount of the biological molecule at least 4-fold. Some embodiments can include concentrating a portion of the amount of the biological molecule at least 5-fold. Some embodiments can include concentrating a portion of the amount of the biological molecule at least 6-fold. Some embodiments can include concentrating a portion of the amount of the biological molecule at least 7-fold. Some embodiments can include concentrating a portion of the amount of the biological molecule at least 8-fold. Some embodiments can include concentrating a portion of the amount of the biological molecule at least 9-fold. Some embodiments can include concentrating a portion of the amount of the biological molecule at least 10-fold. Some embodiments can include concentrating a portion of the amount of the biological molecule between about 1.5-fold and about 10-fold. Some embodiments can include concentrating a portion of the amount of the biological molecule between about 2-fold and about 6-fold.

Some embodiments can include an optional extraction component. In some embodiments, the extraction component can be or comprise a multi-stage extraction component. In some embodiments, the extraction component can be or comprise a liquid-liquid extraction component. In some embodiments, the extraction component can be or comprise a multi-stage, liquid-liquid extraction component. The extraction component can be fluid coupled with the particulate removal assembly or settling compartment thereof. The extraction component can be disposed down-stream and/or down-flow of the particulate removal assembly or settling compartment thereof. The extraction component can be fluid coupled with the particulate removal assembly or settling compartment thereof opposite the mixing compartment.

The sample concentrating element can be disposed between the extraction component and the particulate removal assembly or settling compartment thereof. The extraction component can be fluid coupled with the sample concentrating element. The extraction component can be disposed down-stream and/or down-flow of the sample concentrating element. The extraction component can be fluid coupled with the sample concentrating element opposite the particulate removal assembly or settling compartment thereof. The fluid sample can flow from the particulate removal assembly or settling compartment thereof, optionally through the sample concentrating element, to or into the extraction component.

The extraction component can be configured for continuous flow operation. The extraction component can comprise a container assembly. The container assembly can bound a sample purification compartment. The container assembly can have an upper end and an opposing lower end. The sample purification compartment can comprise one or more sample mixing zones. The sample purification compartment can comprise a plurality of mixing zones. The sample purification compartment can comprise two or more mixing zones. The sample purification compartment can comprise three or more mixing zones. The sample purification compartment can comprise four or more mixing zones. The sample purification compartment can comprise five or more mixing zones. The sample purification compartment can comprise one or more sample settling zones. The sample purification compartment can comprise a plurality of settling zones. The sample purification compartment can comprise two or more settling zones. The sample purification compartment can comprise three or more settling zones. The sample purification compartment can comprise four or more settling zones. The sample purification compartment can comprise five or more settling zones.

The container assembly can comprise a first fluid inlet. The first fluid inlet can be disposed at one of the upper end or the lower end of the sample purification compartment. The container assembly can comprise a first fluid outlet. The first fluid outlet can be disposed at one of the upper end or the lower end of the sample purification compartment. The container assembly can comprise a second fluid inlet. The second fluid inlet can be disposed at one of the upper end or the lower end of the sample purification compartment. The container assembly can comprise a second fluid outlet. The second fluid outlet can be disposed at one of the upper end or the lower end of the sample purification compartment. The first inlet can be in fluid communication with the sample purification compartment. The second inlet can be in fluid communication with the sample purification compartment. The first outlet can be in fluid communication with the sample purification compartment. The second outlet can be in fluid communication with the sample purification compartment.

The extraction component can comprise one or more shielding elements. The extraction component can comprise a plurality of shielding elements. The shielding element(s) can be positioned within the sample purification compartment. The shielding element(s) can at least partially separate adjacent mixing zone(s) and settling zone(s). The shielding element(s) can at least partially separate adjacent mixing zone(s). The mixing zone(s) can be in fluid communication with the settling zone(s).

The extraction component can comprise means for mixing a liquid. The means for mixing can be disposed in one or more mixing zones. The means for mixing can be disposed in each of the mixing zone(s). The means for mixing can comprise a mixing element. The mixing element can be disposed in one or more mixing zones. The mixing element can be disposed in each of the mixing zone(s). The means for mixing or mixing element (thereof) can comprise one or more mixing members. The one or more mixing members can comprise or be selected from the group consisting of a rotating member, an oscillating member, a vibrating member, a stirring member, a shaking member, and/or a sonicating member. The means for mixing can comprise a drive shaft. The drive shaft can be coupled with the mixing element(s). The drive shaft can be coupled with the mixing member(s). The drive shaft can rotatably extending through the one or more shielding elements. The drive shaft can rotatably extending through each of the one or more shielding elements. The drive shaft can rotatably extending through each of the plurality of shielding elements. In some embodiments, there is no mixing element within the settling zone(s). In some embodiments, the settling zone(s) is/are devoid of mixing elements.

In some embodiments, the container assembly can comprise a first sub-container. The first sub-container can at least partially bound a first sub-compartment. The first sub-compartment can extend between an upper end and an opposing lower end of the first sub-container. A first mixing zone can be disposed within the first sub-compartment. The container assembly can comprise a second sub-container. The second sub-container can at least partially bound a second sub-compartment. The second sub-compartment can extend between an upper end and an opposing lower end of the second sub-container. A first settling zone can be disposed within the second sub-compartment. The second sub-container can be spaced apart from the first sub-container.

The container assembly can comprise a first conduit. The first conduit can bound a first fluid path. The first conduit can be fluid coupled with the first mixing zone. The first conduit can be fluid coupled with the first settling zone. The first conduit can be fluid coupled with the first mixing zone and the first settling zone, such that a fluid can flow therebetween. In some embodiments, the sample purification compartment can comprise the first sub-compartment, the second sub-compartment, and the first fluid path.

The extraction component can comprise at least one acoustic settler. The acoustic settler(s) can be aligned with a portion of the container assembly. The acoustic settler(s) can be aligned with a portion of the settling zone(s). The acoustic settler can emit an acoustic wave. The acoustic settler can be emitting an acoustic wave. The acoustic settler can be configured to emit an acoustic wave. A first acoustic settler can be aligned with the first conduit. The first acoustic settler can emit the acoustic wave into the first fluid path of the first conduit (during operation). The first acoustic settler can be positioned or configured to emit the acoustic wave into the first fluid path of the first conduit (during operation). At least a portion of the first conduit aligned with the first acoustic settler can have at least one flat surface or at least one rounded surface.

Some embodiments can include at least a second settling zone. The second settling zone can be disposed within the first sub-compartment of the first sub-container. The first mixing zone and the second settling zone can be at least partially separated by at least one shielding element. The at least one shielding element can be positioned within the first sub-compartment. An acoustic settler can be aligned with a portion of the second settling zone.

Some embodiments can include a second mixing zone. The second mixing zone can be disposed within the second sub-compartment of the second sub-container. The first settling zone and the second mixing zone can be separated by at least one shielding element. The at least one shielding element can be positioned within the second sub-compartment.

Some embodiments can include a second conduit. The second conduit can bound a second fluid path. The second conduit can be fluid coupled with the second settling zone. The second conduit can be fluid coupled with the second mixing zone. The second conduit can be fluid coupled with the second settling zone and the second mixing zone, such that a fluid can flow therebetween. Some embodiments can include an acoustic settler aligned with the second conduit. The acoustic settler can be configured to emit an acoustic wave into the second fluid path of the first conduit (during operation). The acoustic settler can be positioned or configured to emit the acoustic wave into the second fluid path of the first conduit (during operation). At least a portion of the second conduit aligned with the acoustic settler can have at least one flat surface or at least one rounded surface.

In some embodiments, the first sub-container comprises a flexible bag. In some embodiments, the second sub-container can comprises a flexible bag. The flexible bag(s) can comprise or be comprised or formed of a polymeric sheet or film (material). Some embodiments can include a first rigid support housing. The first sub-container can be supported in the first rigid support housing. Some embodiments can include a second rigid support housing. The second sub-container can be supported in the second rigid support housing.

In some embodiments, one or more shielding elements have one or more openings extending therethrough. In some embodiments, each of the plurality of shielding elements has one or more openings extending therethrough. In some embodiments, fluid can pass through the opening(s).

In some embodiments, the container assembly can comprise a container having an exterior surface and an interior surface. In some embodiments, the container assembly can comprise sub-containers each having an exterior surface and an interior surface. The interior surface can at least partially bound a compartment. The compartment(s) can extend between the upper end and the opposing lower end of the container or sub-container(s). The mixing zone(s) can be disposed within the compartment(s). The shielding element(s) can be positioned within the compartment(s). The shielding element(s) can be positioned between adjacent mixing zones. The shielding element(s) can be positioned between a mixing zone(s) and adjacent settle zone(s).

The container assembly can comprise a first conduit. The first conduit can bound a first settling zone. The first conduit can be at least partially disposed outside of the container. The first conduit can be fluid coupled with two mixing zones. Fluid can flow between the two mixing zones by means of the first conduit. The sample purification compartment can comprise the compartment and the first settling zone. A first acoustic settler can be aligned with the first conduit. The first acoustic settler can emit or be positioned or configured to emit the acoustic wave into the first settling zone of the first conduit during operation.

Some embodiments can include a second conduit. The second conduit can bound a second settling zone. The second conduit can be at least partially disposed outside of the container. The second conduit can be fluid coupled with two mixing zones. The sample purification compartment can comprise the first compartment, the first settling zone, and the second settling zone. Some embodiments can include a second acoustic settler. The second acoustic settler can be aligned with the second conduit. The second acoustic settler can emit an acoustic wave. The second acoustic settler can emit or be positioned or configured to emit the acoustic wave into the second settling zone of the second conduit during operation. In at least one embodiment a shielding elements can block the flow of fluid within the compartment between the mixing zones. In some embodiments, fluid can only flow between the mixing zones by flowing through the first and/or second conduit. Some embodiments can include one or more additional mixing zones. Some embodiments can include one or more additional conduits. Some embodiments can include one or more additional settling zones. Some embodiments can include one or more additional acoustic settlers. Some embodiments can include one or more rigid support housings. The container(s) can be supported in the housing(s).

Some embodiments can include a second settling zone. At least one shielding element can be disposed between the second settling zone and one of the mixing zones. Some embodiments can include a second conduit. The second conduit can be at least partially disposed outside of the container. The second conduit can be fluid coupled with the second settling zone and one of the mixing zones (e.g., so that a fluid can flow therebetween). Some embodiments can include a second acoustic settler. The second acoustic settler can be aligned with the second conduit. The second acoustic settler can emit or be positioned or configured to emit an acoustic wave into the second conduit during operation.

In some embodiments, the container assembly can comprise a container having an encircling side wall that bounds the sample purification compartment. The container and/or sample purification compartment can extends between an upper end and an opposing lower end. The container can be sufficiently rigid to be self-supporting. One or more shielding elements can be positioned within the sample purification compartment. The shielding element(s) can be disposed between adjacent mixing zone(s) and settling zone(s). A first acoustic settler can be aligned with a first settling zone so that the first acoustic settler can emit the acoustic wave into the first settling zone during operation. Some embodiments can include a second acoustic settler aligned with a second settling zone so that the second acoustic settler can emit an acoustic wave into the second settling zone during operation.

In some embodiments, at least a portion of one or more settling zones can have a diameter that is less than 30 cm. In some embodiments, at least two, three, four, or five shielding elements can be (horizontally) disposed within the sample purification compartment. The shielding elements can least partially separate vertically-adjacent mixing zones or separate vertically-adjacent mixing zones and settling zones. In some embodiments, the plurality of mixing zones and settling zones can include at least 2 mixing zones and at least 3 settling zones. In some embodiments, the plurality of mixing zones and settling zones can include at least 3 mixing zones and at least 4 settling zones. In some embodiments, the plurality of mixing zones and settling zones can include at least 4 mixing zones and at least 5 settling zones. In some embodiments, the plurality of mixing zones and settling zones can include at least 5 mixing zones and at least 6 settling zones. In some embodiments, the plurality of mixing zones and settling zones can include at least 6 mixing zones and at least 7 settling zones. In some embodiments, the plurality of mixing zones and settling zones can include at least 7 mixing zones and at least 8 settling zones. In some embodiments, the mixing zones and settling zones can alternate vertically. In some embodiments, the mixing zones and settling zones can alternate in vertical alignment.

In some embodiments, the one or more acoustic settlers can be coupled to the container assembly. In some embodiments, the one or more acoustic settlers can be disposed (directly) against the container assembly. In some embodiments, the one or more acoustic settlers can comprise a first acoustic wave transducer. The first acoustic wave transducer can be disposed on one side of the container assembly. In some embodiments, the first acoustic wave transducer can be configured to sense one or more properties of an acoustic wave produced thereby. In some embodiments, the one or more acoustic settlers can comprise a first acoustic wave reflector. The first acoustic wave reflector can be disposed on an opposing side of the container assembly in alignment with the first acoustic wave transducer.

In some embodiments, the container assembly can comprise an acoustic settling loop. The acoustic settling loop can be in fluid communication with the sample purification compartment. The first acoustic settler can be aligned with the acoustic settling loop. Opposing ends of the acoustic settling loop can be in fluid communication with the sample purification compartment. In some embodiments, a fluid can flow from the sample purification compartment, through the acoustic settling loop, and back into the sample purification compartment. In some embodiments, the container assembly includes a third inlet. The third inlet can be in fluid communication with the sample purification compartment. In some embodiments, the container assembly includes a third outlet. The third outlet can be in fluid communication with the sample purification compartment. The acoustic settling loop can be fluid coupled with the third inlet. The acoustic settling loop can be fluid coupled with the third outlet. The acoustic settling loop can be fluid coupled with the second inlet. The acoustic settling loop can be fluid coupled with the second outlet.

In some embodiments, the acoustic settling loop can comprise a fluid conduit. The first acoustic settler can be disposed about a portion of the fluid conduit. Some embodiments can include a fluid pump adapted to pass fluid through the acoustic settling loop. In some embodiments, the acoustic settling loop can be or comprise a first acoustic settling loop. Some embodiments can include a second acoustic settling loop. The second acoustic settling loop can be in fluid communication with the sample purification compartment. The second acoustic settling loop can comprise a fluid conduit. A second acoustic settler can be aligned with the second acoustic settling loop. Opposing ends of the second acoustic settling loop can be in fluid communication with the sample purification compartment. In some embodiments, a fluid can flow from the sample purification compartment, through the second acoustic settling loop, and back into the sample purification compartment. The second acoustic settling loop can be fluid coupled with the third inlet. The second acoustic settling loop can be fluid coupled with the third outlet. The second acoustic settling loop can be fluid coupled with the second inlet. The second acoustic settling loop can be fluid coupled with the second outlet.

The first acoustic settling loop can be fluidly connected to a lowermost settling zone. The second acoustic settling loop can be fluidly connected to an uppermost settling zone.

Some embodiments can include an optional sample processing assembly. The sample processing assembly can be fluid coupled with the extraction component. The sample processing assembly can be disposed down-stream and/or down-flow of the extraction component. The sample processing assembly can be fluid coupled with the extraction component opposite the particulate removal assembly. The sample processing assembly can be fluid coupled with the sample concentrating element. The sample processing assembly can be disposed down-stream and/or down-flow of the sample concentrating element. The sample processing assembly can be fluid coupled with the extraction component opposite the sample concentrating element. The sample processing assembly can be fluid coupled with the particulate removal assembly. The sample processing assembly can be disposed down-stream and/or down-flow of the particulate removal assembly. The sample processing assembly can be fluid coupled with the bioreactor assembly. The sample processing assembly can be disposed down-stream and/or down-flow of the bioreactor assembly. The sample processing assembly (or one or more components thereof) can be configured for continuous flow processing.

The sample processing assembly can include an optional sterile filtration component. The sterile filtration component can be fluid coupled with the extraction component. The sterile filtration component can be down-stream or down-flow of the extraction component. The sterile filtration component can be configured for continuous flow processing.

The sample processing assembly can include an optional buffer exchange component. The buffer exchange component can be fluid coupled with the extraction component. The buffer exchange component can be down-stream or down-flow of the extraction component. The buffer exchange component can be fluid coupled with the optional sterile filtration component. The buffer exchange component can be down-stream or down-flow of the optional sterile filtration component. The buffer exchange component can be configured for continuous flow processing.

The sample processing assembly can include one or more chromatographic purification devices or assemblies. An illustrative chromatographic purification device or assembly can comprise a chromatography component (or column). In some embodiments, the sample processing assembly can include a first chromatography component or column. The first chromatography component can be or comprise an ion exchange chromatography component. The first chromatography component can be fluid coupled with the optional buffer exchange component. The first chromatography component can be down-stream or down-flow of the optional buffer exchange component. The first chromatography component can be fluid coupled with the optional sterile filtration component. The first chromatography component can be down-stream or down-flow of the optional sterile filtration component. The first chromatography component can be fluid coupled with the extraction component. The first chromatography component can be down-stream or down-flow of the extraction component. The first chromatography component can be or comprise a first cation exchange chromatography component or column. The first chromatography component can be or comprise a first multi-modal cation exchange chromatography component or column. The first chromatography component can be or comprise a first anion exchange chromatography component or column. The first chromatography component can be or comprise a first multi-modal anion exchange chromatography component or column. The first chromatography component can be configured for continuous flow processing.

The sample processing assembly can include a second chromatography component or column. The second chromatography component can be or comprise an ion exchange chromatography component or column. The second chromatography component can be fluid coupled with the first chromatography component. The second chromatography component can be down-stream or down-flow of the first chromatography component. The second chromatography component can be fluid coupled with the optional buffer exchange component. The second chromatography component can be down-stream or down-flow of the optional buffer exchange component. The second chromatography component can be fluid coupled with the optional sterile filtration component. The second chromatography component can be down-stream or down-flow of the optional sterile filtration component. The second chromatography component can be fluid coupled with the extraction component. The second chromatography component can be down-stream or down-flow of the extraction component. The second chromatography component can be or comprise a first cation exchange chromatography component or column. The second chromatography component can be or comprise a first multi-modal cation exchange chromatography component or column. The second chromatography component can be or comprise a first anion exchange chromatography component or column. The second chromatography component can be or comprise a first multi-modal anion exchange chromatography component or column. In some embodiments, the second ion exchange chromatography component can be opposite or other than the first ion exchange chromatography component. The second chromatography component can be configured for continuous flow processing.

In some embodiments, the first chromatography component can be configured for flow-through sample purification. In some embodiments, a fluid sample disposed and/or introduced into the first chromatography component can be flow-through purified. In some embodiments, the biological molecule can flow or pass through the first chromatography component. In some embodiments, the biological molecule can flow or pass through the first chromatography component without being or becoming (substantially) bound thereto or retained thereby. In some embodiments, one or more molecular contaminants can be or become (substantially) bound thereto or retained by the first chromatography component or chromatography material disposed therein.

In some embodiments, the second chromatography component can be configured for flow-through sample purification. In some embodiments, a fluid sample disposed and/or introduced into the second chromatography component can be flow-through purified. In some embodiments, the biological molecule can flow or pass through the second chromatography component. In some embodiments, the biological molecule can flow or pass through the second chromatography component without being or becoming (substantially) bound thereto or retained thereby. In some embodiments, one or more molecular contaminants can be or become (substantially) bound thereto or retained by the second chromatography component or chromatography material disposed therein.

In some embodiments, illustrative chromatography material can include beads. The beads can be comprised of resin, agarose, or other suitable chromatography material as known in the art. The chromatography material (or beads) can have one or more ligands or groups disposed thereon or on a surface thereof. In some embodiments, the chromatography material can have a first (positive or negative) net charge or charge state. In some embodiments, the chromatography material can have a second (positive or negative) net charge or charge state. In some embodiments, the first chromatography component can include or contain chromatography material having a first (positive or negative) net charge or charge state. In some embodiments, the second chromatography component can include or contain chromatography material having a second (positive or negative) net charge or charge state. In some embodiments, one or more molecular contaminants from a first group of molecular contaminants can have a second (positive or negative) net charge or charge state. The one or more molecular contaminants from the first group of molecular contaminants can be or become bound by the first chromatography component or chromatography material having a first (positive or negative) net charge or charge state. In some embodiments, one or more molecular contaminants from a second group of molecular contaminants can have a first (positive or negative) net charge or charge state. The one or more molecular contaminants from the second group of molecular contaminants can be or become bound by the second chromatography component or chromatography material having a second (positive or negative) net charge or charge state.

The biological molecule can have a net charge or charge state adapted to flow through the first chromatography component or chromatography material thereof. The biological molecule can have a net charge or charge state adapted to flow through the second chromatography component or chromatography material thereof. In some embodiments, the biological molecule can have a charge state adapted so as to flow through the first chromatography component, and then flow through the second chromatography component. In some embodiments, the biological molecule can have a charge state adapted so as to flow through the first chromatography component, and then flow through the second chromatography component without the need for a buffer change in between. Some embodiments can include a dual ion exchange flow through system. Such dual ion exchange flow through systems can be incorporated into a continuous flow system wherein the fluid sample remains in the flowing system through a series of purification components or steps.

The sample processing assembly can include an optional bacterial filtration component. The bacterial filtration component can be fluid coupled with the second chromatography component. The bacterial filtration component can be down-stream or down-flow of the second chromatography component. The bacterial filtration component can be fluid coupled with the first chromatography component. The bacterial filtration component can be down-stream or down-flow of the first chromatography component. The bacterial filtration component can be fluid coupled with the buffer exchange component. The bacterial filtration component can be down-stream or down-flow of the buffer exchange component. The bacterial filtration component can be fluid coupled with the sterile filtration component. The bacterial filtration component can be down-stream or down-flow of the sterile filtration component. The bacterial filtration component can be fluid coupled with the extraction component. The bacterial filtration component can be down-stream or down-flow of the extraction component. The bacterial filtration component can be or comprise a 0.2 micron or 0.1 micron filter member. The bacterial filtration component can be configured for continuous flow processing.

The sample processing assembly can include an optional viral filtration component. The viral filtration component can be fluid coupled with the bacterial filtration component. The viral filtration component can be down-stream or down-flow of the bacterial filtration component. The viral filtration component can be fluid coupled with the second chromatography component. The viral filtration component can be down-stream or down-flow of the second chromatography component. The viral filtration component can be fluid coupled with the first chromatography component. The viral filtration component can be down-stream or down-flow of the first chromatography component. The viral filtration component can be fluid coupled with the buffer exchange component. The viral filtration component can be down-stream or down-flow of the buffer exchange component. The viral filtration component can be fluid coupled with the sterile filtration component. The viral filtration component can be down-stream or down-flow of the sterile filtration component. The viral filtration component can be fluid coupled with the extraction component. The viral filtration component can be down-stream or down-flow of the extraction component. The viral filtration component can be or comprise a 0.2 micron or 0.1 micron filter member. The viral filtration component can be configured for continuous flow processing. The viral filtration component can be or comprise a 50-70 nm filter member. The viral filtration component can be configured for continuous flow processing. In at least one embodiment, the bacterial filtration component can be disposed at or comprise an inlet to the viral filtration component.

It is noted that embodiments of the present disclosure can comprise one or more combinations of two or more of the features described herein. As used herein, "feature(s)" and similar terms can include, for example, systems, assemblies, devices, components, elements, members, parts, portions, ingredients, methods, steps, configurations, parameters, properties, and so forth. Each of the foregoing and other features can be combined and/or combinable with another one or more other features in any suitable order (of down-stream flow), with or without one or more additional features disposed therebetween and in any suitable order (of down-stream flow), to form unique embodiments, each of which is contemplated in the present disclosure.

For instance, some embodiments can include a sample concentrating element (e.g., a (tangential flow) filtration component) fluid coupled with a (multi-stage, liquid-liquid) extraction component (or a container assembly thereof). Some embodiments can include a particulate removal assembly fluid coupled with a sample concentrating element, with or without an extraction component fluid coupled with the sample concentrating element. Some embodiments can include a bioreactor system fluid coupled with (a mixing compartment of) a particulate removal system, with or without a sample concentrating element fluid coupled with (the settling compartment of) the particulate removal system. Some embodiments can include a bioreactor system fluid coupled with a sample concentrating element, with a particulate removal system fluid coupled therebetween.

Some embodiments can include a bioreactor system fluid coupled with a (multi-stage, liquid-liquid) extraction component (or a container assembly thereof), with a particulate removal system fluid coupled therebetween, with or without a sample concentrating element fluid coupled between the particulate removal system and the (multi-stage, liquid-liquid) extraction component (or a container assembly thereof). Some embodiments can include a bioreactor system fluid coupled with a sample processing assembly (or one or more features thereof), with a particulate removal system and a (multi-stage, liquid-liquid) extraction component (or a container assembly thereof) fluid coupled therebetween, with or without a sample concentrating element fluid coupled between the particulate removal system and the (multi-stage, liquid-liquid) extraction component (or a container assembly thereof).

Some embodiments can include a particulate removal assembly fluid coupled with a sample processing assembly (or one or more features thereof), with a (multi-stage, liquid-liquid) extraction component (or a container assembly thereof) fluid coupled therebetween, with or without a sample concentrating element fluid coupled between the particulate removal system and the (multi-stage, liquid-liquid) extraction component (or a container assembly thereof). Some embodiments can include a sample processing assembly (or one or more features thereof) fluid coupled with a (multi-stage, liquid-liquid) extraction component, with or without a sample concentrating element (e.g., (tangential flow) filtration component), particulate removal assembly, and/or bioreactor assembly fluid coupled with the extraction component.

Some embodiments can include a fluid sample or a biological molecule. Some embodiments can include a fluid sample comprising a first fluid phase, a second fluid phase, a biological molecule, and one or more molecular contaminants. The fluid sample can be disposed in or flowing through the system or one or more components thereof. In some embodiments, the fluid sample or biological molecule can flow or pass through any of the above-described or other embodiments having two or more fluid coupled features.

It is further noted that not all of the features described herein are essential to the implementation of each and every embodiment of the present disclosure. For instance, in some embodiments, a sample processing assembly need not include a sterile filtration component (up-stream and/or up-flow of the other components thereof). In particular, certain embodiments can maintain sterility of the fluid sample such that one or more intermediate sterile filtration steps or components are not required. In certain continuous flow embodiments of the present disclosure, for example, a sterile sample can be introduced into an illustrative purification system or provided in an illustrative method. The sample may not be exposed to non-sterile environment (e.g., outside of the system) through at least a portion of the system or method (e.g., through completion thereof).

Some embodiments can include a method of purifying a biological molecule. Some embodiments can include a method of purifying a biological molecule in a (continuous flow) sample purification system. Some embodiments can include mixing a biological sample with a first fluid phase and a second fluid phase to form a first mixture. The biological sample can comprise (an amount of) a biological molecule and (an amount of) a particulate contaminant. Some embodiments can include allowing the first mixture to settle into a first phase body (e.g., comprising the first phase) and a second phase body (e.g., comprising the second phase). The first phase body can be separable from the second phase body. For instance, the first phase (or first phase body) can be immiscible with the second phase (or second phase body), such that the phases can be separated (e.g., through or following phase settling). In at least one embodiment, the first phase (or first phase body) can have a density (or buoyancy) that is different from the density (or buoyancy) of the second phase (or second phase body), such that the first phase body can settles above or below the second phase body. At least a portion of (the amount of) the biological molecule can be disposed in the first phase body. At least a portion of (the amount of) the particulate contaminant can be disposed in the second phase body.

In some embodiments, greater than about 50%, 55%, 60%, 65%, 70%, 75%, 80%, 85%, 90%, 95%, 96%, 97%, 98%, or 99% of the amount of the biological molecule can be disposed in the first phase body. In some embodiments, greater than about 50%, 55%, 60%, 65%, 70%, 75%, 80%, 85%, 90%, 95%, 96%, 97%, 98%, or 99% of the amount of the particulate contaminant can be disposed in the second phase body. In some embodiments, the first phase body can have less than about 20%, 15%, 10%, 8%, 6%, 5%, 4%, 3%, 2%, or 1% second phase by volume disposed therein. In some embodiments, the second phase body can have less than about 20%, 15%, 10%, 8%, 6%, 5%, 4%, 3%, 2%, or 1% first phase by volume disposed therein. In some embodiments, the biological molecule can have a concentration greater than about 10 mg/L, 20 mg/L, 30 mg/L, 40 mg/L, 50 mg/L, 60 mg/L, 80 mg/L, 100 mg/L, 120 mg/L, 150 mg/L, 175 mg/L, 200 mg/L, 250 mg/L, 300 mg/L, 500 mg/L, or more, in the first in the first phase body.

In some embodiments, mixing comprises forming an emulsion of the first phase and the second phase. In some embodiments, mixing or emulsifying can be performed by means for mixing. The means for mixing can be disposed in a particulate removal assembly or sample mixing compartment thereof. The mixing or emulsifying can be performed in the particulate removal assembly or sample mixing compartment thereof. The first mixture can settle. In some embodiments, settling of the first mixture can be performed in the particulate removal assembly or settling compartment thereof. The first mixture can be allowed to settle. In some embodiments, allowing the first mixture to settle can be performed in the particulate removal assembly or settling compartment thereof.

In some embodiments, during one or more period of time: the biological molecule, particulate contaminant, first fluid phase, and second fluid phase can be (continuously) introduced into the mixing compartment; the fluid sample or biological molecule, particulate contaminant, first fluid phase, and second fluid phase can be (continuously) mixed by the means for mixing, thereby (continuously) forming a first mixture; the fluid sample or first mixture can (continuously) flow from the mixing compartment to the settling compartment; the fluid sample or first mixture can (be allowed or permitted to) (continuously) settle into a first phase body and a second phase body (e.g., in the settling compartment); the first phase body can (continuously) fluidly exit the settling compartment (e.g., through a first phase body outlet); and/or the second phase body can (continuously) fluidly exit the settling compartment (e.g., through a second phase body outlet).

Some embodiments can include separating the first phase body from the second phase body, optionally concentrating the portion of the amount of the biological molecule in the first phase body (e.g. in a sample concentrating element), and/or extracting at least part of the portion of the amount of the biological molecule from the first phase body (e.g., in a (multi-stage liquid-liquid) extraction component. For instance, the (first phase body outlet or second phase body outlet of the) particulate removal assembly (or settling compartment thereof) can be fluid coupled with the sample concentrating element or fluid sample inlet thereof. The sample concentrating element or concentrated product outlet thereof can be fluid coupled with (a first inlet or a second inlet of) the extraction component or container assembly thereof. In some embodiments, extracting can include adding one or more (additional) components to the (optionally concentrated) first phase body. The one or more components can include water. The one or more components can include a primary, polyatomic, and/or organic salt, such as phosphate, sulfate, carbonate, citrate, etc. The one or more components can include a secondary, monoatomic, and/or inorganic salt, such as (Na)Cl, (K)Cl, chloride (ion) source, or salt formed of one or more monoatomic ions. The one or more components can include one or more additional or other components.

In some embodiments, extracting can include providing a third phase. The third phase can have a third density. The third density can be different from or than the (first) density of the first phase or first phase body. The third density can be different from or than the (second) density of the second phase or second phase body. The first phase and the third phase can be immiscible. In some embodiments, extracting can include mixing the first phase body with the third phase. In some embodiments, mixing comprises forming an emulsion of the first phase and the third phase. In some embodiments, mixing or emulsifying can be performed by means for mixing. The means for mixing can be disposed in an extraction component. The mixing or emulsifying can be performed in the extraction component.

The mixed first phase body an third phase can form a second mixture. The second mixture can comprise the first phase, the third phase, and the portion of the amount of the biological molecule. In some embodiments, the second mixture can comprise the optional (additional) component(s). In some embodiments, the second mixture can comprise one or more molecular contaminants. In some embodiments, extracting can include allowing the second mixture to settle into a first phase portion and a third phase portion. The third phase portion can include the third phase and at least part of the portion of the amount of the biological molecule. The first phase portion can include the first phase. The first phase portion can include the optional (additional) component(s). The first phase portion can include one or more molecular contaminants. In some embodiments, the one or more molecular contaminants can be (substantially) smaller than the particulate contaminant(s). In some embodiments, the one or more molecular contaminants can have a size (substantially) smaller than the particulate contaminant(s).

Some embodiments can include applying an acoustic wave to a portion of the second mixture. The acoustic wave can be applied by mans of an acoustic settler. The acoustic wave can enhance formation of the first phase portion and/or the third phase portion. Some embodiments can include separating the third phase portion from the first phase portion. In some embodiments, extracting can include applying an acoustic wave and/or separating the third phase portion from the first phase portion. In some embodiments, at least some of the extracting can be performed in an extraction component.

Some embodiments can include performing sterile filtration of the third phase portion. Sterile filtration can be performed by means of a sterile filtration component. Some embodiments can include performing a liquid buffer exchange on the third phase portion. Performing a liquid buffer exchange on the third phase portion can produce a chromatography sample. The chromatography sample can include at least some of the biological molecule disposed in a chromatography buffer.

Some embodiments can include performing a first ion exchange chromatographic purification step on the chromatography sample. The first ion exchange chromatographic purification step can be or comprise a first of a multi-modal cation exchange or multi-modal anion exchange purification step. The first ion exchange chromatographic purification step can be performed by means of a first ion exchange chromatographic purification device or assembly. The first ion exchange chromatographic purification device or assembly can be or comprise a first multi-modal anion or multi-modal cation exchange chromatography element.

Some embodiments can include performing an optional second ion exchange chromatographic purification step on the chromatography sample. The second ion exchange chromatographic purification step can be performed by means of a second ion exchange chromatographic purification device or assembly. The second ion exchange chromatographic purification device or assembly can be or comprise a second multi-modal anion or multi-modal cation exchange chromatography element. The second multi-modal anion or multi-modal cation exchange chromatography element can be opposite the first multi-modal anion or multi-modal cation exchange chromatography element.

Some embodiments can include performing bacterial filtration on the fluid sample. Some embodiments can include performing bacterial filtration on the chromatography sample. Some embodiments can include performing bacterial filtration on the chromatography sample after the first ion exchange chromatographic purification step. Some embodiments can include performing bacterial filtration on the chromatography sample after the second ion exchange chromatographic purification step. Bacterial filtration can be performing by means of filter. The filter can be or comprise a 0.2 micron or 0.1 micron filter member in some embodiments.

Some embodiments can include performing viral filtration on the fluid sample. Some embodiments can include performing viral filtration on the chromatography sample. Some embodiments can include performing viral filtration on the chromatography sample after the first ion exchange chromatographic purification step. Some embodiments can include performing viral filtration on the chromatography sample after the second ion exchange chromatographic purification step. Some embodiments can include performing viral filtration on the chromatography sample after performing bacterial filtration. Viral filtration can be performing by means of filter. The filter can be or comprise a 50-70 nm filter member in some embodiments.

Some embodiments can include producing the biological molecule in cell culture. The cell culture can be or comprise a suspension cell culture. The cell culture can comprise a culture medium and cells growing on or in the medium. The cell culture can comprise a liquid culture medium and cells growing in the liquid medium. In some embodiments, mixing the biological sample with the first fluid phase and the second fluid phase to form the first mixture can comprise mixing at least a portion of the cell culture with the first phase and the second phase. The first mixture can include the first phase, the second fluid phase, and the portion of the cell culture. The portion of the cell culture can be comprised of the culture medium and one or more components disposed in the medium. The one or more components disposed in the medium can include an amount of the biological molecule. The one or more components disposed in the medium can include one or more particulate contaminants. The one or more components disposed in the medium can include one or more molecular contaminants. In at least one embodiment, at least some of the cells of the cell culture can be retained in the cell culture. The cells can be retained in the cell culture by means of a cell retention device (of a bioreactor assembly).

In some embodiments, the cell culture can be disposed in a bioreactor. In some embodiments, producing the biological molecule can be performed in a bioreactor. The bioreactor can be adapter for perfusion cell culture. The culture can comprise a perfusion cell culture. In some embodiments, mixing the biological sample with the first fluid phase and the second fluid phase to form the first mixture can comprise (continuously) mixing a portion or inlet sample stream of the cell culture with the first phase and the second phase.

Some embodiments may include any of the features, options, and/or possibilities set out elsewhere in the present disclosure, including in other aspects or embodiments of the present disclosure. It is also noted that each of the foregoing, following, and/or other features described herein represent a distinct embodiment of the present disclosure. Moreover, combinations of any two or more of such features represent distinct embodiments of the present disclosure. Such features or embodiments can also be combined in any suitable combination and/or order without departing from the scope of this disclosure. Thus, each of the features described herein can be combinable with any one or more other features described herein in any suitable combination and/or order. Accordingly, the present disclosure is not limited to the specific combinations of exemplary embodiments described in detail herein.

Additional features and advantages of exemplary embodiments of the present disclosure will be set forth in the description which follows, and in part will be obvious from the description, or may be learned by the practice of such exemplary embodiments. The features and advantages of such embodiments may be realized and obtained by means of the instruments and combinations particularly pointed out in the appended claims. These and other features will become more fully apparent from the following description and appended claims, or may be learned by the practice of such exemplary embodiments as set forth hereinafter.

BRIEF DESCRIPTION OF THE DRAWINGS

In order to describe the manner in which certain advantages and features of the present disclosure can be obtained, a description of the disclosure will be rendered by reference to specific embodiments thereof which are illustrated in the appended drawings. Understanding that these drawings depict only typical embodiments of the disclosure and are not therefore to be considered to be limiting of its scope, the disclosure will be described and explained with additional specificity and detail through the use of the accompanying drawings in which.

DETAILED DESCRIPTION

Figure 1:
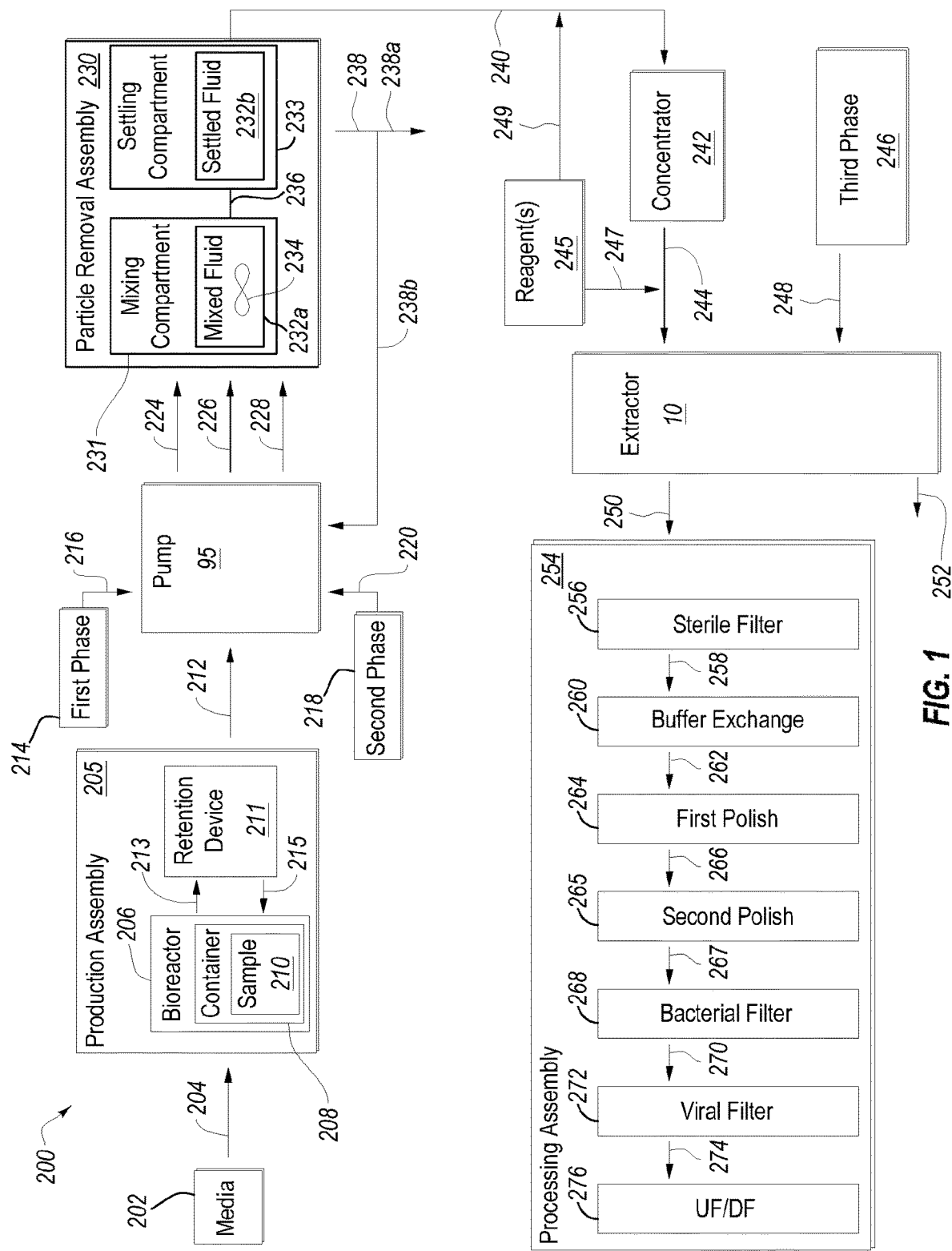
FIG. 1 is a schematic diagram depicting a sample purification system according to an embodiment of the present disclosure.

Before describing various embodiments of the present disclosure in detail, it is to be understood that this disclosure is not limited to the specific features of the particularly exemplified embodiments that may vary from one embodiment to the next. Thus, while certain embodiments of the present disclosure will be described in detail, with reference to specific features thereof, the descriptions are illustrative and are not to be construed as limiting the scope of the present disclosure and/or the claimed invention. In addition, the terminology used herein is for the purpose of describing the embodiments, and is not necessarily intended to limit the scope of the present disclosure and/or the claimed invention.

Unless defined otherwise, all technical and scientific terms used herein have the same meaning as commonly understood by one of ordinary skill in the art to which the present disclosure pertains.

Various aspects of the present disclosure, including systems, methods, and/or products may be illustrated with reference to one or more embodiments or implementations, which are exemplary in nature. As used herein, the terms "embodiment" and implementation" mean "serving as an example, instance, or illustration," and should not necessarily be construed as preferred or advantageous over other aspects disclosed herein. In addition, reference to an "implementation" of the present disclosure or invention includes a specific reference to one or more embodiments thereof, and vice versa, and is intended to provide illustrative examples without limiting the scope of the invention, which is indicated by the appended claims rather than by the description thereof.

As used herein, the term "systems" also contemplates devices, apparatus, compositions, assemblies, kits, and so forth. Similarly, the term "method" also contemplates processes, procedures, steps, and so forth. Moreover, the term "products" also contemplates devices, apparatus, compositions, assemblies, kits, and so forth.

As used throughout this application the words "can" and "may" are used in a permissive sense (i.e., meaning having the potential to), rather than the mandatory sense (i.e., meaning must). Additionally, the terms "including," "having," "involving," "containing," "characterized by," as well as variants thereof (e.g., "includes," "has," and "involves," "contains," etc.), and similar terms as used herein, including the claims, shall be inclusive and/or open-ended, shall have the same meaning as the word "comprising" and variants thereof (e.g., "comprise" and "comprises"), and do not exclude additional, un-recited elements or method steps, illustratively.

As used in this specification and the appended claims, the singular forms "a," "an" and "the also contemplate plural referents, unless the context clearly dictates otherwise. Thus, for example, reference to a "molecule" includes one, two, or more molecules. Similarly, reference to a plurality of referents should be interpreted as comprising a single referent and/or a plurality of referents unless the content and/or context clearly dictate otherwise. Thus, reference to "molecules" does not necessarily require a plurality of such molecules. Instead, it will be appreciated that independent of conjugation; one or more molecules are contemplated herein.

Various aspects of the present disclosure can be illustrated by describing components that are bound, coupled, attached, connected, and/or joined together. As used herein, the terms "bound," "coupled", "attached", "connected," and/or "joined" are used to indicate either a direct association between two components or, where appropriate, an indirect association with one another through intervening or intermediate components. In contrast, when a component is referred to as being "directly bound," "directly coupled", "directly attached", "directly connected," and/or "directly joined" to another component, no intervening elements are present or contemplated.

Furthermore, aspects of the present disclosure can be illustrated by describing components that are flowable, in fluid communication, and/or fluid(ly) coupled, connected, etc. Such fluid communication or connection will be understood by those skilled in the art to imply at least one route or flow path between the components. Generally, such fluid communication or connection involves at least one fluid inlet and/or fluid outlet disposed between components in fluid communication and/or for effectuating the fluid connection. In addition, "fluid connections," "fluid couplings," and the like, as used herein, can comprise fluid flow paths, such as those found within fluid lines, tubes, etc.

It will also be appreciated that where two or more values, or a range of values (e.g., less than, greater than, at least, and/or up to a certain value, and/or between two recited values) is disclosed or recited, any specific value or range of values falling within the disclosed values or range of values is likewise disclosed and contemplated herein. Thus, disclosure of an illustrative measurement (e.g., volume, concentration, etc.) that is less than or equal to about 10 units or between 0 and 10 units includes, illustratively, a specific disclosure of: (i) a measurement of 9 units, 5 units, 1 units, or any other value between 0 and 10 units, including 0 units and/or 10 units; and/or (ii) a measurement between 9 units and 1 units, between 8 units and 2 units, between 6 units and 4 units, and/or any other range of values between 0 and 10 units.

As used herein, directional and positional terms, such as "top," "bottom," "left," "right," "up," "down," "upper," "lower," "proximal," "distal" and the like are used herein solely to indicate relative directions or positions and are not otherwise intended to limit the scope of the disclosure and/or claimed invention. However, in certain embodiments, the ordering and/or positioning of certain method steps and/or system components can contribute to and even determine the effectiveness and/or functionality of the embodiment. For instance, the fluid connection of one component between two other (otherwise unconnected) components can provide a fluid pathway extending through all three components, as well as additional components connected thereto. In addition, performance of a first step before a second step can provide useful pre-processing and can alter the outcome of the second step.

To facilitate understanding, like references (i.e., like naming and/or numbering of components and/or elements) have been used, where possible, to designate like components and/or elements common to the written description and/or figures. Specifically, in the exemplary embodiments illustrated in the figures, like structures, or structures with like functions, will be provided with similar reference designations, where possible. Specific language will also be used herein to describe the exemplary embodiments. Nevertheless it will be understood that no limitation of the scope of the disclosure is thereby intended. Rather, it is to be understood that the language used to describe the exemplary embodiments is illustrative only and is not to be construed as limiting the scope of the disclosure (unless such language is expressly described herein as essential).

Furthermore, alternative configurations of a particular element may each include separate letters appended to the element number. Accordingly, an appended letter can be used to designate an alternative design, structure, function, implementation, and/or embodiment of an element or feature without an appended letter. Similarly, multiple instances of an element and/or sub-elements of a parent element may each include separate letters appended to the element number. In each case, a description of the labeled element without the use of an appended letter can generally refer to instances of the element or any one of the alternative elements. Element labels including an appended letter can be used to refer to a specific instance of the element or to distinguish or draw attention to multiple uses of the element. However, element labels including an appended letter are not meant to be limited to the specific and/or particular embodiment(s) in which they are illustrated. In other words, reference to a specific feature in relation to one embodiment should not be construed as being limited to applications only within said embodiment.

The headings used herein are for organizational purposes only and are not meant to be used to limit the scope of the description or the claims.

The present disclosure relates to systems, methods, and products for sample purification, and more specifically, sample purification in a continuous flow system, method, and/or product. Some embodiments include liquid-liquid extraction of a biological molecule, such as an immunoglobulin. Certain embodiments involve continuous-flow, (aqueous) two-phase, and/or single-stage extraction or removal of particulate material from a biological sample or molecule. Embodiments can include mixing a biological sample with a first fluid phase and an immiscible second fluid phase to form a mixture, the biological sample comprising a biological molecule and a particulate contaminant, and allowing the mixture to settle into a first phase body comprising the first phase and the biological molecule and a second phase body comprising the second phase and the particulate contaminant.

Embodiments can also include a purification system. In some embodiments, the system includes a (continuous flow) particle removal assembly comprising a (two-phase) sample mixing component fluid coupled with a sample settling component. A two-phase buffer system comprising a first fluid phase and a second fluid phase can be mixed with a biological sample comprising a biological molecule (of interest) and one or more particulate contaminants in the mixing component (such that the molecule becomes disposed in the first phase and the contaminant becomes disposed in the second phase). Some embodiments include two or more products fluid coupled together, such that a fluid (e.g., liquid) sample can flow (continuously) therebetween (e.g., from a first component, to a second component, and optionally, to a third (or more) component). The two or more coupled products can form a sample purification system or assembly.

In at least one embodiment, the terms "form," "forming," and the like are open-ended, such that components that (are combined, mixed, coupled, etc. so as to) form a system, assembly, mixture, etc. do not necessarily constitute the entire system, assembly, mixture, etc. Accordingly, the system, assembly, mixture, etc. can comprise said components, without, necessarily, consisting, either entirely or essentially, of said components.

As used herein, the term "systems" also contemplates devices, apparatus, compositions, assemblies, kits, and so forth. Similarly, the term "products" also contemplates devices, apparatus, compositions, assemblies, kits, and so forth. Moreover, the term "methods" also contemplates processes, procedures, steps, and so forth.

As used herein, the terms "mixture," "fluid mixture," "liquid mixture," and the like can comprise any suitable composition and/or combination of the specific components thereof. For instance, a fluid or liquid mixture can comprise a solution, suspension, colloid, emulsion, or other mixture of liquid and non-liquid components (e.g., in which a (at least partially soluble) biological molecule and/or a (at least partially insoluble) particulate contaminant are disposed in a fluid (e.g., liquid) medium).

Moreover, fluids and/or liquids according to the present disclosure can have a variety of properties. Liquids can vary in viscosity, density, ionic strength, hydrophobicity, hydrogen bond capacity, melting point, boiling point, and/or other characteristics. A fluid or liquid phase, as used herein, has a (defined) combination of such characteristics, as understood by those skilled in the art.

As used herein, the term "biological component" refers to organisms (e.g., microbes, such as bacteria, yeast, etc., plants, animals, etc.), whether living or non-living, and/or components thereof or produced thereby, including cells, molecules/compounds (e.g., nucleic acids, proteins, fats, fatty acids, etc.), or combination(s), aggregate(s), crystal(s), or precipitate(s) thereof.

The terms "molecule," "biological molecule," "molecule of interest," and similar terms also includes compounds that comprise multiple molecules. Such molecules can be (solubly or colloidally) disposed in a liquid carrier (e.g., a medium or phase). For instance, the molecule can be disposed in solution and/or evenly dispersed in a colloid. Molecules can remain disposed in the liquid carries without settling out. Generally, such molecules are less than 0.2 micron in size. In addition, reference to a (single) molecule of interest includes a specific reference to a population or amount of the molecule of interest, as well as additional molecule(s) of interest. Thus, reference to a "molecule" or "molecule of interest" should not be construed as being limited to a (single) molecule, per se.

The terms "particle," "particulate material," "particulate contaminant," and the like refer to solid matter that can be suspended in and/or settled out of a liquid carrier. Generally, such particles are greater than about 0.2 micron in size (e.g., diameter, cross-sectional length or width, etc.). Such particles can comprise cells, cellular fragments, cellular (structural) material, molecular aggregates, precipitates, or crystals of molecules.

It will also be appreciated that "contaminant" and similar terms refer to an impurity (e.g., heterologous substance) in a mixture and is not necessarily intended to imply a waste product. Rather, a contaminant refers to a component that adulterates a pure sample, regardless of the value or desirability of the contaminant. The term "molecular contaminant" and the like refers to non-particulate matter that can be suspended and/or soluble in a liquid carrier. Generally, such particles are less than about 0.2 micron in size (e.g., diameter, cross-sectional length or width, etc.). Such molecular contaminant can comprise proteins, nucleic acids, fatty acids, etc.

In certain embodiments, the inventive systems (or portion(s) thereof) are designed so that at least some components that contact the material being processed can be disposed of after each use. As a result, some embodiments of the present disclosure significantly reduce the burden of cleaning and sterilization required by conventional stainless steel mixing and processing systems. This feature also ensures that sterility can be consistently maintained during repeated processing of multiple batches. In view of the foregoing, and the fact that certain embodiments can be easily scalable, relatively low cost, and easily operated, some embodiments of the present disclosure can be used in a variety of industrial and research facilities that previously outsourced such processing. Furthermore, as used herein, reference to one or more "disposable" components contemplates that the component(s) are designed for and/or commercially compatible with single-use applications. Thus, while strictly speaking, all matter is technically disposable, those skilled in the art will appreciate that a disposable and/or single-use designation comprises more than a mere intended use. Rather, such components are structurally adapted for economic disposability after a single use.

Reference will now be made the figures of the present disclosure. It is noted that the figures are not necessarily drawn to scale and that the size, orientation, position, and/or relationship of or between various components can be altered in some embodiments without departing from the scope of this disclosure.

I. SYSTEMS

The illustrative systems described herein, as well as the features thereof, are exemplary of certain embodiments of the present disclosure. Some embodiments need not include each feature described herein. Moreover, said features need not be arranged in the order described and/or depicted herein (e.g., in FIG. 1). Rather, some embodiments can comprise features arranged and/or disposed in any suitable order. It is noted that each system and/or feature is presented separately and is contemplated herein independent of the context (e.g., order, connection, etc.) in which it is presented.

Depicted in FIG. 1 is a schematic representation of one embodiment of a sample purification system 200 incorporating some features of the present disclosure. It will be appreciated that sample purification system 200 need not include each and every component, any particular combination of components, and/or the order of components depicted in FIG. 1. Accordingly, the following description of sample purification system 200 is intended to disclose various optional components, which may be combined (or combinable) in any suitable combinations and/or order. In general, sample purification system 200 comprises a particulate removal assembly 230 that is optionally fluid coupled with a (up-stream or up-flow) biological component production assembly 205 and/or an (e.g., down-stream or down-flow) extraction component 10. System 200 can further comprises one or more fluid pumps (e.g., peristaltic) 95, sample concentrating components 242, and/or sample processing assemblies 254. One or more fluid connections or couplings (e.g., fluid lines or tubes, etc.) can connect components of system 200 and/or introduce fluid(s) or other components (e.g., reagents) into the same. Various components of sample purification system 200 will now be discussed in greater detail with reference to the figures.

A. Bioreactor Assemblies

In at least one embodiment, biological component production assembly 206 can comprise a bioreactor assembly. As depicted in FIG. 1, bioreactor assembly 205 comprises a bioreactor (or tank) 206. Bioreactor assembly 205 also includes a production container 208. Production container 208 can comprise a flexible, sterilizable, disposable, and/or single-use bioreactor bag in some embodiments. Production container 208 can be disposed inside bioreactor (or tank) 206. Other features of bioreactor 206 and/or production container 208 may be known and/or understood by one of ordinary skill in the art.

A biological sample 210 is disposed in container 208. In at least one embodiment, biological sample 210 is or comprises (at least a portion of) a (suspension) cell culture. The cell culture can comprise biological cells (growing) in a (liquid) culture medium. In certain embodiments, the biological sample includes the cells or cellular (structural) material (e.g., one or more structural components of the cells). For instance, the cells themselves can be or comprise a product of interest. In alternative systems, the cells produce a biological molecule of interest (e.g., that can be purified away from contaminants, such as the cells or cellular material, cell culture medium, and other components). Accordingly, biological sample 210 can also or to alternatively comprise one or more biological molecules and/or (suspension) cell culture media.

In at least one embodiment, assembly 205 can comprise a batch cell culture system. The cell culture 210 can be grown and harvested in batch for purification of the biological molecule. In some embodiments, assembly 205 can comprise a perfusion cell culture system and/or be configured for perfusion cell culture. As understood by those skilled in the art, perfusion cell cultures aim to grow biological cells to a production density (or within a range of densities) and then continuously or periodically remove a (volumetric) amount of the cell culture (e.g., culture medium and one or more components disposed therein, possibly including cells, portion(s) of cells, or cellular components, biological molecules of interest, particulate and/or molecular contaminants, etc.) at a rate identical or similar to a rate at which new (or fresh) culture medium is added to the perfusion cell culture. By so doing, the cell density in the perfusion culture can be maintained at a production density or in a production density range (such as the densities described above). In some embodiments, perfusion cell culture fluid is harvested while maintaining the cells in the reactor. However, small particles can co-localize and/or be removed with the culture fluid. In addition, it can also be beneficial to bleed off a portion of the live cells to maintain a given production rate or cell density (e.g., if the culture is growing and/or expanding).

The cells can comprise (human) B-cells, T-cells, or any other suitable cell type or cell line, including (human, plant, or animal) tissue culture or cell culture cells, microbial cells, bacterial cells, yeast cells, fungal cells, etc. In some embodiments, the cells can be greater than about 1 μm in size. As used herein, a size measured in linear metric units (e.g., nm, μm, etc.) can refer to a diameter or other (maximal or average) measurement across the component. In certain embodiments, the cells can be greater than, between, or about 1 μm, 5 μm, 10 μm, 15 μm, 20 μm, 25 μm, or more in size.

In at least one embodiment, the cells can be grown to a concentration or density of up to, at least, greater than, between, and/or about 1, 2, 5, 10, 15, 20, 25, 30, 40, 50, 60, 70, 80, 90, or 100 million cells per mL of cell suspension culture (or liquid medium thereof). In some embodiments, a batch cell culture can be grown to and/or harvested at a concentration or density of up to, at least, greater than, between, and/or about 1, 2, 5, 10, 15, 20, 25, 30, 40, or 50 million cells per mL of cell suspension culture (or liquid medium thereof). In some embodiments, a perfusion cell culture can be grown to and/or (begin to be (continuously)) harvested at a concentration or density of up to, at least, greater than, between, and/or about 20, 25, 30, 40, 50, 60, 70, 80, 90, or 100 million cells per mL of cell suspension culture (or liquid medium thereof).

The cells can also or alternatively be grown to a concentration or density of up to, at least, greater than, between, and/or about 1%, 2%, 5%, 10%, 15%, 20%, 25%, or 30% of the cell culture volume or weight. The cells can also or alternatively be grown to a concentration or density greater than about 10% Packed Cell Volume (PCV), wherein % PCV=(wet) cell volume×100/total culture volume. For instance, the cells can be grown to a (production) density greater than or equal to about 15%, 20%, 25%, 30%, 35%, 40%, 45%, 50%, 55%, 60%, or 65% PCV.

In some embodiments, the total particulate load on the clarification two phase system can depend on how long the culture has been running and the cell viability upon harvest. If the cell viability is low, then the particulate load (especially of small particles (e.g., below 2 microns)) can be much greater. One means of quantifying or quantitating particulate load and cell density together can be to measure the optical density of the cell culture. Optical density can be determined by measuring the visible light scattering properties of the cell culture (e.g., in Nephelometric Turbidity Units (or NTU)). In some embodiments, the cells can be grown to and/or harvested at an optical density of 100, 200, 500, 1000, 1500, 2000, 3000, 4000, 5000, 6000, 8000, or more NTU. In some embodiments, a batch cell culture can be grown to and/or harvested at an optical density of between 100 and 3000 NTUs, preferably between 200 and 2000 NTUs. In some embodiments, a perfusion cell culture can be grown to and/or (begin to be (continuously)) harvested at an optical density of between 500 and 6000 NTUs, preferably between 1000 and 5000 NTUs.

In at least one embodiment, one or more of the foregoing or other concentration or density, or range thereof, can comprise an (optimal) biological molecule production density.

The biological molecule can comprise any suitable molecular component. In some embodiments, the biological molecule can be or comprise a peptide or protein, such as a hormone, monoclonal antibody (mAb), polyclonal antibody, enzyme, etc. In at least one embodiment, the biological molecule comprises at least one immunoglobulin (Ig), such as IgA, IgD, IgE, IgG, and/or IgM. In other embodiments, the biological component can comprise a nucleic acid. In other embodiments, the biological component can comprise a fatty acid. In other embodiments, the biological component can comprise an antibiotic. In other embodiments, the biological component can comprise a painkiller. In other embodiments, the biological component can comprise a sedative. Thus, in some embodiments, the biological component can comprises a protein, monoclonal antibody, enzyme, nucleic acid, peptide, antibiotic, painkiller, or sedative, etc.

In some embodiments, the biological molecule is less than about 200 nm in size. For instance, the biological molecule can be less than, between, or about 1 nm, 5 nm, 10 nm, 12 nm, 15 nm, 20 nm, 25 nm, 50 nm, 100 nm, 150 nm, or 200 nm in size. In one or more embodiments, the biological molecule can be between about 1-200 nm, 5-100 nm, 8-25 nm, or 10-15 nm in size. The biological molecule can also or alternatively be or have a molecular weight less than about 1000 kDa. For instance, the biological molecule can be less than, between, or about 5 kDa, 10 kDa, 25 kDa, 50 kDa, 100 kDa, 150 kDa, 155 kDa, 160 kDa, 175 kDa, 200 kDa, 225 kDa, or 240 kDa, 250 kDa, 300 kDa, 400 kDa, 500 kDa, 600 kDa, 700 kDa, 800 kDa, 900 kDa, or 1000 kDa.

In certain embodiments, the cells can produce the biological molecule in suspension cell culture such that the biological molecule is in a concentration of greater than about 0.25 g/L of cell culture. For instance, the cells and/or cell culture can produced the biological molecule is in a concentration of greater than about 0.25 g/L, 0.5 g/L, 1 g/L, 2 g/L, 3 g/L, 4 g/L, 5 g/L, 10 g/L, 15 g/L, 20 g/L, 25 g/L, 30 g/L, 40 g/L, or 50 g/L of cell culture (or liquid medium thereof). In at least one embodiment, the biological molecule can be retained in the cells. In some embodiments, however, the cells can expel (e.g., excrete, secrete, release, etc.) at least some of the biological molecule into the culture medium. Thus, the biological molecule concentration can be measured in or as a function of the (liquid) culture medium in certain embodiments.

In some embodiments, a perfusion cell culture (or the cells thereof) can produce the biological molecule at a rate of at least, greater than, equal to, and/or between about 100 g, 250 g, 500 g, 750 g, 1 kg, 2 kg, 2.5 kg, 3 kg, 4 kg, 5 kg, 6 kg, or more in less than, equal to, and/or between about (every) 1, 2, 6, 12, 18, 24, 36, or 48 hours of continuous perfusions cell culture time.

FIG. 1 also illustrates a cell filtration or cell retention device 211 (e.g., fluid coupled with bioreactor 206 by means of at least one fluid connection 213). Cell retention device 211 can (be configured to) retain cells (and, optionally, larger particles) within assembly 205. For instance, cell retention device 211 can (be configured to) return or recirculate a cell-containing portion of (a harvested amount of the) cell culture (or medium thereof) to (or into) bioreactor 206 or container 208 thereof (e.g., by means of a fluid connection 215). Accordingly, fluid connection 213 can be configured for removing and fluid connection 215 can be configured for returning at least a portion of the cells (and large particles) from and back to bioreactor 206.

FIG. 1 also illustrates a (fresh) medium source 202 and a fluid connection 204 for delivering (fresh, liquid) medium into assembly 205, bioreactor 206, or container 208 thereof. The delivery of (fresh, liquid) medium into container 208 can (be configured to) maintain the perfusion cell culture (e.g., of biological sample 210) at a (constant) volume (or within a range of volumes), as understood by those skilled in the art, as a portion of the perfusion cell culture (e.g., biological sample 210) is removed from bioreactor 206 or container 208 thereof (e.g., by means of a fluid connection 212). The delivery of (fresh, liquid) medium into container 208 can take into account the returned or recirculated amount of culture from cell retention device 211. The cells concentration or density can thereby be can be maintained at an (optimal) production density or in an (optimal) production density range (such as the densities described above). It will also be appreciated that perfusion cell culture bioreactor assembly 205 can be or comprise a component of a continuous flow system, as medium containing biological molecule of interest can be continuously harvested as cells are continuously returned to the culture and new medium is continually added to the culture.

In at least one embodiment, the cell density and/or other culture conditions or parameters can induce or lead to lysis of the cells, cell wall or membrane, or other cellular (structural) component, such as organelles, etc., producing cell fragments. For instance, the cell culture can be grown to a high production density, as described above. The high production density can induce, lead to, or be associated with cell lysis or fragment formation. The cell culture (or medium thereof) can include these cell fragments (e.g., suspended therein). The cells, cell fragments, and other solid culture components can comprise particulate material in the cell culture. Accordingly, the biological sample (e.g., taken from the (suspension) cell culture) can comprise particulate material (e.g., cells, cell fragments, cellular components, protein and/or other aggregates, viral and/or other particles, etc.), biological molecules of interest (e.g., proteins, therapeutic proteins, (monoclonal) antibodies, immunoglobulins, IgGs, etc.), molecular contaminants (e.g., other proteins, nucleic acids, fatty acids, etc.), and/or culture or other liquid medium.

In some embodiments, the particulate contaminant (e.g., cell fragments, cellular components, viral and/or other particles, etc.) can be smaller than the cells. For instance, at least some of the particulate contaminant can be less than, between, or about 5 µm, 1 µm, 500 nm, 400 nm, 300, nm, 250 nm, 240 nm, 225 nm, 200 nm or less, in size. In some embodiments, at least some of the particulate contaminant can be greater than about 200 nm, 225 nm, 240 nm, 250 nm, 300 nm, 400 nm, 500 nm, 1 µm, 5 µm, or more, in size. In some embodiments, at least some of the particulate contaminant can be greater than about 1000 kDa. For instance, the particulate contaminant can be greater than, between, or about 5 kDa, 10 kDa, 25 kDa, 50 kDa, 100 kDa, 150 kDa, 155 kDa, 160 kDa, 175 kDa, 200 kDa, 225 kDa, or 240 kDa, 250 kDa, 300 kDa, 400 kDa, 500 kDa, 600 kDa, 700 kDa, 800 kDa, 900 kDa, 1000 kDa, 1500 kDa, 1750 kDa, 2000 kDa, 2500 kDa, 3000 kDa, 4000 kDa, 5000 kDa, 6000 kDa, 7000 kDa, 8000 kDa, 9000 kDa, or 10,000 kDa.

B. Fluid Pumps

FIG. 1 also illustrates a fluid pump 95 fluid coupled with assembly 205 by means of fluid connection 212. Accordingly, pump 95 can pump (e.g., draw) at least a portion of biological sample 210 from (i.e., out of) assembly 205 or container 208 thereof through fluid connection 212. Fluid pump 95 is also fluid coupled with a first phase source 214 by means of a fluid connection 216 and to a second phase source 218 by means of a fluid connection 220. Accordingly, pump 95 can pump (e.g., draw) a first fluid (e.g., liquid) phase from source 214 by means of fluid connection 216 and pump a second fluid phase from source 218 by means of fluid connection 220.

Pump 95 is also fluid coupled with particulate removal assembly 230 (or a component thereof) by means of fluid connections 224, 226, and 228. Accordingly, pump 95 can also pump, for example, the first fluid phase, biological sample 210, and/or the second fluid phase to or into particulate removal assembly 230 (or a component thereof) through fluid connections 224, 226, and/or 228, respectively. In an alternative embodiment, pump 95 can combine the first fluid phase, biological sample 210, and the second fluid phase into a mixture, and pump the mixture into particulate removal assembly 230 through one or more of fluid connections 224, 226, and 228.

Pump 95 can also be fluid coupled with additional components of system 200 and/or pump fluids therethrough. System 200 can include additional pumps for pumping fluids into and/or out of various components. For instance, the first fluid phase, biological sample 210, and/or the second fluid phase can (each) be pump into particulate removal assembly 230 (through fluid connections 224, 226, and 228) by means of separate or additional pump(s). In at least one embodiment, however, pump 95 can comprise a master pump fluidly connected to and/or configured to pump fluids into and/or out of the various components. Thus, in certain embodiments, one or more additional fluid connections described herein can pass through pump 95 and/or be effectuated thereby.

C. Particle Removal Assemblies

As depicted in FIG. 1, particulate removal (or clarification) assembly 230 comprises a sample mixing compartment 231 and a sample settling compartment 233 in fluid communication with the mixing compartment 231 by means of a fluid connection 236. In some embodiments, mixing compartment 231 and settling compartment 233 comprise separate components (e.g., containers). In other embodiments, mixing compartment 231 and settling compartment 233 comprise separate zones or sub-compartments of a single container (e.g., particulate removal assembly 230). Regardless, a shielding element disposed between the mixing compartment and the settling compartment can at least partially separate mixing compartment 231 from settling compartment 233. In some embodiments, the container wall(s) and/or fluid connection 236 can form or comprise the shielding element. In other embodiments, the shielding element can include one or more components described below (in relation to shielding element 61).

A fluid mixture 232 (e.g., 232*a* and 232*b*) is disposed in particulate removal assembly 230 and flowable from mixing compartment 231 into settling compartment 233 by means of fluid connection 236. As indicated above, fluid mixture 232 can comprise a fluid (e.g., liquid) sample comprised of the first fluid phase, the second fluid phase, and biological sample 210 or component(s) thereof (e.g., a biological molecule, such as an antibody; a particulate contaminant, such as cells and/or cellular (structural) material; and/or liquid medium, such as (perfusions) cell culture medium). In at least one embodiment, fluid mixture 232 or biological sample 210 can also comprise one or more molecular contaminants. Fluid mixture 232 and components thereof is described in further detail below.

Particulate removal assembly 230 can also comprise means for mixing fluid in the mixing compartment. As depicted in FIG. 1, for example, particulate removal assembly 230 has a mixer system 234 disposed in and/or extending at least partially into mixing compartment 231. Mixer system 234 can include one or more components described below (e.g., in relation to mixer system 18).

Fluid connections 238 and 240 can also be coupled with particulate removal assembly 230 (or settling compartment 233 thereof). In at least one embodiment, fluid connection 240 comprises a first phase body outlet of particulate removal assembly 230 (or settling compartment 233 thereof) and/or a fluid sample inlet of (or for delivering a first fluid into) sample concentrating component 242. Fluid connection 238 can comprise a second phase body outlet for delivering a second fluid into waste (by means of sub-connection 238*a*). In some embodiments, the second fluid can be delivered (e.g., recycled back) into mixing compartment 231 (e.g., by means of sub-connection 238b). As depicted in FIG. 1, for instance, sub-connection 238b can be coupled with pump 95.

The particulate removal assembly can also adapted for a continuous flow operation in which (i) the fluid sample (e.g., mixture 232 or components thereof) continuously flows into mixing compartment 231, (ii) the fluid sample (e.g., mixture 232 or components thereof) continuously flows from mixing compartment 231 into settling compartment 233, and/or (iii) a first fluid (e.g., comprising the first phase or phase body) and/or second fluid (e.g., comprising the second phase or phase body) continuously flows out of settling compartment 233.

In certain embodiments, the biological sample, first fluid phase, and second fluid phase are continuously introduced into mixing compartment 231 (e.g., by means of fluid connections 224, 226, and 228) and mixed by the means for mixing, thereby continuously forming the mixture, during the time of continuous flow operation, (ii) the first mixture continuously flows from mixing compartment 231 to settling compartment 233 and is allowed to continuously settle into the first phase body and the second phase body in settling compartment 233 during the time of continuous flow operation, (iii) the first phase body continuously fluidly exits the settling compartment through fluid connection 240 (a first phase body outlet formed in a first end of settling compartment 233) during the time of continuous flow operation, and (iv) the second phase body continuously fluidly exits the settling compartment through fluid connection 238 (a second phase body outlet formed in a second end of settling compartment 233) during the time of continuous flow operation. The first end can be separated from the second end by a vertical distance (of at least 1 cm, 2 cm, 5 cm, 10 cm, 15 cm, 20 cm, 25, cm, 30 cm, 35 cm, 40 cm, 45 cm 50 cm, 60 cm, 70 cm, 80 cm, 90 cm, 1 meter, or more.

In some embodiments, the first phase body outlet stream can have an optical density of less than, equal to, and/or between about 200, 100, 90, 80, 75, 70, 60, 50, 40, 30, 25, 20, 10, 5, 2, 1, or less NTUs.

D. Fluid Mixtures and Components

As discussed in further detail below, fluid mixture 232 can be configured for the separation of particulate material from biological molecule(s). Briefly, the first fluid phase and the second fluid phase can be immiscible and/or formulated such that mixture of the first and second fluid phases with the biological sample causes the particulate material to be or become disposed in and/or transferred into one of the phases, and the biological molecule(s) to be or become disposed in and/or transferred into the other (e.g., opposite) phase. In mixing compartment 231, for example, fluid mixture 232 can comprise a mixed fluid mixture 232a. Mixed fluid sample 232a can comprise (i) an emulsion (e.g., of the first fluid phase and the second fluid phase), (ii) a solution (e.g., of the biological (and, optionally contaminating) molecule(s) disposed (e.g., uniformly distributed) within the emulsion or phase(s) thereof, and/or (iii) a suspension (e.g., of particulate materials suspended in the emulsion or phase(s) thereof. Other types of mixed fluid mixtures are also contemplated herein. It will be appreciated that, in at least one embodiment, the mixing and/or mixture is effectuated by mixer system 234 in mixing compartment 231.

In settling compartment 233, however, fluid mixture 232 can comprise a settled fluid mixture 232b. For instance, in settling compartment 233, the first phase and the second phase can be settled into a first phase body comprising the first phase and a second phase body comprising the second phase. The first phase body can be separable from the second phase body. For instance, in at least one embodiment, a less-dense phase of the first and second phases or phase bodies is positioned vertically above a more-dense phase of the first and second phases or phase bodies in settling compartment 233 and/or settled fluid mixture 232b. Thus, the less-dense phase can be extracted from a top portion of settling compartment 233 and/or settled fluid mixture 232b and the more-dense phase can be extracted from a bottom portion of settling to compartment 233 and/or settled fluid mixture 232b. In some embodiments, settled fluid mixture 232b can become substantial still and/or un-agitated and/or such that an at least partially horizontal interface is disposed between the upper phase body and the lower phase body in settling compartment 233.

In at least one embodiment, the first phase body has less than about 25%, 20%, 25%, 10%, 5%, 4%, 3%, 2%, or 1% second phase by volume. For instance, a low or high interfacial tension can exist between the two phases such that the first and second phase bodies settle out into distinct bodies. However, a minor amount of the opposite, second phase can remain disposed in the first phase body (e.g., in the form of tiny droplets). Similarly, the second phase body can have less than about 25%, 20%, 25%, 10%, 5%, 4%, 3%, 2%, or 1% first phase by volume, in certain embodiments.

As indicated above, the biological molecule can be disposed (substantially) in the first phase body (e.g., such that the second phase body is substantially devoid of the biological molecule) and the particulate contaminant can be disposed (substantially) in the second phase body (e.g., such that the first phase body is substantially devoid of the contaminant). As used herein, "substantially" and similar terms refer to complete or nearly complete. For instance, in a positive context, substantially can refer to at least or greater than about 75%, 80%, 85%, 90%, 95%, 96%, 97%, 98%, or 99% complete in some embodiments. Alternatively, in a negative context, substantially can refer to less than about 25%, 20%, 15%, 10%, 5%, 4%, 3%, 2%, or 1% devoid in some embodiments.

In certain embodiments, greater than about 75%, 80%, 85%, 90%, 95%, 96%, 97%, 98%, or 99% of the biological molecule can be disposed in the first phase body (e.g., such that less than about 25%, 20%, 15%, 10%, 5%, 4%, 3%, 2%, or 1% of the biological molecule (by weight, by volume, or percent of total biological molecule in the (settled) mixture) is disposed in the second phase body). In some embodiments, the biological molecule can have a concentration greater than about 10 mg/L, 20 mg/L, 30 mg/L, 40 mg/L, 50 mg/L, 60 mg/L, 80 mg/L, 100 mg/L, 120 mg/L, 150 mg/L, 175 mg/L, 200 mg/L, 250 mg/L, 300 mg/L, 500 mg/L, or more, in the first phase body.

Similarly, greater than about 75%, 80%, 85%, 90%, 95%, 96%, 97%, 98%, or 99% of the particulate contaminant can be disposed in the second phase body (e.g., such that less than about 25%, 20%, 15%, 10%, 5%, 4%, 3%, 2%, or 1% of the particulate contaminant (by weight, by volume, or percent of total biological molecule in the (settled) mixture) is disposed in the first phase body). Accordingly, the biological molecule and the particulate contaminant can be separated by separating the settled fluid mixture or immiscible phases or phase bodies thereof.

Aqueous two-phase systems can include a variety of formulations for the two phases. Generally, the two phases are formulated so as to be immiscible, such that over time, the two phases can be resolved (or settled into distinguishable phase bodies) after a certain degree of mixing. For instance, a first liquid phase having a molecule of interest and at least one contaminant is mixed with a second phase. The molecule of interest or contaminant can be more soluble in the second phase than in the first phase, such that molecular transfer from one phase to the other can occur. The mixing can be sufficient to emulsify the two phases, forming small phase droplets of one of more of the phases. The increased surface area to volume ration of the emulsion can enhance molecular transfer. The mixture can then be allowed to settle, such that the two phases can be separated one from another, the first phase having one component disposed therein, the second phase having the other component disposed therein.

Because molecular transfer and/or resolution can be incomplete after a single stage of mixing and settling, multi-stage extractor systems repeatedly mix, settle, re-mix, and re-settle the phases (and molecular components disposed therein) to achieve a level of product purity and/or extraction efficiency. The additional stages can add to the system size, processing time, and/or production cost of the molecule of interest. Accordingly, there is also pressure to reduce the number of stages to reduce size, time, and expense.

Some systems employ two-phase, liquid-liquid extraction as a means of purifying a molecule of interest away from other molecular contaminants; specifically, molecular contaminants that are difficult to distinguish and, therefore, purify away from the molecule of interest based on size or other characteristics. Single-phase and/or multi-phase, liquid-liquid extraction systems have not been shown to be successful for extracting or clarifying particulate material away from biological molecules. Rather, particulate material is typically separated or removed by means of centrifugation and/or filtration, generally prior to liquid-liquid extraction. For instance, without being bound to any theory, it will be appreciated that particulate materials can clog and/or foul many liquid-liquid extraction systems.

Embodiments of the present disclosure include particulate contaminant removal systems that can separate and/or extract particulate material away from biological molecules in a multi-phase, liquid-liquid extraction system. The multi-phase particulate contaminant removal system can include a first fluid phase, a second fluid phase that is immiscible with the first phase, a biological molecule, and a particulate contaminant. The biological molecule can be disposed substantially in the first phase (such that the second phase is substantially devoid of the biological molecule) and/or the particulate contaminant can be disposed substantially in the second phase (such that the first phase is substantially devoid of the contaminant).

In at least one embodiment, the biological molecule and particulate contaminant can be mixed with the first and second phases to effectuate molecular and/or particle transfer (e.g., into one or more liquid phases). For instance, the biological molecule and particulate contaminant can be disposed in a liquid medium. The liquid medium can comprise cell culture media in certain embodiments. In some embodiments, the biological sample (e.g., comprising the liquid medium, the biological molecule, and the particulate contaminant) can be combined with the first and second phase to form a mixture. In other embodiments, the biological molecule and particulate contaminant can be disposed in a first of the phases. This fluid sample (comprising the first liquid phase, the biological molecule, and the particulate contaminant) can then be combined with the second phase to form a mixture. Thus, a mixture comprising the first and second (liquid) phases, the biological molecule, and the particulate contaminant can be formed.

In some embodiments, the first and second liquid phases can have different densities. For instance, the first phase can comprise a less-dense phase in some embodiments. In certain embodiments, however, the first phase can comprise a more-dense phase. The density of the first and second phases can be influenced and/or determined by the components and/or formulation thereof. Phase components are known in the art and can include any suitable major and/or minor (dilute) component(s).

Without being bound to any theory, aqueous (or water-based) solutions, being polar, are immiscible with non-polar organic solvents (chloroform, toluene, hexane, etc.) and can form a two-phase system when mixed (e.g., combined). However, in an aqueous two-phase (ATP) system, both immiscible components are water-based. The formation of the distinct phases, therefore, can be facilitated and/or affected by the pH, temperature, polar and/or non-polar component concentration (and/or molecular weight), and/or ionic strength of the two components or mixture thereof. Thus, separation occurs when the amount of a polymer present exceeds a certain limiting concentration (which is determined by the above factors).

In at least one embodiment, a first phase can be termed or comprise an aqueous phase. As used herein, the term "aqueous phase," "water phase," and the like, refer to a fluid carrier comprised mostly of water (i.e., greater than 50%), having a percent concentration (by weight or by volume) of water that is greater than the percent concentration of water in a second phase, and/or having a density greater than the density of a second phase. The second phase can contain or have a higher or greater concentration of a polymer, organic component, or other density-altering molecule or component than does the first (aqueous) phase. Accordingly, the second phase can be termed an "organic phase," "oil phase," "light phase," or similar designation where appropriate (e.g., where (i) greater than 50% of the phase comprised organic molecule(s) or oil(s), etc., (ii) the phase has a higher concentration or percentage of an organic, polymeric, or other density-altering molecule or component than does the other phase, or (iii) the phase has a lower density than the first phase).

In some embodiments, one of the phases (e.g., a first, heavier, more dense, and/or more aqueous/less organic phase) can have a higher concentration of a water and/or a (solvency driving and/or inorganic) salt. Such a phase can be termed a "salt phase" in some embodiments. The salt can comprise a phosphate (e.g., PO4), a sulfate (e.g., SO4), a carbonate (e.g., CO3), a citrate, etc. A certain concentration of such salt may be included and/or necessary for operation of an ATP system (e.g., in which both phases (or liquids) are comprised (in (large) part) of water). For instance, the effect of such salt in an ATP system may be to shield and/or sequester water molecules (e.g., providing immiscibility between the two phases).

For instance, one phase can comprise or be comprised entirely or almost entirely of water (or butanol, toluene, etc.). The first (more-dense and/or aqueous) phase can have a salt disposed therein (e.g., at a first concentration). For instance, the first phase can have a first concentration of PO4, SO4, CO3, and/or citrate disposed (e.g., dissolved) therein. The first concentration can be between about 5%-22%, 7%-20%, 9%-18%, 9%-12%, 10%-13%, 12%-15%, 12.5%-17.5%, or any range of values therebetween. Other concentrations of salt or other components are known in the art and contemplated herein.

Some phases can include a mixture of different phase components. For instance, a second (less-dense and/or organic) phase can comprise water and an organic molecule, each at a specific concentration. In some embodiments, the organic molecule can comprise a hydrophilic polymer or polymeric glycol (e.g., polyethylene glycol (PEG), polypropylene glycol (PPG), etc.). Certain phases can comprise greater than about 50% and less than 100% water, with at least some other phase component (e.g., PEG, PPG, acetone, etc.) at less than or equal to about 50%. For instance, the concentration of organic molecule in the second phase can be between about 2%-25%, 4%-20%, 4%-8%, 5%-9%, 6%-10%, 15%-20%, or any range of values therebetween. Other concentrations of organic or polymeric phase components are known in the art and contemplated herein. For instance, phases having water at a concentration less than or equal to 50% is also contemplated herein.

In some embodiments, the organic molecule can have a molecular weight of or between about 200 kDa, 400 kDa, 600 kDa, 800 kDa, 1000 kDa, 1200 kDa, 1400 kDa, 1450 kDa, 1500 kDa, 2000 kDa, 2500 kDa, 3000 kDa, 3350 kDa, 3500 kDa, 4000 kDa, 5000 kDa, 6000 kDa, or more.

In some embodiments, both phases can comprise >50% water. For instance, the first phase can comprise >50%, 60%, 70%, or 80% water and <8%, 7%, 6%, 5%, 4%, 3%, 2%, or 1% polymer or organic molecule and/or the second phase can comprise >50% water and >3%, 4%, 5%, 6%, 7%, 8%, 10%, 12%, 15%, or 20% polymer or organic molecule, or vice versa. In certain embodiments, one of the first phase and the second phase can comprise >5% salt and/or <4% of polymer or organic molecule, while the other phase comprises >4% polymer or organic molecule, or vice versa. In some embodiments, a first phase can comprise water and salt and/or can be substantially devoid of polymer or organic molecule. A second phase can comprise water and polymer or organic molecule and/or can be substantially devoid of salt.

In some embodiments, both the first and second phases can comprise aqueous phases, organic phases, etc. For instance, the first phase can comprise a water phase (e.g., having approximately 0% polymer, organic, or other molecule) and the second phase can comprise approximately 70% water and up to about 30% polymer, organic, or other molecule (e.g., PEG). Similarly, the first phase can comprise 70% water and up to 30% PEG and the second phase can comprise 70% water and up to 30% dextran. Likewise, the first and second phases can each comprise or be comprised of greater than 50% polymer, organic, or other molecule (e.g., the addition of which decreases the density of water). Indeed, one will appreciate that any suitable concentration of phase components between 0% and 100% is contemplated herein.

One or more embodiments can include a polymer/salt (e.g., PEG/phosphate) system, a polymer/polymer (e.g., PEG/dextran) system, and/or an ionic liquid (e.g., imidizolium chloride) system. Accordingly, embodiments of the present disclosure can include aqueous-aqueous two-phase extraction, organic-organic two-phase extraction, aqueous-organic two-phase extraction, liquid-liquid extraction, or any other suitable combination. Embodiments can include, for example, less than about 5%, 4.5%, 4%, 3.5%, 3%, 2.5%, 2%, 1.5%, 1%, 0.5%, 0.1%, 0.05%, 0.01%, 0.005%, 0.001%, or less (by weight or by volume) dextran. The dextran can optionally be or comprise dextran 500000 or another molecular weight of dextran as known in the art.

In some embodiments, one or more phases can include another (or secondary) salt (e.g., sodium chloride (NaCl), potassium chloride (KCl), etc.) at a second concentration. In certain embodiments, the second concentration (e.g., of secondary salt) can be less than or between about 10%, 8%, 6%, 5%, 4%, 3%, 3%, or 1%, or less. However, in certain embodiments, the first phase, second phase, and/or mixture can be substantially devoid of secondary salt (i.e., less than about 10%, 5%, 4%, 3%, 2%, 1%, or about 0% secondary salt). Accordingly, the first phase, second phase, and/or mixture can have or comprise less than or between about 0% and 10% secondary salt. Those skilled in the art will appreciate that the biological component (e.g., cell culture sample) can include some secondary salt without necessarily departing from the scope of this disclosure. Accordingly, the mixture of first phase, second phase, biological molecule, and particulate contaminant can have less than or between about 10%, 8%, 6%, 5%, 4%, 3%, 3%, or 1%, or less secondary salt (e.g., sodium chloride and/or potassium chloride).

In some embodiments, one or more phases can include another polymer, organic, or other molecule (e.g., at a third concentration). In certain embodiments, the polymer, organic, or other molecule can comprise dextran. The third concentration (e.g., of dextran) can be less than or between about 25%, 20%, 15%, 10%, 8%, 6%, 5%, 4%, 3%, 3%, or 1%, or less. However, in certain embodiments, the first phase, second phase, and/or mixture can be substantially devoid of dextran (i.e., about 0% dextran). Accordingly, the first phase, second phase, and/or mixture can have or comprise less than or between about 0% and 25% dextran, or any range of concentrations therebetween.

In some embodiments, one of the first phase or the second phase comprises PEG or PPG having an average molecular weight of or between about 400 and/or 600 kDa at a concentration of about 15-20% by weight and the other of the first phase or the second phase comprises a phosphate (e.g., PO4), sulfate (e.g., SO4), carbonate (e.g., CO3), or citrate at a concentration of about 12.5-17.5% by weight.

In another embodiment, one of the first phase or the second phase comprises PEG or PPG having an average molecular weight of about 1450 kDa at a concentration of about 6-10% by weight and the other of the first phase or the second phase comprises a phosphate (e.g., PO4), sulfate (e.g., SO4), carbonate (e.g., CO3), or citrate at a concentration of about 12-15% by weight.

In another embodiment, one of the first phase or the second phase comprises PEG or PPG having an average molecular weight of about 3350 kDa at a concentration of about 5-9% by weight and the other of the first phase or the second phase comprises a phosphate (e.g., PO4), sulfate (e.g., SO4), carbonate (e.g., CO3), or citrate at a concentration of about 10-13% by weight.

In another embodiment, one of the first phase or the second phase comprises PEG or PPG having an average molecular weight of about 6000 kDa at a concentration of about 4-8% by weight and the other of the first phase or the second phase comprises a phosphate (e.g., PO4), sulfate (e.g., SO4), carbonate (e.g., CO3), or citrate at a concentration of about 9-12% by weight It will also be appreciated that three or more phase systems are also contemplated herein.

E. Concentrating Components

Sample concentrating component 242 can be fluid coupled with particulate removal assembly 230 or settling compartment 233 thereof. For instance, particulate removal assembly 230 or settling compartment 233 thereof can be in fluid communication with concentrating component 242 via (or by means of) fluid connection 240. Accordingly, fluid connection 240 can also be or comprise a (phase body) inlet for delivering a fluid into concentrating component 242. In some embodiments, a portion of settled fluid mixture 232b (e.g., a portion of one of the first or second phase bodies) can fluidly pass out of particulate removal assembly 230 or settling compartment 233 thereof, through fluid connection 240, and into sample concentrating component 242. The portion (phase body) of settled fluid mixture 232b can comprise the biological component and the first or second phase and/or can be substantially free of the particulate material, in certain embodiments.

In at least one embodiment, sample concentrating component 242 can comprise a tangential flow filter assembly. The tangential flow filter assembly can have a tangential flow filter component. The tangential flow filter component can have a nominal molecular weight limit (NMWL) of between (or) about 200 kDa or less, 33.5 kDa or less, 33 kDa or less, 15 kDa or less, 10 kDa or less, 5 kDa or less, 3 kDa or less, or any other suitable NMWL. As known in the art, the tangential filter can restrict (i.e., filter) one or more components of greater than the NMWL from passing tangentially therethrough as the sample flows through the filter (in a direction substantially or generally parallel to the tangentially flow filter surface. Accordingly, components (e.g., biological molecules and/or particles) that are (substantially) greater than the NMWL can be concentrated by the filter assembly as the fluid sample passes therethrough.

In other embodiments, concentrating component 242 can comprise a (continuous flow) concentrator or filter assembly other than a tangential flow filter. For instance, concentrating component 242 can comprise a concentrator column, centrifuge, cartridge, etc. Concentrating component 242 can be configured to concentrate the sample at least 1.5×, 2×, 3×, 4×, 5×, 6×, 7×, 8×, 9×, 10×, or more in certain embodiments.

In at least one embodiment, concentrating component 242 is in-line with and disposed down flow of particulate removal assembly 230 (e.g., such that a liquid sample flows through particulate removal assembly 230 before reaching concentrating component 242. Accordingly, particulate contaminants (which might otherwise be concentrated along with the biological molecules) can be removed from the liquid sample before the sample passes through concentrating component 242. Removing particulate material before concentration can prevent concentrated particulate contaminants from fouling or clogging up extraction component 10. Extraction component 10 can be fluid coupled (in-line and/or down flow) with concentrating component 242 by means of a fluid connection 244. Accordingly, fluid connection 244 can be or comprise a concentrated sample outlet of concentrating component 242 and/or a (first) fluid inlet of extraction component 10. A third phase source 246 can also be fluid coupled with extraction component 10 by means of a fluid connection (or second fluid inlet) 248.

One or more additional reagent sources 245 can be fluid coupled with extraction component 10 and/or fluid connection 244 by means of fluid connection 247. Such additional reagents can include, for example, one or more (additional) phases or phase components, water, primary, polyatomic, and/or organic salts (e.g., phosphate, sulfate, carbonate, citrate, etc.), secondary, monoatomic, and/or inorganic salts (e.g., chloride (ion), (Na)Cl, (K)Cl, etc.) or solution thereof, or other component(s). Such additional reagents can be added to the clarified, concentrated sample or first phase body to optimize the first phase body for extraction of the biological molecule in extraction component 10. In an alternative embodiment, additional reagent source(s) 245 can be fluid coupled with fluid connection 240 by means of fluid connection 249. Such additional reagents can be added to the clarified, pre-concentrated sample or first phase body to optimize the first phase body for concentration of the biological molecule (e.g., in concentrating component 242) and/or extraction of the biological molecule (e.g., in extraction component 10).

F. Extraction Component

In at least one embodiment, extraction component 10 can comprise a (commercial-scale) antibody purification column. For instance, the column can be packed with protein A-conjugated beads in order to bind the antibody and allow for purification of the antibody away from contaminants as known in the art. However, protein A can be relatively expensive (e.g., about $12,000 per liter of protein A chromatography resin—compared to about $6 per liter for some aqueous two-phase (ATP) buffer systems). Accordingly, large-scale purification of an Ig via protein A can be cost prohibitive. Extraction component 10 can alternatively comprise a continuous flow, two-phase liquid-liquid extraction column, as known in the art. Such columns include static columns (e.g., sieve tray, random packing, and structured (SMVP) packing columns), as well as agitated columns (e.g., KARR®, SCHEIBEL®, rotating disc contractor (RDC), pulsed, and other specially-designed columns).

Figure 2:
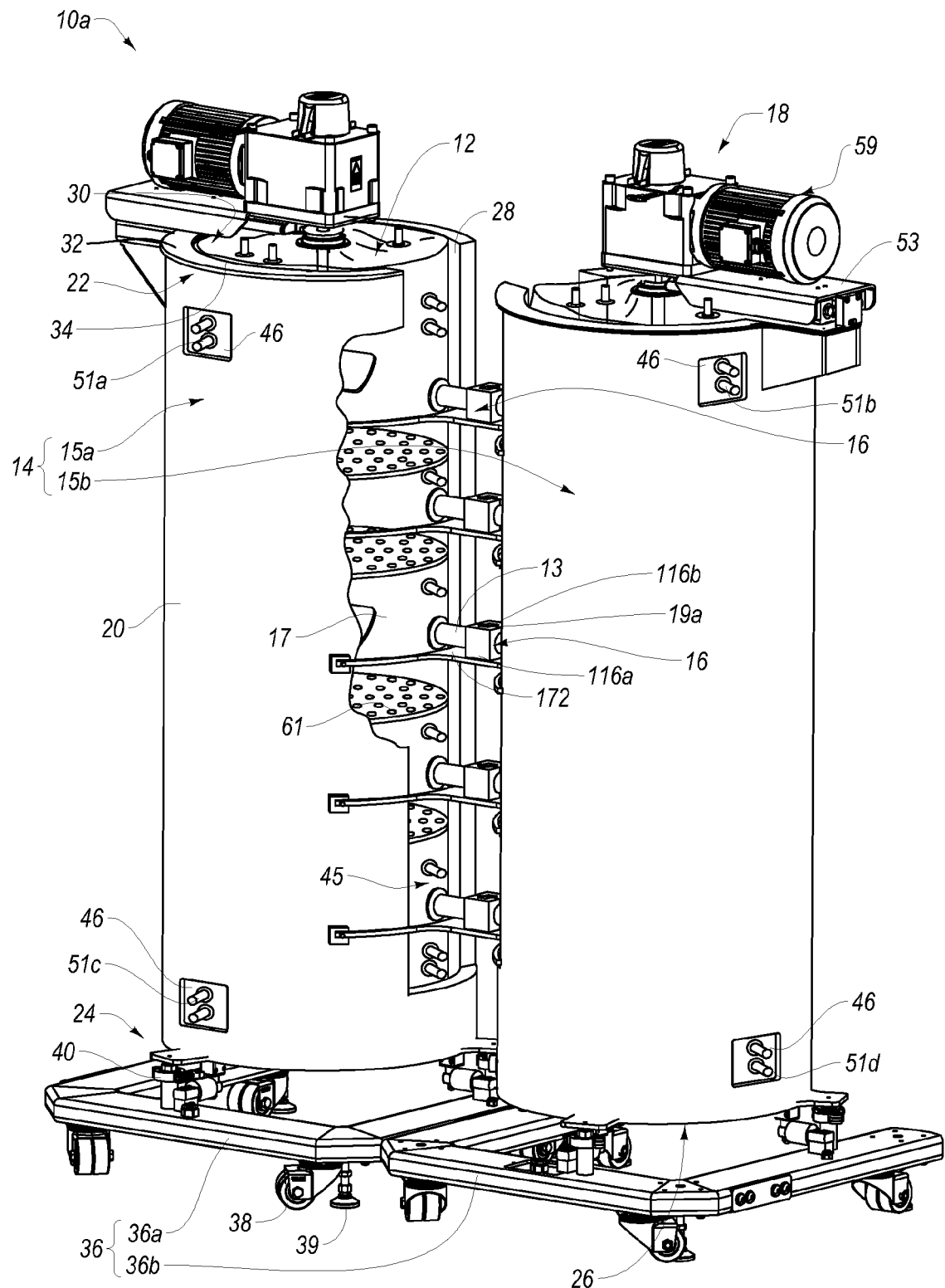
FIG. 2 is a perspective cut-away view of a multi-stage liquid-liquid extraction system useful in the system of FIG. 1.

Depicted in FIG. 2 is one embodiment of a multi-stage liquid-liquid extraction component 10a incorporating some features of the present disclosure. In general, extraction component 10a comprises a container assembly 12 that is optionally disposed within a rigid support housing 14. Extraction component 10a can further comprises one or more mixer systems 18 extending at least partially into container assembly 12 and, optionally, one or more acoustic settlers 16 for passing an acoustic wave through a portion of container assembly 12. Various components of extraction component 10a will now be discussed in greater detail with reference to the figures.

i. Support Housings

As illustrated in FIG. 2, support housing 14 is configured to receive and support container assembly 12. In the depicted embodiment, rigid support housing 14 comprises rigid support housings 15a and 15b. Support housings 15a and 15b are substantially identical and like reference characters are used to identify like elements. Each support housing 15 includes a substantially cylindrical sidewall 20 that extends between an upper end 22 and an opposing lower end 24. Upper end 22 terminates at an end face 32 while lower end 24 terminates at a floor 26. Singular support housings, as well as non-cylindrical configurations are also contemplated herein.

Support housing 15 has an interior surface 28 that bounds a chamber 30. An opening 34 is formed on end face 32 to provide access to chamber 30. A transfer slot 45 extends through sidewall 20 so as to communicate with chamber 30. In one embodiment, transfer slot 45 extends through sidewall 20 from lower end 24 through end face 32. Support housing 15 thus has a substantially C-shaped transverse cross section where it intersects with transfer slot 45. In an alternative embodiment, transfer slot 45 need not extend through end face 32 but can stop short thereof so that support housing 15 encircles transfer slot 45. For instance, in at least one embodiment, opening 34 can be positioned at bottom end 24 of support housing 15. Thus, upper end 22 of support housing 15 can comprise a closed configuration in certain embodiments. Similarly, both upper and lower ends 22, 24 can comprise closed configurations such that container assembly 12 can be inserted into chamber 30 of support housing 15 via transfer slot 45.

As discussed below in greater detail, during use, support housings 15a and 15b are typically disposed slightly spaced apart with transfer slots 45 facing each other. Container assembly 12 is received within compartments 30 so that a portion of container assembly 12 laterally passes through transfer slots 45. Although support housings 15 are shown as separate and discrete members, they can be connected together or formed as an integral, single unitary structure or can be connected together.

As depicted, each support housing 15a and 15b can be removably or integrally secured to a base 36a and 36b. Base 36 can comprise a stationary or mobile frame, cart, or trolley and can be secured to support housing 15 by one or more connectors 40. For instance, floor 26 of support housing 15 can rest on base 36 with wheels 38 and/or feet 39 extending therefrom. Bases 36a, 36b can be connected and/or secured together via one or more connectors. Thus, bases 36 can enable selective movement and positioning/securing of support housings 15. In alternative embodiments, however, support housing 14 can rest on a single base 36 or not rest on base 36 but can rest directly on a floor or other support structure.

Each support housing 15 can be scaled to any desired size. For example, it is envisioned that support housing 15 can be sized so that chamber 30 can hold a volume of less than 50 liters or more than 1,000 liters or any volume therebetween. Support housing 15 is typically made of metal, such as stainless steel, but can also be made of other materials capable of withstanding the applied loads of the present disclosure.

Support housings 15 can also have one or more openings 46 formed on sidewall 20 and floor 26. Opening(s) 46 provide access to container assembly 12 to enable various external gas lines, fluid lines, probes, and/or sensors to couple with container assembly 12 (e.g., when container assembly 12 is within support housings 15).

In certain embodiments, support housings 15a and 15b (and support housings 15c and 15d) can be mirror images of one another. One will appreciate, however, that differences in the configuration, location, and number of various elements can differ between housing members without departing from the scope of this disclosure.

ii. Container Assemblies

As illustrated in FIG. 2, container assembly 12 can be disposed at least partially within support housing 14, or support housings 15 thereof. As further depicted in FIG. 3, container assembly 12 comprises a first sub-container 17a and a second sub-container 17b (generally, sub-container 17), and a plurality of conduits 13a-13e (generally, conduit 13) extending therebetween.

Sub-containers 17a and 17b are substantially identical to each other (typically the mirror image of each other) and like elements are identified by like reference characters. Each sub-container 17 has a sidewall 55 that extends from an upper end 56 to an opposing lower end 57. Each sub-container 17 also has exterior surface 8 and an interior surface 9. Interior surface 9 bounds a sub-compartment 50 in which a portion of mixer system 18 is disposed.

As will be discussed below in further detail below, each sub-compartment 50 can comprise at least portions of one or more mixing zones 31 and one or more settling zones 33 with mixing zones 31 being in fluid communication with settling zones 33. For instance, sub-compartment 50a of sub-container 17a can have a plurality of alternating mixing zones 31a-c and settling zones 33a and 33b extending between lower end 57 and opposing upper end 56 while sub-compartment 50b of sub-container 17b can have a plurality of alternating mixing zones 31d and 31e and settling zones 33c-33e extending between lower end 57 and opposing upper end 56.

The alternating zones can be in a vertical or partially vertical orientation or can otherwise alternate along a fluid flow path within sub-compartments 50. In the depicted embodiment, mixing zones 31 of sub-container 17a are horizontally aligned with a settling zone 33 of sub-container 17b and settling zones 33 of sub-container 17a are horizontally aligned with a mixing zone 31 of sub-container 17b. One will appreciate that horizontally arranged and/or tandem, side-by-side, mixer/settler systems are also contemplated herein. Accordingly, the alternating mixing and settling zones can be arranged in any suitable manner, including along one or more sample or fluid flow paths within or between one or more compartments, containers, sub-containers, and/or container assemblies.

In at least one embodiment, a settling zone can comprise any area of a extraction component that is at least partially shielded from one or more mixer elements. For instance, a settling zone can comprise a space in between mixer elements where there is less shear force, turbulence, or the like from the agitating mixer elements. In some embodiments, a settling zone can comprise any space of the extraction component where the coalescence of dispersed phase droplets is enhanced relative to another area. Such other area (where coalescence of dispersed phase droplets is reduced relative to the settling zone/space) can be termed a mixing zone in at least one embodiment. In one or more embodiments, a mixing zone has a mixer element disposed at least partially therein.

Sub-container 17 can comprise one or more transparent, translucent, or opaque materials and can have ultraviolet light or other inhibitory properties (e.g., inhibitors incorporated therein). In certain embodiments, the method of use can determine the material used to form sub-container 17. In the depicted embodiment, each sub-container 17 can be comprised of a flexible bag. The bag can comprise or be comprised or formed of a polymeric sheet or film (material). The polymeric sheet or film (material) can allow for single-use and/or disposable applications of container assembly 12 but may require container assembly 12 to be used with rigid support housings 15. For example, each sub-container 17 can be comprised of a flexible, water impermeable material such as a low-density polyethylene or other polymeric sheets or film having a thickness in a range between about 0.1 mm to about 5 mm with about 0.2 mm to about 2 mm being more common. The polymeric film can have a thickness that is at least or less than 0.02 mm, 0.05 mm, 0.1 mm, 0.2 mm, 0.5 mm, 1 mm, 2 mm, 3 mm or in a range between any two of the foregoing. Other thicknesses can also be used. The film is typically sufficiently flexible that it can be rolled into a tube without plastic deformation and/or can be folded over an angle of at least 90°, 180°, 270°, or 360° without plastic deformation.

The material can comprise or be comprised of a single ply material or can comprise two or more layers which are either sealed together or separated to form a double wall container. Where the layers are sealed together, the material can comprise a laminated or extruded material. The laminated material comprises two or more separately formed layers that are subsequently secured together by an adhesive. The laminated and extruded films typically have between 1-9 layers and more commonly between 3-9 layers. The films used can commonly have a number of layers that is at least or less than 1, 3, 5, 7, or 9 layers or in a range between any two of the foreogiong. The extruded film can be a cast film such as a multi-layer co-extruded cast film.

In at least one embodiment, sub-container 17 can comprise an extruded material that has been assembled, fabricated, welded, or otherwise formed into sub-container 17. The extruded material can comprise a single integral sheet that comprises two or more layers of different materials that can be separated by a contact layer. All of the layers can be simultaneously co-extruded. One example of an extruded material that can be used in the present disclosure is the Thermo Scientific CX3-9 film available from Thermo Fisher Scientific. The Thermo Scientific CX3-9 film is a three-layer, 9 mil cast film produced in a cGMP facility. The outer layer is a polyester elastomer coextruded with an ultra-low density polyethylene product contact layer. Another example of an extruded material that can be used in the present disclosure is the Thermo Scientific CX5-14 cast film also available from Thermo Fisher Scientific. The Thermo Scientific CX5-14 cast film comprises a polyester elastomer outer layer, an ultra-low density polyethylene contact layer, and an EVOH barrier layer disposed therebetween. In still another example, a multi-web film produced from three independent webs of blown film can be used. The two inner webs are each a 4 mil monolayer polyethylene film while the outer barrier web is a 5.5 mil thick 6-layer co-extrusion film.

In some embodiments, the material can be approved (by a government or regulatory agency or other organization) for direct contact with living cells and/or capable of maintaining a solution, sample, or fluid in a sterile condition. In such embodiments, the material can also be sterilizable such as by ionizing (gamma) radiation. Other embodiments can include material and/or elements capable of be cleaned and used in aseptic fashion (though not (entirely) sterilized). Examples of materials that can be used in different situations are disclosed in U.S. Pat. No. 6,083,587 which issued on Jul. 4, 2000 and United States Patent Publication No. US 2003-0077466 A1, published Apr. 24, 2003 which are hereby incorporated by specific reference.

In at least one embodiment, each sub-container 17 can comprise a polymeric bag configured, fabricated, formed, and/or made in a columnar configuration. In one embodiment, sub-container 17 comprise a two-dimensional pillow style bag wherein two sheets of material are placed in overlapping relation and the two sheets are bounded together at their peripheries to form the internal compartment. Alternatively, a single sheet of material can be folded over and seamed around the periphery to form the internal compartment 50. In another embodiment, sub-containers 17 can be formed from a continuous tubular extrusion of polymeric material that is cut to length and is seamed closed at the ends.

In still other embodiments, each sub-container 17 can comprise a three-dimensional bag that not only has an annular side wall but also a two dimensional top end wall and a two dimensional bottom end wall. Three dimensional containers comprise a plurality of discrete panels, typically three or more, and more commonly four or six. Each panel is substantially identical and comprises a portion of the side wall, top end wall, and bottom end wall of the container. Corresponding perimeter edges of each panel are seamed together. The seams are typically formed using methods known in the art such as heat energies, RF energies, sonics, or other sealing energies.

In alternative embodiments, the panels can be formed in a variety of different patterns. These and other techniques for forming, fabricating, manufacturing, building, assembling, and/or welding containers suitable for embodiments of the present disclosure are known in the art. Thus, specific steps and conditions for forming the same need not be delineated in detail. Further disclosure with regard to one method of manufacturing three-dimensional bags is disclosed in United States Patent Publication No. US 2002-0131654 A1, published Sep. 19, 2002, the entire disclosure of which is hereby incorporated by reference.

In an alternative embodiment sub-container 17 can be comprised of a glass, thermoplastic, resin, stainless steel, aluminum, or other rigid or semi-rigid material(s) that enables sub-container 17 to be sufficiently rigid that it is self-supporting, i.e., it does not collapse under its own weight. As such, sub-container 17 can be used without necessarily being placed or inserted in rigid support housings 15.

It will also be appreciated that each sub-container 17 can be manufactured to have virtually any desired size, shape, and configuration. For example, sub-container 17 can be formed having a compartment sized to 10 liters, 30 liters, 100 liters, 250 liters, 500 liters, 750 liters, 1,000 liters, 1,500 liters, 2,000 liters, 2,500 liters, 3,000 liters, 5,000 liters, 10,000 liters or other desired volumes. The size of the sub-compartment 50 can also be in the range between any two of the above volumes. Although sub-containers 17 can be any shape, in one embodiment each sub-container 17 is specifically configured to be complementary or substantially complementary to chamber 30 of support housings 15 (see FIG. 2). It can also be desirable in some embodiments that when sub-container 17 is received within chamber 30, sub-container 17 is at least generally uniformly supported by support housing 15.

Conduits 13 extend between sub-containers 17a and 17b so as to facilitate fluid communication between sub-containers 17. More specifically, each conduit 13 extends between a mixing zone 31 of sub-container 17a and a settling zone 33 of sub-container 17b or between a settling zone 33 of sub-container 17a and a mixing zone 33 of sub-container 17b so as to facilitate fluid communication between zones 31 and 33. Thus, a fluid sample disposed within mixing zone 31a of sub-container 17a can flow into settling zone 33c of sub-container 17a via conduits 13a and vice versa. Conduits 13 can extend laterally and/or radially from outer wall 55 of sub-containers 17.

One will appreciate, however, that conduits 13 can also comprise a settling zones. In some embodiments, a conduit 13 and its corresponding, adjacent settling zone 33 can comprise a single settling zone. Thus, in at least some embodiments, extraction component 10 can comprise a plurality of alternating mixing zones and settling zones.

Each conduit 13 has an interior surface 150 that extends between a first end 152 and an opposing second end 154. Interior surface 150 bounds a fluid path 156 through which fluid flows through conduit 13. In some embodiments, fluid path 156 of conduit 13 can comprise at least a portion a settling zone. Conduits 13 can be comprised of a rigid, semi-rigid, and/or flexible material(s). For example, in some embodiments conduits 13 (or portion(s) thereof) can comprise a rigid material such as glass, polymeric, plastic, or resin material that is self-supporting so as to retain a structural form or configuration. In other embodiments conduits 13 can be comprised a flexible material such that conduits 13 can be folded over, bent or otherwise collapsed without plastic deformation. For example, conduit 13 can comprise flexible tubing or hose. Conduits 13 can also be formed from polymeric sheets or film such as the same material as discussed above with regard to sub-containers 17. In some embodiments, one portion of conduit 13 can be formed from a rigid material while another portion can be formed from a flexible material.

Conduits 13 can be cylindrical as illustrated. However, conduits 13 can also have a transverse cross sectional configuration other than circular such as oval, oblong, polygonal or have other geometric or other non-curved configurations. Conduits 13 can also change configuration along their length. For example, opposing ends of a conduit 13 may be cylindrical while a central portion has a square, rectangular, polygonal or other configuration having one or more flat sides to two or more opposing flat sides for attaching, aligning, or otherwise engaging with of one or more acoustic settlers 16 (see FIG. 2). Substantially or entirely non-curved (e.g., square, etc.) conduit 13 is also contemplated herein.

In at least one embodiment, conduit 13 can provide at least one surface (or portion thereof) that is sufficiently rigid such that the transverse cross section of the conduit at that location does not change under the operating conditions of extraction component 10. As discussed in further detail below, the use of acoustic waves requires precise configuration and calibration in order to effectuate active droplet coalescence, and eventually phase settling or separation, at standing wave nodes. Flexible or semi-flexible materials can cause inconsistent results when an acoustic wave is applied therethrough. In addition, the rigid nature, structure, and/or configuration of (at least a portion of) conduit 13 allows for stable mounting, connecting, and/or attachment of one or more acoustic settlers 16 thereto.

The diameter, length, width, cross-section, or other appropriate measurement of conduit 13 can also vary from one embodiment to another. For instance, in some embodiments, conduit 13 can have a maximum diameter of less than 30 cm, less than 25 cm, less than 20 cm, less than 15 cm, less than 12 cm, less than 10 cm, less than 7 cm, less than 5 cm, less than 2 cm, less than 1 cm, between 0.5 cm and 30 cm, between 1 cm and 20 cm, between 5 cm and 18 cm, or between 10 cm and 15 cm. In some embodiments, conduit 13 can have a maximum diameter larger than 30 cm (e.g., 35 cm, 40 cm, 45 cm, 50 cm, 60 cm, 70 cm, 80 cm, 90 cm, 1 m, 2 m, 5 m, 10 m, etc.). Furthermore, in at least one embodiment, the diameter of conduit 13 can change along the length thereof.

In some embodiments, the size or the diameter of conduit 13 is selected to optimize the efficacy of the acoustic wave on the fluid within conduit 13. Conduits too large can decrease the efficiency of the settling produced by the acoustic wave. Conduits too small can induce turbulent flow and impede trapping of droplets in the acoustic wave. One will appreciate that reference to a diameter in circular or cylindrical embodiments can be interpreted as a length, width, cross-section, or other appropriate measurement in other embodiments without departing from the scope of this disclosure. Although conduits 13 can be any desired length, conduits 13 typically have a length in a range between about 10 cm to about 100 cm with about 20 to about 60 cm being more preferred. Other lengths can also be used.

Figure 3:
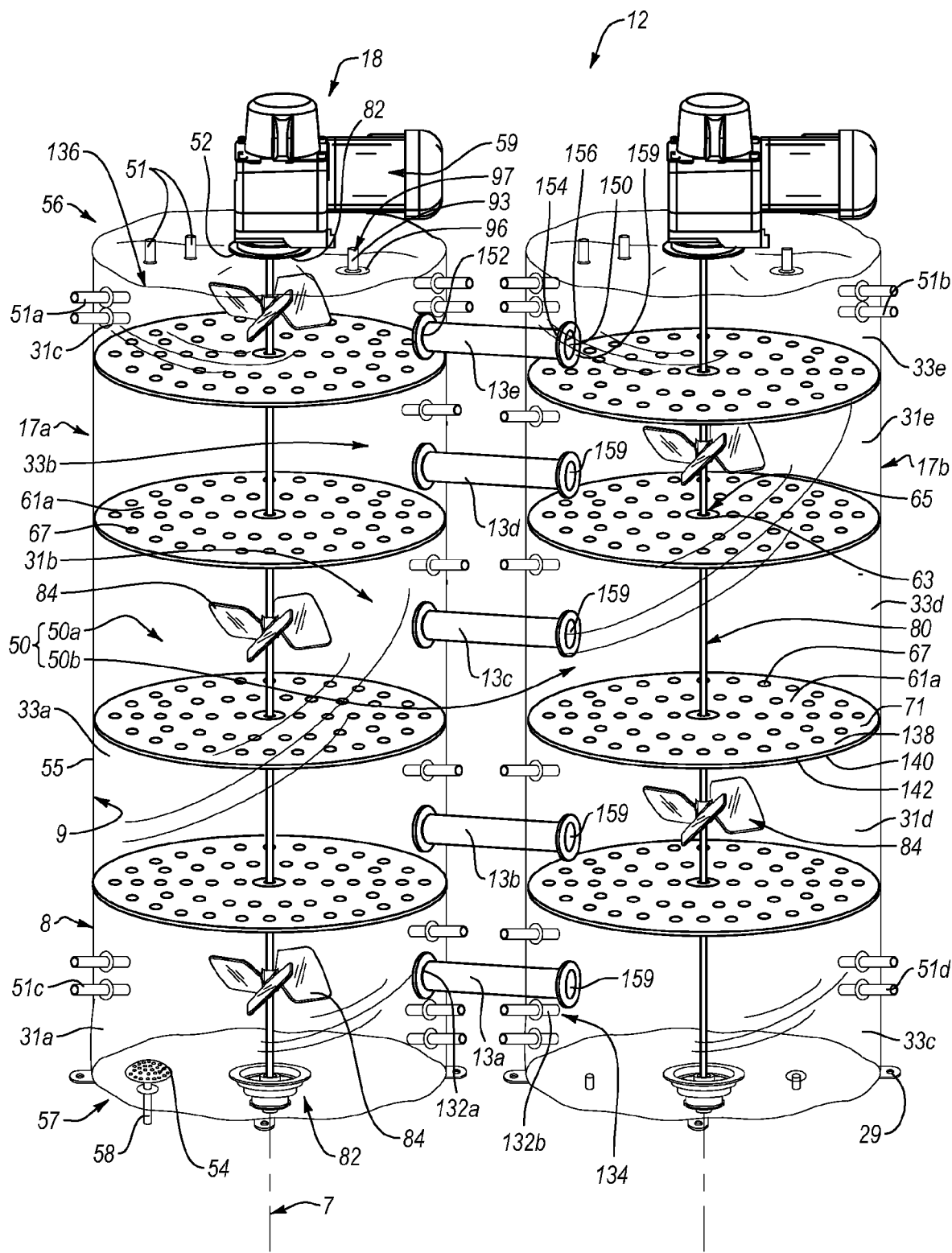
FIG. 3 is a perspective view of a container assembly useful in the system of FIG. 1.

With continued reference to FIG. 3, conduits 13 can be connected to sub-containers 17 in a variety of different ways. In the depicted embodiment, ports 132 (such as ports 132a and 132b) having an opening 134 extending therethrough can be mounted on sub-containers 17a and 17b at desired locations so as to communicate with mixing zones 31 and settling zones 33. Ports 132 can comprise any type of tubular fitting, such as a conventional barb port, tube port, or the like which can connect to sub-containers 17, such as by welding, adhesive or other traditional techniques and to which conduits 13 can connect, typically by press fit, friction fit, threaded connection, crimping, clamp or the like. Ports 132 typically comprise a tubular stem having a radially encircling flange the connects to sub-containers 17. Opening 134 extending through the stem can be circular or have a polygonal, oval, irregular or other transverse cross section. Alternatively, opposing ends of conduits 13 can be directly connected to sub-containers 17 such as by welding, adhesive, or the like.

In view of the foregoing, container assembly 12 bounds a sample purification compartment 136. Compartment 136 comprises sub-compartment 50a of sub-container 17a, sub-compartment 50b of sub-container 17b, and fluid path 156 of each conduit 13.

Container assembly 12 also includes a plurality of ports 51 having an opening extending therethrough and disposed on each sub-container 17 in fluid communication with sub-compartments 50. In the depicted embodiment, each port 51 comprises a fitting such as a barb port, tube port or other conventional port that connects that sub-container 17 so as to communicate with sub-compartment 50. Ports 51 can have the same configuration as ports 132. Any number of ports 51 can be mounted on sub-containers 17 at any desired number of locations such as upper end 56, lower end 57, and/or along sidewall 55. Ports 51 can align with openings 46 on rigid support housing 15 (see FIG. 2) so that ports 51 can be easily accessed.

Ports 51 can have the same configuration or different configurations and can be used for a variety of different purposes. For example, ports 51 can be used for delivering the liquid phases to be processed into the sub-containers 17 and for removing the processed liquid phases from the sub-containers. For example, port 51a located at the upper end 56 of sub-compartment 50a can comprise a first inlet while port 51b located at the upper end 56 of sub-compartment 50b can comprise a first outlet.

Likewise, port 51c located at the lower end 57 of sub-compartment 50a can comprise a second inlet while port 51d located at the lower end 56 of sub-compartment 50b can comprise a second outlet, the inlets and outlets all being in fluid communication with the sample purification compartment 136. It will be appreciate, however that inlet, outlet, and/or other ports need not be located at upper end 56 and/or lower end 57. For instance, certain ports 51 can be located at one or more intermediate locations (e.g., along sidewall 55). Thus, ports 51 can be used for delivering the liquid phases to be processed directly into phase mixing and/or phase settling zones. Ports 51 can also be used for delivering other fluids such as media, cultures, mixtures, reagents, and/or other components into and out of sample purification compartment 136.

Ports 51 can also be used for coupling one or more probes to sub-containers 17. For example, ports 51 can be used for coupling a probe, such as temperatures probe, pH probe, dissolved oxygen probe, or the like. In at least one embodiment, port 51 can include a stem 93 bounding a channel 97 extending therethrough and having a mounting flange 96 encircling and radially outwardly projecting therefrom. Mounting flange 96 can be welded or otherwise secured to sub-container 17.

In one embodiment, a sparger 54 can be mounted on the upper and/or lower end of sub-container 17a for sparging a phase liquid into sub-container 17a. Sparger 54 can comprise a fritted, perforated, gas permeable or other conventional sparger that will disperse or "bubble" the phase liquid as it is dispensed onto sub-container 17a, e.g., dispenses the phase liquid in small droplets or bubbles into sub-container 17a. Smaller droplets can increase the speed of purification as the molecule of interest is more efficiently moved from the first phase into the second phase. Without being bound to theory, the high surface area to volume ratio of the small droplets can increase the efficiency of molecule transfer. Thus, in one embodiment, sparger 54 can comprise a first and/or second phase inlet to sample purification compartment 136.

Examples of sparger 54 and how they can be used in embodiments of the present disclosure are disclosed in United States Patent Publication No. 2006-0270036, published Nov. 30, 2006 and United States Patent Publication No. 2006-0240546, published Oct. 26, 2006, the entire disclosure of each of which is incorporated herein by specific reference.

Sample purification compartment 136 can be sealed closed and container assembly 12 sterilized, such as by radiation, so that it can be used for processing sterile fluids. During use, container assembly 12 can be disposed within chambers 30 of support housing 15, as depicted in FIG. 2, so that conduits 13 are openly exposed and extend between support housings 15a and 15b. Container assembly 12 can subsequently be disposed of following a single use and then replaced with a new container assembly. In at least one embodiment, however, container assembly 12 can be used more than one time for fluid processing and then removed from support housings 15 for disposal. One will also appreciate that container assembly 12 can also be reusable and/or comprised of a washable and/or sterilizable material.

iii. Shielding Elements

Shielding elements 61 can be disposed within sub-compartments 50 of sub-containers 17. Shielding elements 61 can serve a variety of functional purposes and have a variety of structural configurations. For instance, as depicted in FIG. 3, shielding element 61 can assist in the separation between mixing zones 31 and settling zones 33 and at least partially control the flow of a fluid sample within container assembly 12. In other embodiments discussed below, shielding element 61 can assist in the separation between mixing zones 31. Shielding elements 61 can also be configured to encourage fluid flow in one or more directions and/or restrict fluid flow in one or more different directions within container assembly 12.

Shielding element 61 can comprise a baffle, barrier or other turbulence-calming or fluid-obstructing element. In one embodiment, settling zone 33 comprises a portion of a sub-compartment 50 or sample purification compartment 136 that is bounded by at least one shielding element 61 and is devoid of a mixing element disposed directly therein or a mixing element that directly mixes the fluid therein. Settling zone 33 can be bounded between two shielding elements 61, between one shielding element and the wall of sub-container 17 or between a shielding element 61 and some other structure within sub-compartment 50 or sample purification compartment 136.

Likewise, mixing zone 31 comprises a portion of a sub-compartment 50 or sample purification compartment 136 that is bounded by at least one shielding element 61 and has a mixing element disposed directly therein or a mixing element that directly mixes the fluid therein. Mixing zone 31 can be bounded between two shielding element 61, between one shielding element and the wall of sub-container 17 or between a shielding element 61 and some other structure within sub-compartment 50 or sample purification compartment 136. In this and in other embodiments disclosed herein, it is appreciated that any number of mixing zones and settling zones can be used. For example, a extraction component may have between 2 and 60 mixing zones and settling zones (each) but more commonly between 2 and 20 or between 2 and 10. Other numbers can also be used.

The lack of a mixing element within settling zone 33 combined with the calming influence or barrier effect of shielding elements 61 can allow for the settling of a fluid sample within settling zones 33. In one embodiment, fluid path 156 within conduit 13 can be considered a settling zone that is either independent or can be combined with settling zone 33 to form a larger settling zone. For instance, fluid path 156 can also be shielded from the agitating influence of mixing elements by virtue of its size or configuration and/or by placing smaller shielding elements 61 at or near the opening(s) of conduit 13. Thus, in some embodiments, a settling zone can comprise a portion of sub-compartment 50 devoid or free of a mixing element 84 and/or at least a portion of fluid path 156 of conduit 13. In other embodiments fluid path 156 of conduits 13 can be considered separate from either settling zone 33 or mixing zone 31.

Shielding element 61 can comprise a body 71 having opposing faces 138 and 140 that extend to a perimeter edge 142. Body 71 can comprise a panel wherein opposing faces 138 and 140 are substantially flat and are substantially parallel to each other. In other embodiments, faces 138 and 140 need not be flat but can be contoured or otherwise configured or have members attached thereto that enhance damping or mixing. One or more spaced apart openings 67 extend between faces 138 and 140 for allowing fluid to pass therethrough. In at least one embodiment, the openings 67 can be sized according to the ratio of light phase to heavy phase in the fluid mixture in order to accomplish or effectuate control over the flow of the mixture (or phases thereof) within container assembly 12.

Shielding element 61 can also include one or more additional openings 65 for receiving at least a portion of mixer system 18 therein. For example, as discussed below in more detail, a rotatable hub 63 having opening 65 extending therethrough can be centrally mounted on body 71. A bearing can be positioned between hub 63 and body 71 to permit free rotation of hub 63.

Shielding element 61 can be formed of a rigid, semi-rigid, or flexible material and can be made in any suitable size. For example, the material could be a metal, glass, plastic or the like that is self-supporting. In other embodiments, shielding element 61 can be comprised of flexible polymeric sheet or film such as those used to form sub-containers 17 as discussed above. In at least one embodiment, shielding element 61 comprises a circular disk configured and sized to fit snuggly within sub-compartment 30. Thus, the diameter of shielding element 61 can be equal to or substantially the same as the diameter of sub-compartment 30 (or a sub-container thereof). Shielding element 61 can also have a smaller or larger diameter than container 12 without departing from the scope of this disclosure. In at least one embodiment, a shielding element 61 can be position within or adjacent to an opening of conduit 13. Thus, shielding element 61 can also have a diameter equal to, greater than, less than, or substantially similar to the diameter of conduit 13.

Shielding elements 61 are typically secured to sub-container 17 by being welded thereto. For example, perimeter edge 142 can be welded to the interior surface of sub-container 17 or sub-container 17 can be formed form discrete sections which are welded to the opposing faces 138 and 140 of shielding elements 61 adjacent to perimeter edge 142. Other techniques for attaching can also be used.

Opening(s) 67 can be positioned or disposed at any suitable location in or about body 71. For instance, opening(s) 67 can be positioned around the peripheral edge of body 71, adjacent to the center of body 71, or at another suitable location or position. Opening 67 can comprise a pore, apertures, and/or void in body 71. Openings 67 can have a substantially circular, oval, crescent, rectangular, or other shape. Openings 67 can be all the same size and shape or can be different sizes and/or shapes. Opening 67 can also have a filtering element, such as a screen, aligned therewith or disposed therein. The filtering element can be configured to reduce or inhibit fluid flow through opening 67. A guard can be used in association with each or select openings 67 to further shield settling zone 33 from the turbulence created by mixing element 84 in mixing zone 31. For instance, a guard may be applied to one or more openings 67 to prevent or slow a mixed region of the first and second fluid from being drawn into the respective outlets of fluids three or four, as discussed in further detail below. The guard may also be applied to hold a thicker or more-dense layer of fluid within the settling zone in order to improve settling of mixture of the fluids or transfer of the product or contaminant molecule therebetween.

Figure 4A:
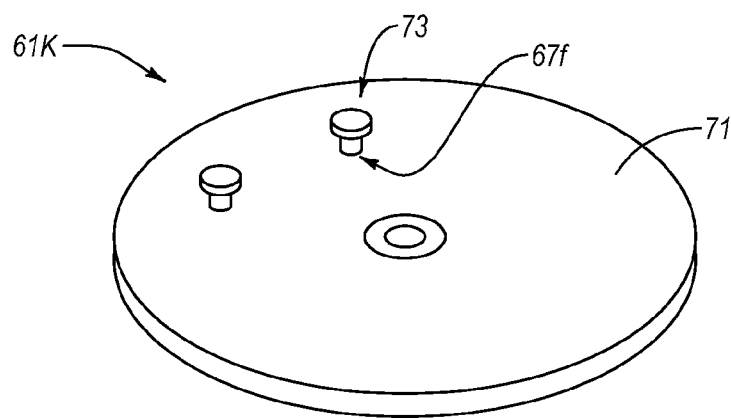
FIG. 4A is a perspective view of a shielding element useful in the system of FIG. 1.
Figure 4B:
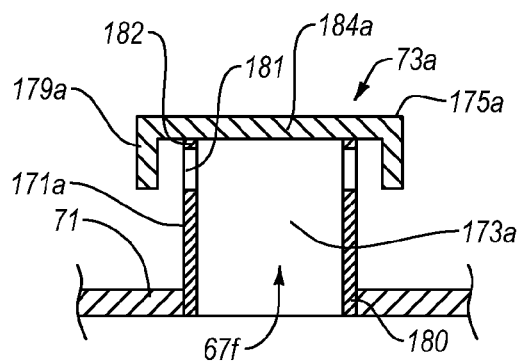
FIG. 4B is a cross-sectional view of a guard element useful in the system of FIG. 1.
Figure 4C:
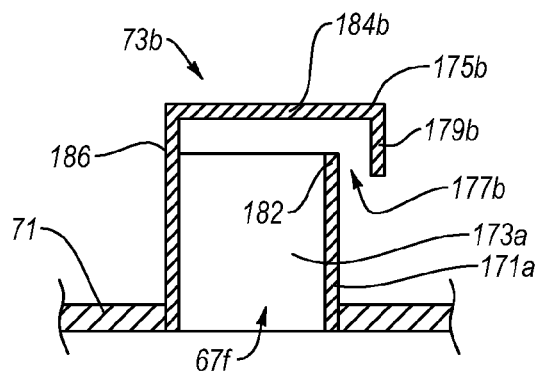
FIG. 4C is a cross-sectional view of an alternative guard element useful in the system of FIG. 1.

For example, as illustrated in FIGS. 4A-4C, a shielding element 61$k$ comprises body 71 having one or more guards 73 covering or associated with one or more openings 67$f$. Guards 73 can be configured to further shield settling zone 33 from the turbulence created by mixing element 84 in mixing zone 31. For instance, FIG. 4B illustrates a guard 73$a$ having a tubular stem 171$a$ that bounds a channel 173$a$ and is aligned with opening 67$f$. Stem 171$a$ extends from a first end 180 secured to body 71 and an opposing second end 182. A plurality of radially spaced apart openings 181 laterally extend through stem 171$a$ at second end 182.

Guard 73$a$ also includes a cap 175$a$ that having a top 184$a$ and an annular weir 179$a$ that projects therefrom. Top 184$a$ is secured to second end 182 of stem 171$a$ so as to close channel 173$a$ thereat. Weir 179$a$ projects from top 184$a$ at a perimeter edge thereof back towards body 71. Weir 179$a$ is spaced apart from stem 171$a$ but projects past openings 181 so that fluid passing through openings 181 must travel around weir 179$a$ before it can rise. In this configuration, guard 73$a$ forms a shield between adjacent mixing and settling zones. Furthermore, turbulent fluid entering through opening 67$f$ can be calmed as it is forced to change direction by traveling laterally through openings 181 and then around weir 179$a$ to exit guard 73$a$.

FIG. 4C illustrates an alternative embodiment of guard 73$b$. Specifically, guard 73$b$ comprises stem 171$a$ having channel 173$a$ but lateral openings 181 have been removed. A cap 175$b$ includes a leg 186 that upstands from second end 182 of stem 171$a$, a top 184$b$ that extends from leg 186 and passes over second end 182 of stem 171$a$ and a weir 179$b$ that is spaced apart from stem 171$a$ but projects from a perimeter of top 184$b$ past second end 182 of stem 171$a$ back toward body 71. Again, guard 73$b$ forms a shield between adjacent mixing and settling zones. Furthermore, turbulent fluid entering through opening 67$f$ can be calmed as it is forced to change direction by traveling along the tortuous path through guard 73$b$. It is appreciated that guards 73 can come in a variety of different configurations which each form a non-linear flow path through which the fluid can flow.

Figure 7:
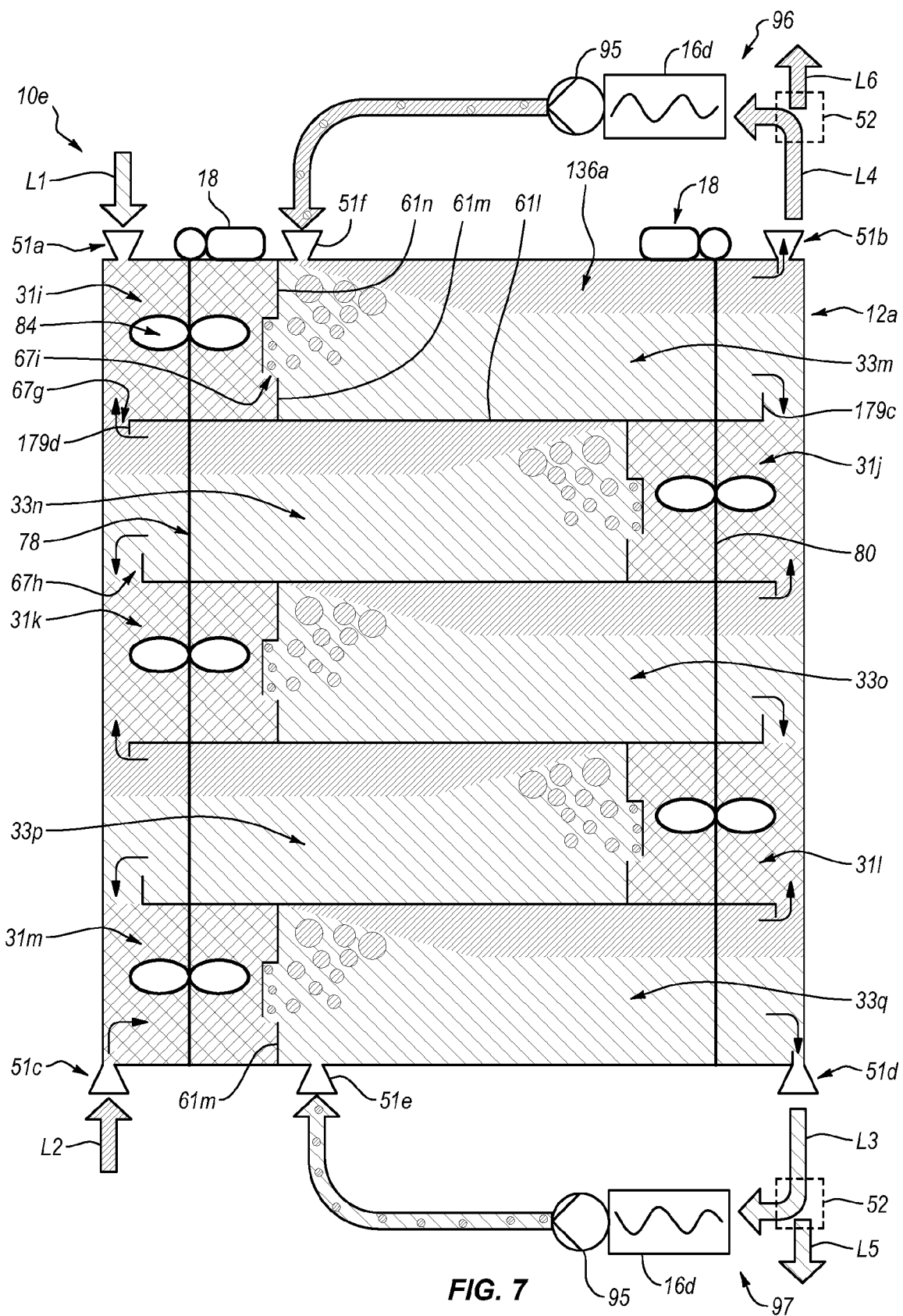
FIG. 7 is schematic representation of another embodiment of a sample purification system according to an embodiment of the present disclosure.

As illustrated in FIG. 7, an alternative shielding element 61$l$ can comprise one or more (vertical) weirs 179$c$, 179$d$ (e.g., extending from one or more of the surfaces thereof). Weir 179$c$ can extend (upwardly) from an upper surface shielding element 61$l$ and/or weir 179$d$ can extend (downwardly) from a lower surface of shielding element 61$l$. Weir 179$c$, 179$d$ can have a length that extends from a first side of shielding element 61$l$ to or towards a second side of shielding element 61$l$ and can comprise any suitable height. For instance, weir 179$c$, 179$d$ can extend entirely across a portion of shielding element 61$l$ (e.g., such that weir 197$c$, 179$d$ corresponds to a secant line or cord of a circular shielding element 61$l$). Accordingly, when shielding element 61$l$ is disposed within container 12$a$, weir 179$c$, 179$d$ can extend (entirely) across a portion of the container (e.g., from a first portion of the side wall to a second portion of the side wall. Thus, weir 179$c$, 179$d$ can comprise a (partial) barrier. Weir 179$c$, 179$d$ can also extend across non-circular containers 12$a$.

The height of weir 179$c$, 179$d$ can be up to about half the distance between shielding element 61$l$ and an adjacent shielding element in at least one embodiment. For instance, as illustrated in FIG. 7, shielding elements 61$l$ can be separated by a distance. Thus, in certain embodiments, the height of weir 179$c$, 179$d$ can correspond to or be less than or equal to 50% of the separation distance. In at least one embodiment, weir 179$c$, 179$d$ can enhance settling by forcing a (coalesced and/or coalescing, heavy or light) phase to pool up behind weir 179$c$, 179$d$ before flowing over weir 179$c$ (or under weir 179$d$) in order to pass through opening 67$g$ or 67$h$, respectively. Specifically, opening 67$g$ can comprise an upward flow path opening for a light phase and/or opening 67$h$ can comprise a downward flow path opening for a heavy phase. The pooling of a coalesced phase can allow small, dispersed phase droplets to coalesce more easily with the large, pooled body than with other small, dispersed phase droplets.

Weir 179$c$, 179$d$ can be oriented upward or downward. In at least one embodiment, weir 179$c$, 179$d$ can be oriented so as to cause pooling or collection of the dispersed phase. Thus, if the dispersed phase is the light(er) or less dense phase, weir 179$d$ can be oriented downward such that a coalesced body of light phase is trapped behind weir 179$d$ until the mass, size, and/or amount of the coalesced light phase exceeds the height of weir 179$d$. Once the mass, size, and/or amount of the coalesced light phase exceeds the height of weir 179$d$, the coalesced light phase can begin to flow (counter-currently) about or around (e.g., under) weir 179$d$ in order to pass through opening 67$g$. Alternatively, a heavy dispersed phase can coalesce into a pooled body behind an upward oriented weir 179$c$ until it flows over the top thereof and through opening 67$h$. Similarly, weir 179$c$, 179$d$ can be oriented so as to cause pooling or collection of the continuous phase, whether lighter or heavier. It will be appreciated that weir 179$c$, 179$d$ can also extend from one or more surfaces of container 12$a$ (e.g., adjacent outlet port(s) 51$d$, 51$d$).

As further illustrated in FIG. 7, one or more vertically oriented shielding elements 61$m$, 61$n$ can extend from one or more of the surfaces of shielding element 61$l$ and/or container 12$a$. For instance, shielding element 61$m$ can extend (upwardly) from an upper surface shielding element 61$l$ and/or (upwardly) from a bottom interior surface of container 12$a$. Similarly, shielding element 61$n$ can extend (downwardly) from a lower surface shielding element 61$l$ and/or (downwardly) from an upper interior surface of container 12$a$. Unlike shielding elements 61$l$, which comprise and/or provide a baffle between vertically separated mixing and settling zones, shielding elements 61$m$, 61$n$ comprise and/or provide a baffle between horizontally separated mixing and settling zones.

Shielding elements 61*m*, 61*n* can be at least partially (vertically and/or horizontally) separated by a distance sufficient to form an opening 67*i*. Accordingly, a mixed (phase) sample (e.g., within mixing zone 31*i*) can be directed through opening 67*i* (e.g., into settling zone 33*m*). Opening 67*i* does not negate the functionality of shielding elements 61*m*, 61*n* in some embodiments. For instance, the configuration, orientation, and/or position of shielding elements 61*m*, 61*n* can maintain a shielding and/or baffling effect (e.g., between mixing zone 31*i* and settling zone 33*m*). Thus, a coalescing and/or settling phase sample (e.g., in settling zone 33*m*) can be shielded from turbulence and/or agitation (e.g., produced by mixing element 85 and/or in mixing zone 31*i*). Shielding elements 61*m*, 61*n* may also inhibit and/or substantially prevent coalescing and/or settling phase sample (e.g., in settling zone 33*m*) from flowing past shielding elements 61*m*, 61*n* and/or through opening 67*i* (e.g., (back) into mixing zone 31*i*).

iv. Mixer Systems

Returning now to FIG. 2, mixer system 18 can be designed or configured for mixing and/or suspending (or configured to and/or operable to mix and/or suspend) fluid within container assembly 12. Specifically, mixer system 18 can actively disperse droplets of a first phase through a surrounding second phase. In at least one embodiment, mixer system 18 can be designed or configured to reduce the droplet size to increase purification speed and/or efficiency. For instance, smaller droplet sizes can increase the transfer rate of a molecule of interest from a first phase into a second phase.

Mixer system 18 can include one or more drive motor assemblies 59 mounted on or coupled to support housings 15 via one or more bracket or other support members 53. In alternative embodiments, however, drive motor assembly 59 can be mounted on a separate structure adjacent to support housings 15 (not shown).

As will be discussed in further detail below, mixer system 18 can also include one or more mixer assemblies 78 (e.g., coupled to, disposed at least partially within, and/or projecting into sub-compartments 50) and one or more drive shafts (e.g., interfacing with and/or extending from drive motor assembly 59). As will also be discussed in further detail below, some other components of mixer system 18 can also be at least partially disposed in container assembly 12. For instance, FIG. 3 illustrates that portions of mixer system 18 can be disposed within container assembly 12 (or sub-compartments 50 thereof), while other components can be disposed outside container assembly 12 (or sub-compartments 50 thereof).

Figure 5A:
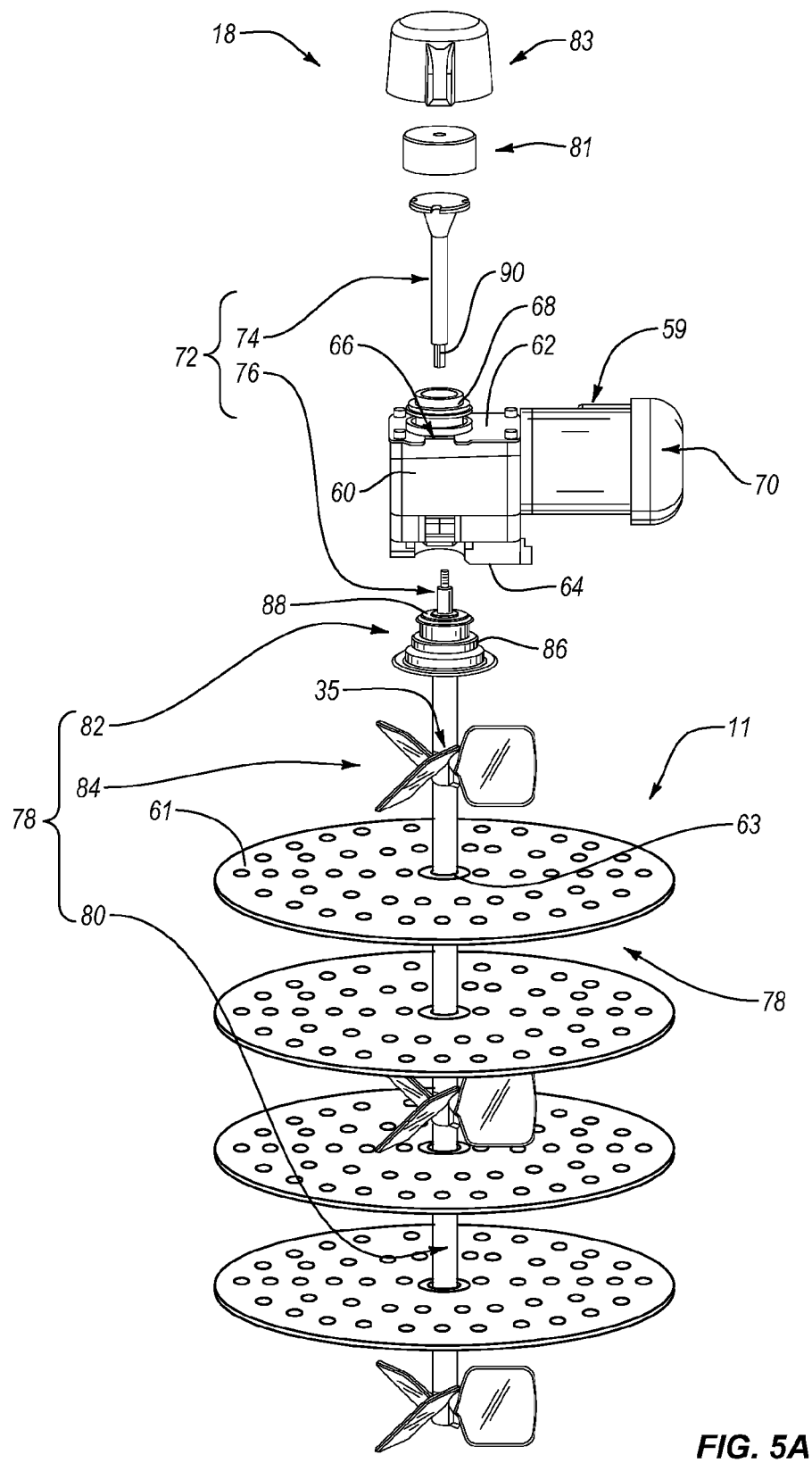
FIG. 5A is an exploded view of a mixer system useful in the system of FIG. 1.
Figure 5B:
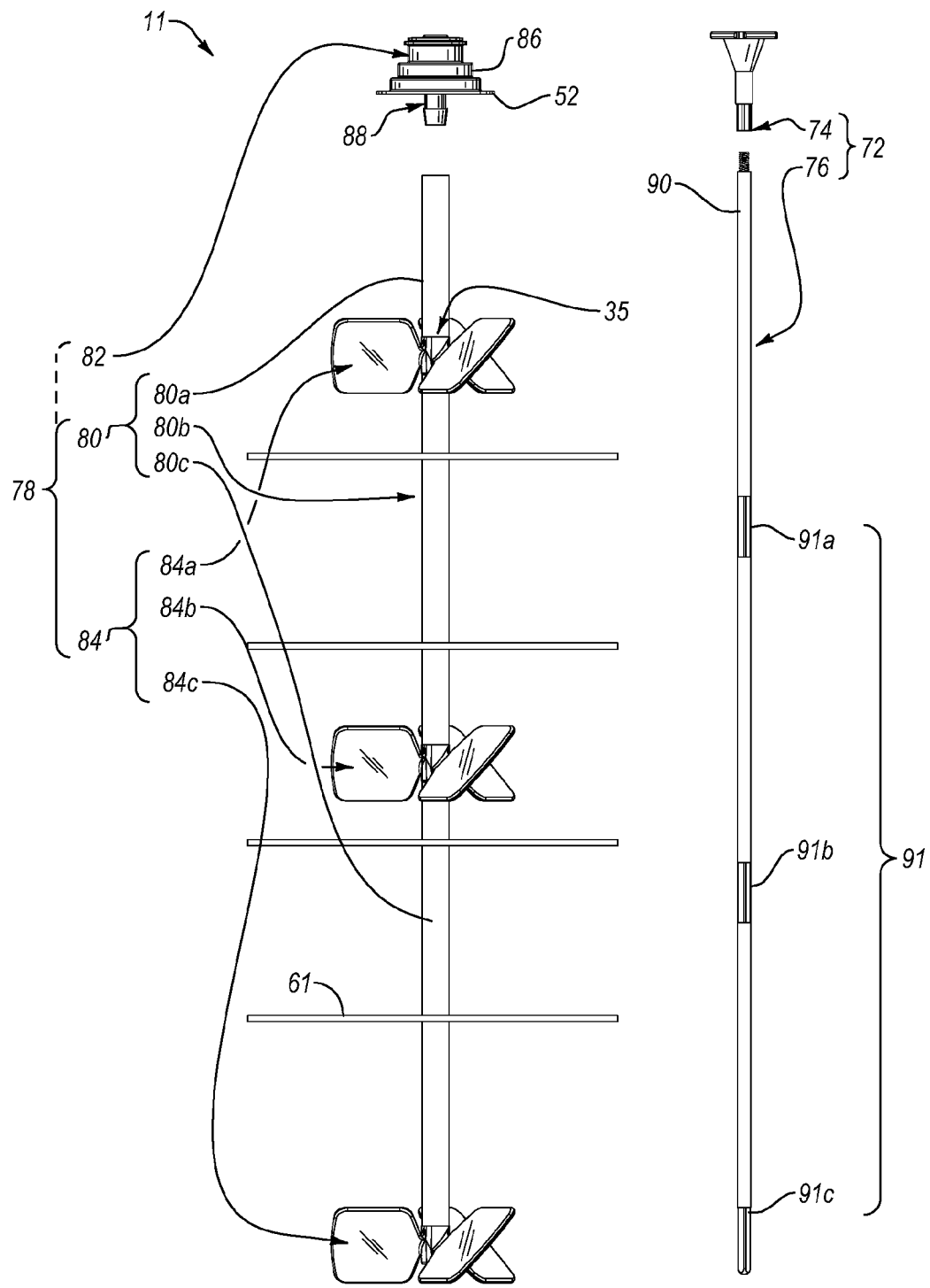
FIG. 5B is an exploded view of a mixer assembly of the mixer system of FIG. 5A.

FIGS. 5A and 5B illustrate components of an exemplary mixer system 18 according to an embodiment of the present disclosure. Mixer system 18 can be used for mixing and/or suspending a fluid, mixture, or solution within container each mixing zone 31. As depicted in FIG. 5A, mixer system 18 generally comprises drive motor assembly 59, mixer assembly 78, and drive shaft 72, each of which will now be discussed in detail below.

Drive motor assembly 59 comprises a drive motor 70. In some embodiments, drive motor assembly 59 comprises a housing 60 having a top surface 62 and an opposing bottom surface 64 with an opening 66 extending through housing 60 between surfaces 62 and 64. A tubular motor mount 68 is rotatably secured within opening 66 of housing 60. Drive motor 70 can be mounted to housing 60 and engage with motor mount 68 so as to facilitate select rotation of motor mount 68 relative to housing 60. Drive motor assembly 59 can be configured to interface with mixer assembly 78 by means of drive shaft 72. Certain embodiments can also include gaskets, seals, rings, washers, and/or any other necessary component for coupling and/or operating drive motor assembly 59 or drive motor 70 thereof.

Mixer assembly 78 can comprise an elongated tubular connector 80 having rotational assembly 82 secured to one or both ends thereof, and one or more mixing elements 84 secured to or along connector 80. Tubular connector 80 can comprise a rigid material that is self-supporting but is more commonly made from a flexible tube that can be folded over without plastic deformation. In at least one embodiment, elongated tubular connector 80 can comprise a plurality of separate elongated tubular connector portions that extend between and connect to opposing sides of mixing elements 84 and/or shielding elements 61. In other embodiments, elongated tubular connector 80 can comprise a unitary member that passes through mixing elements 84 and/or shielding elements 61. For example, tubular connector 80 can pass through or connect on opposing sides of hub 63 of each shielding element 61. Other methods of attachment can also be used.

As further illustrated in FIG. 5B, rotational assembly 82 of mixer assembly 78 can comprise an outer casing 86 and a tubular hub 88 that centrally extends through outer casing 86 and is rotatably coupled thereto. One or more dynamic seals can be formed between outer casing 86 and tubular hub 88 so that a sterile seal can be maintained therebetween. In contrast to static seals, dynamic seals allow relative motion between the mating surfaces being sealed. Dynamic O-ring seals, in particular, can be applied to a wide variety of embodiments described herein. Other dynamic seals include, but are not limited to reciprocating seals, floating pneumatic piston seals, rotary seals, oscillating seals, etc. In some embodiments, one or more bearings can also be disposed between outer casing 86 and tubular hub 88.

Rotational assembly 82 (or outer casing 86 thereof) can be secured to sub-container 17 so that tubular connector 80, which is coupled with hub 88, extends into compartment 50 of container 12 (see FIG. 3). In at least one embodiment, a rotational assembly 82 can be secured to the upper end 56 and lower end 57 of sub-container 17 with the opposing ends of tubular connector 80 connecting to the hubs 88 thereof. As such, connector 80 can extend between the opposing end of sub-container 17. Alternatively, rotational assembly 82 can only be connected to upper end 56 with connector 80 coupled thereto. The opposing end of connector 80 is thus disposed within sub-container 17 spaced apart from lower end 57.

Mixing element 84 can serve a variety of functional purposes and have a variety of structural configurations. For instance, an illustrative mixing element 84 can at least partially control the flow of a fluid sample within sub-container 17. Mixing element 84 can be configured to encourage flow in one or more directions and/or restrict flow in one or more different directions. Mixing element 84 can also agitate, emulsify, mix, combine, and/or blend together a plurality of fluids, samples, liquids, phases, mixtures, etc.

Mixing element 84 can comprise an impeller having one of more impeller blades or fins mounted thereon. Mixing element 84 also includes any other structure that can mix when rotated such as paddles, ribs, vanes or the like. Mixing elements 84 can be disposed and/or spaced along connector 80 such that mixing elements 84 are disposed within each mixing zone 31 of container assembly 12 and are not disposed within any settling zones 33. For instance, FIG. 3 illustrates a plurality of mixing elements 84 connected to connector 80 within compartment 50 of container 12. Mixing elements 84 are confined to mixing zones 31 and separated from settling zones 33 by shielding elements 61. FIG. 3 also illustrates a connector 50 extending between upper and lower rotational assemblies 82, connected to the upper and lower walls of container 12, respectively. FIG. 5A, on the other hand, illustrates a connector 80 that extends from an upper rotational assembly 82 and ends at a lower mixing element 84. Connector 80 can extend through an opening 65 in one or more shielding elements 61.

As illustrated in FIG. 5B, for example, mixing elements 84 can all have the same size. In an alternative embodiment, mixing elements 84 can have multiple sizes (e.g., smaller and/or larger mixer elements). In at least one embodiment, for instance, a smaller mixer element applies less mixing energy than a larger counterpart, given the same mixing speed. Thus, while all mixer elements can be rotated at the same speed, the amount of mixing energy to each mixing zone 31 can vary depending on the size of the mixing element 84 disposed therein.

In at least one embodiment, larger mixer element(s) can be included in the mixing zone(s) nearest the continuous phase and/or dispersed phase inlet and/or outlet. In other embodiments, smaller mixer element(s) can be included in the mixing zone(s) nearest the continuous phase and/or dispersed phase inlet and/or outlet. Some embodiments can include a progressive increase and/or decrease in the size of mixing elements along the (counter-current) flow path of the continuous phase and/or dispersed phase. Other embodiments can include mixing elements that increase and then decrease or decrease and then increase along the (counter-current) flow path of the continuous phase and/or dispersed phase.

In some embodiments, mixing element 84 can comprise one or more rotating members, oscillating members, vibrating members, stirring members, shaking members, and/or sonicating members. For instance, mixing element 84 can comprise a vertically agitated (or pulsed up and down) porous plate. Alternatively, mixing element 84 can comprise a flat, spinning disc. Accordingly, one will appreciate that mixing element 84 can comprise any suitable mixing means (e.g., known in the art and/or compatible with liquid-liquid extraction). As discussed in further detail below, mixing of an aqueous two-phase (ATP) sample, for instance, can form an emulsion, suspension, or other fluid mixture of the two immiscible phases. Mixing can substantially increase the surface area-to-volume ratio for the contacts between the two phases to enhance transfer of a molecule of interest from one phase to the other. Indeed, vigorous mixing can further enhance efficient transfer in some embodiments by further reducing the surface area-to-volume ratio and/or mean droplet size of one or more phases. However, vigorous mixing can also form micro-droplets of one or more of the phases that can become trapped in the coalesced body of the other phase. Micro-droplet contamination by an opposite phase can increase the concentration of impurities or contaminants and/or decrease the yield of molecule of interest in certain embodiments. Accordingly, mixing speed can be a tightly-controlled parameter that effectuates a number of results.

Tubular connector 80 is configured to receive at least a portion of drive shaft 72 therein. As illustrated in FIGS. 5A and 5B, drive shaft 72 can comprise a head section 74 and a shaft section 76 that are either connected together or integrally formed as a single piece. A portion of drive shaft 72 (e.g., head section 74) can be configured to pass through motor mount 68 of drive motor assembly 59 (and thus through housing 60). FIG. 5B illustrates that head section 74 can include a drive portion 90 that engages with hub 88 of rotational assembly 82. Likewise, drive shaft 72 includes one or more drive portion 91a-c along the length thereof that engage mixing elements 84a, 84b, 84c, respectively, by forming a key-fit engagement. That is, drive portions 90 and 91 have a have a polygonal or other non-circular configuration that is received within a complementary channel within hub 88 and mixing elements 84. Other mechanisms for attaching can also be used. FIG. 5B also illustrates that connector 80 can comprise connector sections 80a, 80b, and 80c, having mixing elements 84a, 84b, 84c, respectively, connected thereto and/or disposed therebetween (e.g., at an interface or connection point 35).

With drive shaft 72 engaging mixing element(s) 84 and hub 88, rotation of draft shaft 72 facilitates rotation of hub 88, tubular connector 80 and mixing elements 84 relative to outer casing 86, sub-container 17 and shielding element 61. Mixer system 18 can also include a cap 81 for securing drive shaft 72 to motor mount 68 and a cover 83 for covering cap 81.

During use, container assembly 12 with mixer assemblies 78 secured thereto can be positioned within chambers 30 of support housings 15 as discussed above. Casing 86 of rotational assembly 82 is then be removably connected to bottom surface 64 of housing 60 of drive motor assembly 59 (e.g., so that hub 88 is aligned with motor mount 68). The distal end of drive shaft 72 can then be advanced down through motor mount 68, through hub 88 of rotational assembly 82, and through tubular connector 80 so that drive shaft 72 engages with each mixing element 84. In this assembly, activation of drive motor 59 causes rotation of drive shaft 72 which in turn cause rotation mixing elements 84.

With drive shaft 72 fully passed through motor mount 68, and head section 74 of drive shaft 72 engaging motor mount 68, drive motor 59 can be activated to facilitate rotation of motor mount 68. In turn, rotation of motor mount 68 facilitates rotation of drive shaft 72 which facilitates rotation of hub 88, connector 80, and mixing elements 84. Rotation of mixing element 84 facilitates mixing and suspension of the fluid within sub-compartments 50 of container assembly 12. Further disclosure with regard to mixer system 18, the operation thereof, and alternative embodiments thereof are disclosed in United States Patent Publication No. 2011-0188928 A1, published Aug. 4, 2011, the entire disclosure of which is incorporated herein by specific reference.

As will be appreciated, some of the above described embodiments can allow for certain components of mixer system 18 to be sealed within container assembly 12. In some embodiments, for example, container assembly 12 can have connector(s) 80, mixing elements 84, and/or shielding elements 61 (at least partially) disposed therein. Other components can also be disposed within container assembly 12. Inclusion of such components in container assembly 12 can allow for single-use or other disposable applications of container assembly 12. For instance, container assembly 12, connector 80, mixing elements 84, and/or shielding elements 61 can be comprised or formed of inexpensive, polymeric or other disposable material such that disposal of the same after one or more uses can be a cost-effective and time-saving approach. Accordingly, after said use(s), drive motor assembly 59, drive shaft 72, and acoustic settlers or assemblies 16 can be removed from their attachment to container 12. Container assembly 12 can also be removed from housing 14 (where applicable) and disposed of having connector 80, mixing elements 84, and/or shielding elements 61 still disposed therein.

The above described mixer system 18 and the alternatives thereto comprise one embodiment of means for mixing fluid contained within container assembly 12 and more specifically within mixing zones 31. In alternative embodiments, it is appreciated that mixer system 18 can be replaced with a variety of other mixing systems. For example, in some embodiments, mixer system 18 can permit rotation of the mixing elements without rotation of connector(s) 80. In other words, in certain embodiments, mixing elements 84 can be rotatable about an axis of rotation 7 while the connector(s) 80 and/or shielding elements 61 are in a substantially fixed position, are configured to remain substantially stationary, and/or are not rotatably connected to drive shaft 72 or any other component of mixer assembly 11, drive system 18, container 12, and/or extraction component 10.

In some embodiments, mixer system 18 can be replaced with a conventional rigid drive shaft that projects into container assembly 12 through a dynamic seal and has mixing elements 84 connected directly thereto. External rotation of the drive shaft thus facilitates rotation of mixing elements 84 which mix and/or suspends the fluid within container 12.

As indicated above, connector 80 and conduits 13 can be comprised of a flexible material while sub-containers 17 can comprise flexible bags. In this embodiment, container assembly 12 can be collapsed such as by being accordioned, rolled, and/or folded or the like. Collapsing of container assembly 12 can allow for reduced expense and/or effort in use, storage, shipping, and/or transporting container assembly 12. For instance, in a (fully) expanded configuration, container assembly 12 can be many meters in height (i.e., between upper end 56 and lower end 57). However, collapsible embodiments can reduce the height of container 12 by up to or greater than 10%, 20%, 30%, 40%, 50%, 60%, 70%, 80%, 90%, or more.

Figure 6A:
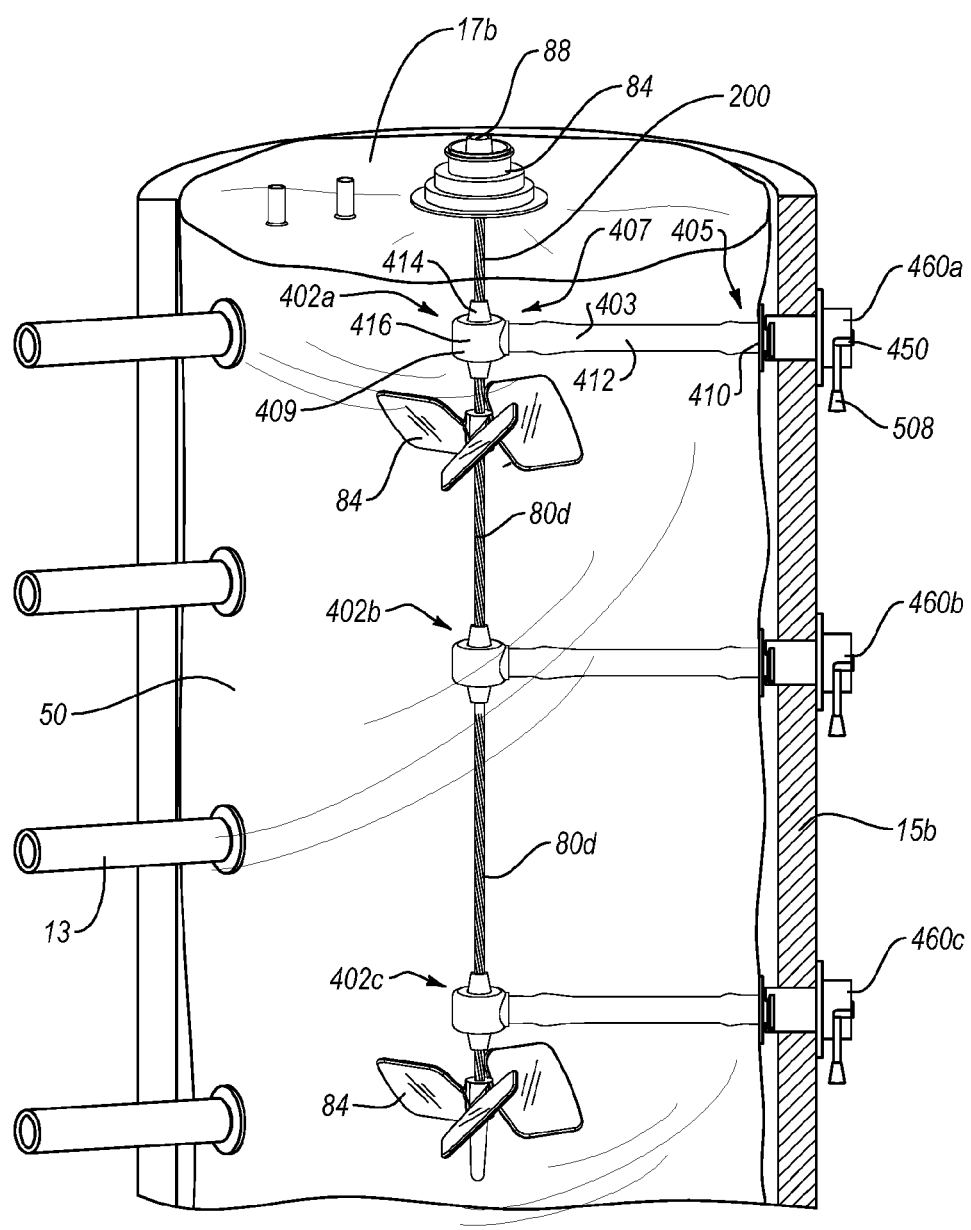
FIG. 6A is a partial cross sectional side view of an alternative mixing system useful in the system of FIG. 1.
Figure 6B:
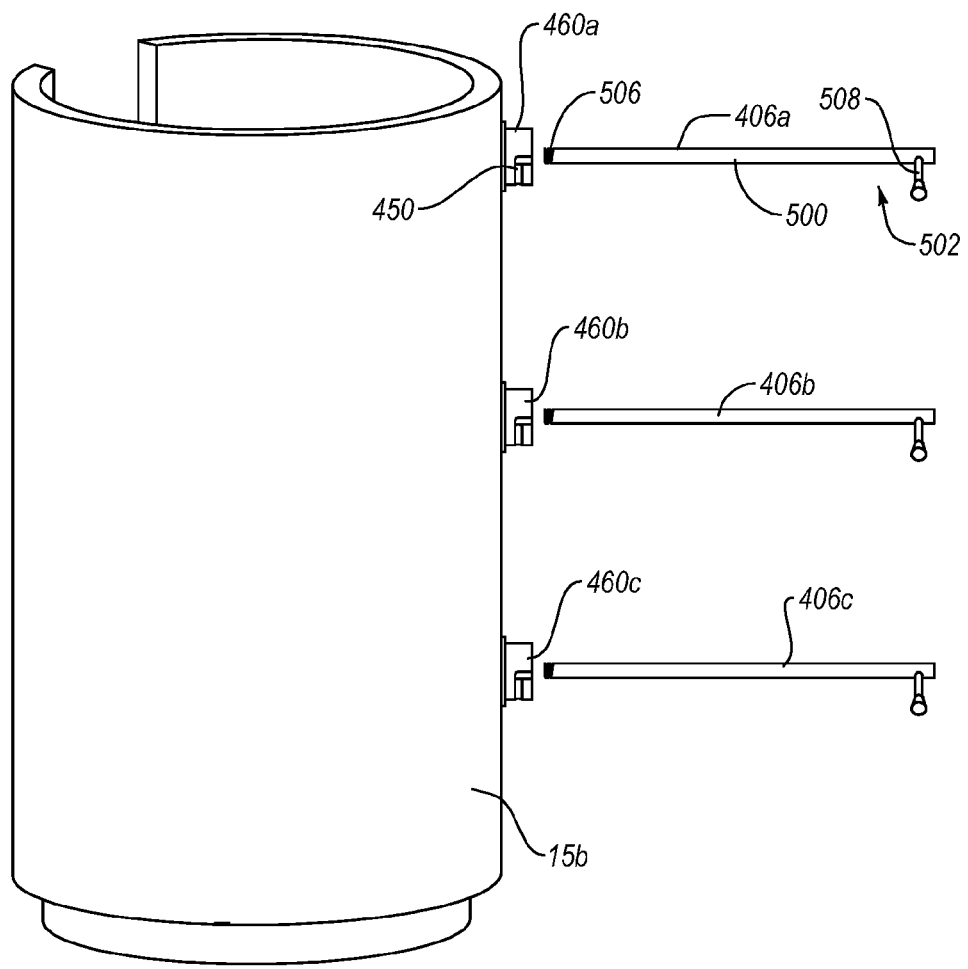
FIG. 6B is an exploded view of a portion of the mixing system depicted in FIG. 6A.

Depicted in FIGS. 6A and 6B is an alternative mixing system. Specifically, depicted in FIG. 6A is support housing 15b having container assembly 17b disposed therein. Shielding elements 61 have been removed to simplify the view. In this embodiment, tubular connector 80 that is used in conjunction with drive shaft 72 has been replaced with a flexible drive line 80d which does not receive drive shaft 72. Drive line 80d can be made from a variety of different flexible materials. By way of example and not by limitation, in one embodiment drive line 80d can be made from a braded material such as cable, cord or rope. The braded material can be made from strands that are comprised of metal, polymer or other materials that have desired strength and flexibility properties and can be sterilized. For example, the strands can be made from stainless steel. In other embodiments, drive line 80d can be made from a flexible tube, a single solid core line such as made from a polymeric material, a linkage, such as a chain or a linkage of universal joints, or other flexible or hinged members.

In one embodiment, drive line 80d can be bent along a central longitudinal axis thereof over an angle of at least 45°, 90°, 180° or more without plastic deformation thereof. In other embodiments, at least a portion of drive line 80d is sufficiently flexible so that the flexible portion of drive line 80d can be twisted under torsion about the longitudinal axis thereof over an angle of at least 45°, 90°, 180°, 360°, 720° or more without plastic deformation thereof.

As depicted in FIG. 6A, a first end 200 of flexible drive line 80d is secured to an upper end wall of sub-container 17b by rotational assembly 82. Mounted on flexible drive line 80d at spaced apart locations are mixing elements 84. To stabilize drive line 80d within sub-compartment 50 of sub-container 17b, lateral support assemblies 402A-C are coupled with flexible drive line 80d at space apart locations along the length thereof. Each lateral support assembly 402A-C comprises a retention assembly 403 having a first end 405 secured to the side of sub-container 17b and an opposing second end 407 secured to flexible drive line 80d. Lateral support assembly 402 also includes a support rod 406 (FIG. 6B) that is selectively received and secured within corresponding retention assembly 403. Each retention assembly 403 comprises a port fitting 410 at first end 405 that is coupled with the side of sub-container 17b, a receiver 409 at second end 407 that is mounted to flexible drive line 80d, and a flexible tube 412 that extends between port fitting 410 and receiver 409.

Receiver 409 comprises an inner housing 414 that is securely fixed to flexible drive line 80d such as by crimping, adhesive, clamps, fasteners, or the like. Receiver 409 also includes an outer housing 416 that encircles inner housing 414. A bearing, such as a ball thrust bearing, roller thrust bearing, or other type of bearing, is disposed between inner housing 414 and outer housing 416. The bearing enables inner housing 414 and drive line 80d to rotate concurrently relative to outer housing 416.

Mounted on and extending through support housing 15b is a plurality tubular locking fittings 460. During use, sub-container 17b is received within the chamber 114 of support housing 15b. Each port fitting 410 is then secured to a corresponding locking fitting 460 on the interior of support housing 15b. As depicted in FIG. 6B, each support rod 406 comprises a linear shaft 500 that extends between a first end 502 and an opposing second end 504. A locking thread 506 is formed on second end 504. A locking arm 508 radially outwardly projects from shaft 500 as first end 502. Support rod 406 is typically comprised of metal but other rigid or semi-rigid materials can also be used.

Once each port fitting 410 is secured to a corresponding locking fitting 460 on the interior of support housing 15b, each support rod 406 is advanced through a locking fitting 460 and a corresponding lateral support assembly 402. Support rod 406 is then rotated causing second end 504 to threadedly engage outer housing 416 of receiver 416. Concurrently, first end 502 securely engages locking fitting as a result of locking arm 508 being received within a locking slot 450 on locking fitting 460. In this configuration, the combination of lateral support assembly 402 and support rod 406 centrally retain flexible drive line 80d within sub-container 17b but still permits drive line 80d to rotate. In turn, the rotation of drive line 80d facilitates the rotation of mixing elements 84.

To rotate drive line 80d a short drive shaft is used to engage hub 88 of rotational assembly 82 but does not extend into drive line 80d. Motor assembly 59 (see FIG. 5A) engages and rotates the drive shaft which in turn rotates drive line 80d. Further details of the above assembly and alternative methods of supporting and rotating a flexible drive line are disclosed in International PCT Publication No. WO2013/151733, published Oct. 10, 2013 which is incorporated herein by specific reference.

In another embodiment, portions of mixer system 18 projecting into container assembly 12 can be configured to repeatedly raise and lower mixing element 84 located within container assembly 12 for mixing the fluid. Alternatively, magnetic stirring members can be disposed within sub-compartments 50 of container assembly 12 and rotated by a magnetic mixer disposed outside of container assembly 12. In yet other embodiments, a stir bar, paddle, or the like that projects into sub-compartments 50 of container assembly 12 can be pivoted, swirled or otherwise moved to mix the fluid. Other mixing techniques can also be used.

Further disclosure and alternative embodiments of support housings, container assemblies, and mixing systems that can be used in the present disclosure are disclosed in U.S. Pat. No. 7,384,783, issued Jun. 10, 2008; U.S. Pat. No. 7,682,067, issued Mar. 23, 2010; and US Patent Publication No. 2006/0196501, issued Sep. 7, 2006, the entire disclosure of each of which is incorporated herein by specific reference.

v. Acoustic Settlers

FIG. 2 further illustrates acoustic settlers 16 attached to a portion of container assembly 12 and supported by support member 172 that are attached to outer walls 20*a* of support housing 15. Those skilled in the art will appreciate that acoustic settler 16 is representative of any suitable acoustic wave generator suitable for use in embodiments of the present disclosure, and does not necessarily reflect and/or represent the actual, structural configuration of such acoustic wave generator. Acoustic settlers 16 are aligned with a conduit 13 of container assembly 12 and are configured to generate at least one standing acoustic wave through fluid path 156 therein. In particular, as depicted in FIG. 2, acoustic settler 16 comprises an acoustic wave transducer 116*a* disposed on one side of conduit 13 and an acoustic wave reflector 116*b* disposed on the opposing side of conduit 13 in alignment with acoustic wave reflector 116*b*. While acoustic settler 16, acoustic wave transducer 116*a*, and acoustic wave reflector 116*b* are illustrated as having square-shaped exteriors, one will appreciate that cylindrical or other shaped exteriors are also contemplated herein.

In at least one embodiment, when acoustic wave transducer 116*a* is activated, it produces an acoustic wave that passes through fluid disposed within conduit 13 and reaches acoustic wave reflector 116*b*. The acoustic wave can then be deflected or reflected by acoustic wave reflector 116*b* back through the fluid within conduit 13. Additional acoustic waves can be transmitted (periodically) until a standing wave is produced. More specifically, by applying a specific voltage or varying voltage to a piezoelectric (a material that turns electric current into a mechanical displacement) resonator a standing waves can be produced at specific resonant frequencies. Thus, in some embodiments, the acoustic settler(s) can create nodal arrangement of the acoustic wave(s) (e.g., within conduit 13), which can cause alignment and/or enhance proximity or association of dispersed phase droplets. The closely-associated droplets can then coalesce into larger and larger phase droplets or bodies until the buoyancy of such bodies are sufficient to induce counter-current flow of the two phases.

In an alternative embodiment, an acoustic wave reflector 116*b* may not be required. For instance, in some embodiments, nodal arrangements can be controlled by sensing properties of the wave at the acoustic wave transducer 116*a* (e.g., and adjusting wave output accordingly). Moreover, in some embodiments, acoustic settler(s) 16 can alternatively or additionally be disposed about one or more settling zones 33. Furthermore, acoustic settler(s) 16 can alternatively or additionally be connected to container 12 via an outlet port 51 (e.g., such that the at least partially extracted and/or purified sample can be acoustically settled on the back end of the extraction component and/or to (specifically) target dispersed phase micro-droplets with one or more acoustic waves).

FIG. 2 depicts the acoustic wave transducer 116*a* and the acoustic wave reflector 116*b* as single or unitary components. One will understand, however, that this is for the sake of simplicity and clarity. In at least one embodiment, the acoustic wave transducer 116*a* and the acoustic wave reflector 116*b* may comprise multiple distinct components. For example, in at least one embodiment, the acoustic settler 16 can comprise multiple (e.g., 2, 3, 4, or more) distinct acoustic wave transducers 116*a* with multiple complementary, distinct acoustic wave reflectors 116*b*. In other embodiments, multiple separate acoustic settlers 16 (e.g., 2, 3, 4, or more) can be attached to each conduit. These configurations may allow for the creation of beneficial multi-nodal systems and/or a higher coalescence or settling speed (e.g., even at faster feed/sample flow rates). In at least one embodiment, multi nodal systems can be created within a single acoustic cell.

Additionally, in at least one implementation, one or more of the individual acoustic wave transducers 116*a* and acoustic wave reflectors 116*b* may be in contact directly with the fluid within the conduit 13. In particular, the one or more individual acoustic wave transducers 116*a* and acoustic wave reflectors 116*b* may be positioned such that they are either within the conduit 13 or at least partially disposed within the conduit 13. In at least one implementation, protective layers may cover one or more of the acoustic wave transducers 116*a* and acoustic wave reflectors 116*b* in order to prevent contamination or erosion from the fluid.

In contrast, in at least one implementation, the acoustic wave transducers 116*a* and the acoustic wave reflectors 116*b* may be positioned on the exterior of the conduit 13. As such, the acoustic waves must first travel through the conduit 13 wall before entering the fluid. Similarly, before being reflected, the acoustic waves must pass through the conduit 13 wall, reflect from an acoustic wave reflector 116*b*, and then pass back through a conduit 13 wall.

The exposure of the fluid sample to the nodal arrangement of the acoustic waves creates areas of different pressure which causes distinct phases within the fluid to separate or coalesce based upon at least one physical property (e.g., density and/or compressibility differences between the two liquid phases) thereof. For instance, the acoustic waves can aggregate or coalesce droplets or particles of the dispersed phase. The coalesced droplets can have a buoyancy or density difference more dominant than drag forces, resulting in counter-current flow and eventual settling of a denser or more-dense phase to the bottom of the container assembly 12 or compartment 50 thereof. Likewise, a less-dense phase can counter-currently flow and eventual settle above a denser phase at the top of container assembly 12 or compartment 50 thereof.

In at least one implementation, a multi-nodal wave can be formed that causes particles or molecules of distinct sizes to congregate at particular points within the acoustic waves. As such, the acoustic waves can cause, enhance, increase, and/or augment the coalescing, aggregating, or combining of smaller droplet of one or more phases into a larger phase body. Soluble molecules within each phase can settle up or down with their corresponding phase, thus accomplishing separation of molecules present in a mixture of phases. Particles or molecules in the fluid, mixture, or phase can also align, organized, settle, and/or separate based on one or more molecular properties. Thus, extraction component 10 can be configured for acoustic wave-assisted processing and/or settling of a fluid sample disposed within container 12 thereof. Further description of exemplary acoustic separators can be found in US Patent Publication US 2014/0011240 A1, the entire disclosure of which is incorporated herein by specific reference.

It is appreciated that acoustic settler 16 can be attached or aligned with conduit 13 in a variety of different ways. For example, acoustic wave transducer 116a and acoustic wave reflector 116b can be connected together by an attachment mechanism 19a so that they encircle and/or press against conduit 13. Alternatively, transducer 116a and reflector 116b can be connected or mounted to opposing sides of conduit 13 without being connected to each other. Thus, transducer 116a and reflector 116b need not encircle conduit 13. It will also be appreciated that acoustic wave transducer 116a and/or acoustic wave reflector 116b can be spaced apart from conduit 13.

In view of the foregoing, in some embodiments, acoustic separator 16 can be clipped onto or attached to or about conduit 13 such that a fluid passing through conduit 13 passes through a section to which the acoustic separator is (externally) attached. In an alternative embodiment, conduit 13 can be attached to or about an acoustic separator 16 such that a fluid passing through conduit 13 passes through the acoustic separator 16. Accordingly, a coupling element or seal can attach the acoustic separator to the ends of a split conduit 13. Acoustic separators 16 can also have one or more chambers, wave generators, reflectors or deflectors, etc. in various embodiment of the present disclosure.

In at least one alternative embodiment, acoustic separator 16 comprises an acoustic wave transducer (e.g., 116a) configured to sense one or more properties of an acoustic wave produced thereby. Furthermore, the acoustic wave produced thereby can be adjusted according to the sensed properties to produce an acoustic wave suitable for embodiments of the present disclosure. Thus, acoustic separator 16 can be driven without a reflector in at least one embodiment (e.g., by measuring the impedance on the piezoelectric, acoustic wave transducer).

Without being bound to theory, impedance is the opposition to an applied voltage by an electric circuit. In a piezoelectric material, for example, the impedance is linked with the mechanical displacement, or vibration, of the piezo. As the fluid in contact with the piezoelectric transducer changes in viscosity, density, compressibility, and droplet or particle size or content, the impedance for vibrating or displacing the piezoelectric transducer will thusly change. In this fashion the voltage applied to the piezoelectric transducer can be modified to reach certain resonant frequencies at which the separation ability of the acoustic separator is most powerful.

Moreover, in at least one embodiment, the transducer can be positioned, configured, adjusted, modified, and/or optimized to (specifically) target dispersed phase micro-droplets. For instance, one or more acoustic separators 16 can be disposed at the back end of the extraction component where a majority of the dispersed phase has been settled out of the surrounding continuous phase. Specifically, after completing a certain number of theoretical stages (e.g., through alternating mixing and settling steps), greater than 70%, greater than 75%, greater than 80%, greater than 85%, greater than 90%, greater than 92%, greater than 95%, greater than 96%, greater than 97%, or greater than 98% of the dispersed phase (by weight or by volume) may have already been settled out of the mixture. The remaining portion (e.g., at least 2%, at least 3%, at least 4%, at least 5%, at least 6%, at least 7%, at least 8%, at least 9%, at least 10%, or more) of the dispersed phase can be trapped in the continuous phase as micro-droplets that, because of the system parameters (e.g., interfacial tension, flow rate, mixing speed, etc.), did not (and in some cases may never) settle out of the surrounding continuous phase (e.g., within an economically relevant period of time). Thus, back-end acoustics can achieve separation of the remaining portion of the dispersed phase. Likewise, the acoustic wave can be adjusted to one or more specific resonance frequencies conducive to enhancing the coalescence of the dispersed phase micro-droplets into larger droplets (e.g., through nodal co-localization, etc.).

FIG. 7 illustrates schematically another embodiment of an extraction component 10e incorporating features of the present disclosure. Extraction component 10e includes a container 12a that bounds a sample purification compartment 136a. Similar to extraction component 10a, extraction component 10e includes a plurality of alternating mixing and settling zones (along a (substantially serpentine) sample flow path disposed in container 12a) and dual mixing systems 18 (each having a mixer assembly 78 extending at least partially through sample purification compartment 136a). Mixer assemblies 78 include mixing elements 84 disposed in each mixing zone of container 12a or sample purification compartment 136a thereof. However, unlike extraction component 10a, container 12a of extraction component 10e does not include separate sub-containers or columns (e.g., connected by conduits extending therebetween). Rather, the dual mixer assemblies 78, mixing zones, and settling zones are disposed in a single container and are separated by a plurality of shielding elements 61. It will be appreciated, however, that extraction component 10e can alternatively comprise the separate sub-containers or columns (e.g., connected by conduits extending therebetween) described previously.

As described above, shielding elements 61l comprise and/or provide a baffle between vertically separated mixing and settling zones and shielding elements 61m, 61n comprise and/or provide a baffle between horizontally separated mixing and settling zones. In addition, weirs 179c and 179d can comprise and/or provide a barrier to enhance coalescence of the phase pooling therebehind. Operation of the extraction component occurs as described previously. However, the light phase-containing liquid sample harvested from outlet port 51b and/or the heavy phase-containing liquid sample harvested from outlet port 51d can (each) pass through an acoustic loop 96, including an acoustic separator 16d. In at least one embodiment, the pure portion of the acoustically settled sample can then be harvested (e.g., for further processing, analysis, use, etc.). Alternatively, as illustrated in FIG. 7, the acoustically settled sample can also be re-introduced (e.g., into settling zone 33m and/or via inlet port 51o, where an acoustically coalesced portion of the sample (e.g., effectual and/or concentration-dispersed phase micro-droplets that were acoustically coalesced into larger droplets) can further coalesce with the phase body (or larger droplets) disposed therein.

In an exemplary operation, a first liquid L1 comprising a first, heavy phase (represented by forward-slash hatching), an amount of a molecule of interest (e.g., IgG), and one or more impurities (e.g., (molecular and/or particulate) contaminates) is introduced in container 12a via inlet port 51a. A second liquid L2 comprising a second, light phase (represented by back-slash hatching) is introduced in container 12a via inlet port 51c. Alternatively, the light phase can comprise the molecule of interest and contaminant(s). Illustratively, container 12a is filled such that the heavy phase is provide at a concentration sufficient to form a continuous phase; the light phase forming the dispersed phase. Alternatively, the light phase can be continuous and the heavy phase dispersed. Mixing systems 18 are operated to mix the first and second liquids to form an emulsion of the two phases in each mixing zone and/or effectuate transfer of the molecule or interest from the first phase into the second phase. Shielding elements 61*l*, 61*m*, 61*n* separate mixing zones 31*i*, 31*j*, 31*k*, 31*l*, 31*m* from settling zones 33*m*, 33*n*, 33*o*, 33*p*, 33*q*. Accordingly, the mixed phases can coalesce and/or settle in the settling zones to induce counter-current flow, as described herein. Mixing systems 18 can be operated for a time sufficient to reach a steady state (or homeostasis) within container 12*a* and/or sample purification compartment 136*a* thereof.

The (steady state) system can (then) be configured (or reconfigured) to operate at a continuous flow. Specifically, a partially purified third liquid L3 and a partially purified fourth liquid L4 are removed from settling zones 33*m* and 33*q*, respectively, via outlet ports 51*d* and 51*b*, respectively. Partially purified third liquid L3 comprises the heavy phase (in continuous phase concentrations), an amount of the one or more impurities or contaminants, and a first amount of dispersed light phase micro-droplets (not shown). Partially purified fourth liquid L4 comprises the light phase (in continuous phase concentrations), at least a portion of the amount of the molecule of interest, and a first amount of dispersed heavy phase micro-droplets (not shown).

Initially, partially purified third liquid L3 and partially purified fourth liquid L4 are each passed through acoustic loop 96, 97 re-introduced (e.g., in their entirety) into settling zones 33*m* and 33*q*, respectively, via inlet ports 51*e* and 51*f*, respectively. However, at least a portion of the amount of the dispersed phase micro-droplets in partially purified third liquid L3 and partially purified fourth liquid L4 are at least partially, acoustically coalesced into larger, dispersed phase droplets by means of acoustic separator 16*d*. Accordingly, upon reintroduction into settling zones 33*m* and 33*q*, respectively, the (now) larger, dispersed phase droplets are more likely to coalesce with the same phase body (or larger droplets) disposed therein. After a suitable period of time, a substantially purified fifth liquid L5 and a substantially purified sixth liquid L6 can be removed from extraction component 10*e*. For instance, a valve 52 can be at least partially opened to allow the substantially purified liquid(s) to divert out of the acoustic loop. A (substantial) portion of the liquid (i.e., partially purified liquid) can continue to be reintroduced into settling zones 33*m* and 33*q*, respectively, to ensure that a high level of purification (e.g., high yield, high purity, low aggregation, etc.) is maintained in the system.

A pump 95 can be connected to outlet port 51*b*, 51*d* to facilitate sample flow through acoustic loop 96, 97. In an alternative embodiment, acoustic loop 96, 97 can be fluid coupled via separate outlet port 51 (e.g., such that outlet ports 51*b* and 51*d* can be dedicated harvest ports and/or such that a valve 52 is not necessarily required).

Liquid L6 can comprise (or constitute) an extracted fluid sample (e.g., comprising the biological molecule of interest), while the contaminant(s) are disposed in liquid L5. Accordingly, the biological molecule of interest can be extracted into the light phase, while the contaminant(s) remain in the heavy phase. In one or more alternative configurations, the biological molecule of interest can remain in heavy phase, while the contaminant(s) are extracted into the light phase. Thus, liquid L5 can comprise (or constitute) an extracted fluid sample (e.g., comprising the biological molecule of interest), while the contaminant(s) are disposed in liquid L6. Moreover, in embodiments where the clarified (particle removed) sample is introduced in liquid L2, the biological molecule of interest can be extracted from the light phase into the heavy phase, while the contaminant(s) remain in the light phase, or vice versa.

In at least one alternative embodiment, the extraction component can comprise a series of tandem, independent, discrete, and/or side-by-side, etc. mixing devices and settling containers (e.g., fluidly connected with conduit, tubing, etc.), as known in the art. For instance, an illustrative workstation can comprise a first mixing device having one or more inlet openings for introducing a first and a second liquid, one or more mixing elements disposed in the mixing device, and one or more outlet openings for passing a mixture of the first and second liquids (or first and second phases thereof) out of the mixing device, through a passageway, and/or into a first settling container. In some embodiments of the present disclosure, however, the passageway and/or first settling container can have one or more acoustic settlers connected thereto and/or disposed thereabout, such that the mixture can be acoustically settled. At least a portion of the settled sample can be passed into a second mixing device, where the pacification process can continue. In other embodiments, the one or more acoustic settlers can be disposed on the back end of the extraction component or system to actively, acoustically settle dispersed phase micro-droplets from the continuous phase sample prior to removal from the system (e.g., by harvesting, recycling, or disposing of the continuous phase sample).

Further details of the above extraction component, as well as methods related to the same, are disclosed in International Application No. PCT/US2015/057095, filed Oct. 23, 2015, which is incorporated herein by specific reference.

G. Sample Processing Assemblies

Returning now to FIG. 1, in certain embodiments, a fluid connection (or first fluid outlet) 250 can fluidly couple extraction component 10 with one or more sample processing assemblies 254 (e.g., such that a liquid product can pass from extraction component 10 to sample processing assembly 254). Another fluid connection (or second fluid outlet) 252 can carry a waste and/or non-product stream out of extraction component 10 (e.g., and, optionally, into waste). Sample processing assembly 254 and/or components thereof can also be configured for continuous flow mode or sample processing (e.g., by means or fluid coupling and/or system parameters).

In certain embodiments, sample processing assembly 254 can comprise a (sterile and/or (single pass) tangential flow) filtration component 256. Filtration component 256 can be adapter to remove bacteria and/or other contaminants from the (clarified, extracted) fluid sample, such as by means of a 0.2 micron or 0.1 micron filter member. In certain embodiments, however, a filtration component may not be necessary after or following extraction component 10. In particular, system 200, or a relevant portion thereof, may comprise or constitute a sterile and/or closed system. Accordingly, the extracted sample flowing from extraction component 10 through fluid connection 250 can be sterile in some embodiments. In some embodiments, filtration component 256 can be configured for flow through processing and/or operation.

Sample processing assembly 254 can comprise a buffer exchange (or dialysis) component 260. Optional filtration component 256 can be fluid coupled with buffer exchange (or dialysis) component 260 by means of a fluid connection 258. Alternatively, extraction component 10 can be coupled with buffer exchange (or dialysis) component 260 through fluid connection 250. Buffer exchange component 260 can comprise a tangential flow filtration component or member and/or diafiltration element in some embodiments. Alternatively, buffer exchange component 260 can comprise a desalting or other chromatography element. In some embodiments, buffer exchange component 260 can be configured for flow through processing and/or operation.

Sample processing assembly 254 can comprise a first polishing purification component 264. Buffer exchange element 260 can be fluid coupled with first polishing purification component 264 by means of a fluid connection 262. First polishing purification component 264 can comprise a (multi-modal) ion exchange chromatographic purification device or assembly. The (multi-modal) ion exchange chromatographic purification device or assembly can be or comprise a (multi-modal) anion or cation exchange chromatography element.

Sample processing assembly 254 can comprise an optional second polishing purification component 265. First polishing purification component 264 can be fluid coupled with second polishing purification component 265 by means of a fluid connection 266. Second polishing purification component 265 can comprise a (multi-modal) ion exchange chromatographic purification device or assembly. The (multi-modal) ion exchange chromatographic purification device or assembly can be or comprise a (multi-modal) anion or cation exchange chromatography element. In some embodiments, the second (multi-modal) cation exchange or (multi-modal) anion exchange chromatography element can be opposite or other than the first (multi-modal) cation exchange or (multi-modal) anion exchange chromatography element.

In some embodiments, first polishing purification component 264 and/or second polishing purification component 265 can be configured for flow through processing and/or operation. For instance, first polishing purification component 264 and/or second polishing purification component 265 can comprise an (ion exchange) material (e.g., resin) disposed therein and/or adapted to allow the biological molecule of interest to flow therethrough or therepast (e.g., without substantially binding or retaining the same). Accordingly, sample processing assembly 254 can comprise one or more flow through polishing components.

Sample processing assembly 254 can comprise a bacterial filtration component 268. Bacterial filtration component 268 can be fluid coupled with first polishing purification component 264 and/or second polishing purification component 265 by means of a fluid connection 267. Bacterial filtration component 268 can comprise a 0.2 micron or 0.1 micron filter member. Additional viral filtration components, including filter member sizes are known in the art and contemplated herein. In some embodiments, bacterial filtration component 268 can be configured for flow through processing and/or operation.

Sample processing assembly 254 can comprise a viral filtration component 272. Viral filtration component 272 can be fluid coupled with bacterial filtration component 268 by means of a fluid connection 270. Viral filtration component 272 can comprise a 50-70 nm filter member. Additional viral filtration components, including filter member sizes are known in the art and contemplated herein. In some embodiments, viral filtration component 272 can be configured for flow through processing and/or operation.

Sample processing assembly 254 can comprise one or more ultrafiltration and/or diafiltration components 276. Ultrafiltration and/or diafiltration component(s) (UF/DF) 276 can be fluid coupled with viral filtration component 272 by means of a fluid connection 274. An ultrafiltration component 276 can comprise a sample concentrating element. A diafiltration component 276 can comprise a buffer exchange element (e.g., tangential flow filtration member).

In some embodiments, ultrafiltration and/or diafiltration components 276 can be configured for flow through processing and/or operation.

One will appreciate, however, that sample processing assembly 254 need not include each of the aforementioned components. Moreover, sample processing assembly 254 need not be arranged in the order depicted in FIG. 1. Rather, sample processing assembly 254 can be arranged and/or disposed in any suitable order in certain embodiments.

II. METHODS

The illustrative methods described herein, as well as the steps and/or other features (e.g., one or more structural components) thereof, are exemplary of certain embodiments of the present disclosure. Some embodiments need not include each method step and/or feature (e.g., one or more structural component) described herein. Moreover, some embodiments may include certain steps performed in an order different than the order described herein. It is noted that each method and/or step is presented separately and is contemplated herein independent of the context (e.g., order, connection, etc.) in which it is presented.

In addition to illustrating various features, placement orders, orientations, flow paths, etc. of an exemplary system 200, FIG. 1 is useful in illustrating one or more exemplary methods of the present disclosure. Some embodiments can include growing a (suspension) cell culture (e.g., in a biological component production (or bioreactor) assembly). The cell culture can comprise liquid culture media and cells that produce a biological molecule in the cell culture. Accordingly, certain embodiments can include producing a biological molecule in (suspension) cell culture. In some embodiments, the cells can release the biological molecule into the media.

The culture can also comprise a perfusion cell culture (e.g., in which fresh culture media is (continuously) added (e.g., to the bioreactor) as a portion of the cell culture (e.g., the liquid medium and certain components disposed therein) is (continuously) removed (e.g., (pumped) from the bioreactor). The portion of the cell culture can comprise the biological molecule, particulate contaminant(s), and/or other component(s) (e.g., additional particulate and/or molecular contaminants) in the liquid media. In some embodiments, at least some of the cells can be retained and/or returned to the cell culture (e.g., by means of a cell retention device).

In some embodiments, a perfusion cell culture (or the cells thereof) can produce the biological molecule at a rate of at least, greater than, equal to, and/or between about 100 g, 250 g, 500 g, 750 g, 1 kg, 2 kg, 2.5 kg, 3 kg, 4 kg, 5 kg, 6 kg, or more in less than, equal to, and/or between about (every) 1, 2, 6, 12, 18, 24, 36, or 48 hours of continuous perfusions cell culture time.

Some embodiments can include (continuously) combining and/or mixing a (liquid) biological sample with a first fluid (e.g., liquid) phase and a second (e.g., liquid) fluid phase to form a first mixture (e.g., in (a sample mixing compartment of) a particulate removal assembly). Accordingly, certain embodiments can include (continuously) transferring or flowing the biological sample, first phase, and/or second fluid phase into a a particulate removal assembly. The biological sample can comprise the biological molecule, particulate contaminant(s), and/or other component(s) (e.g., additional particulate and/or molecular contaminants). For instance, in at least one embodiment, the biological sample can comprise the portion of the cell culture that is removed. The mixing can effectuate transfer of the biological molecule into a first of the phases and the particulate contaminant(s) into a second of the phases.

Some embodiments can include allowing the first mixture to (continuously) settle (e.g., in (a sample settling compartment of) the particulate removal assembly) into a first phase body (e.g., comprising the first phase) and a second phase body (e.g., comprising the second phase). Some embodiments can include (continuously) separating the first phase body from the second phase body and/or (continuously) concentrating (e.g., in a (tangential flow filtration) sample concentrating element) a portion of the amount of the biological molecule in the first phase body. For instance, the biological molecule in the (first) phase body can be concentrated at least and/or about 1.5-fold, 2-fold, 2.5-fold, 3-fold, 4-fold, 5-fold, 6-fold, 8-fold, 10-fold, between about 2-fold and about 6-fold, between about 2-fold and about 10-fold, or any value or range of values therebetween. Accordingly, a clarified sample stream can (continuously) flow from the particulate removal assembly into and/or through the (tangential flow filtration) sample concentrating element.

Some embodiments can include extracting (e.g., in a multi-stage, liquid-liquid extraction component) at least part of the portion of the amount of the biological molecule from the first phase body. Accordingly, the (optionally concentrated) biological molecule containing phase body can (continuously) flow and/or be (continuously) introduced into (an upper or lower end of) a multi-stage, liquid-liquid extraction (purification) column.

In some embodiments, one or more (additional) components can be (continuously) added to the (optionally concentrated) biological molecule containing phase. The component(s) can include water, a primary, polyatomic, and/or organic salt (e.g., phosphate, sulfate, carbonate, citrate, etc.), a secondary, monoatomic, and/or inorganic salt (e.g., chloride (ion), (Na)Cl, (K)Cl, etc.), or other component. The addition of such component(s) can adapt the (optionally concentrated) biological molecule containing phase for (two-phase, liquid-liquid) extraction.

A third phase can be (continuously) introduced into the other end of the column. The column can be operated (e.g., with the sample, biological molecule, and/or molecular contaminant(s) passing through multiple (alternating) mixing and settle zones) until a suitable percentage of the biological molecule or molecular contaminant(s) is transferred from the first phase body into the third phase.

The biological molecule-containing third phase portion can be (continuously) removed for the extraction column (e.g., for (even) further processing). In at least one embodiment, for instance, the molecule-containing third phase portion can then undergo optional sterile filtration, buffer exchange, (flow through) polishing purification (e.g., (multimodal) ion (e.g., cationic or anionic) exchange chromatography, bacterial filtration, and/or viral filtration element. In some embodiments, the fluid (e.g., liquid) sample can then undergo quality control measures (e.g., testing for purity, contamination, etc.), ultrafiltration (concentration), and/or diafiltration (buffer exchange). For instance, the sample can be placed in a poly-sorbate or other buffer or storage solution. A final fill step can then dispose the sample in vials or other patient administration container (e.g., syringes, etc.).

It is noted that in some embodiments, one or more (e.g., each) of the steps described herein can be performed in continuous flow operation or mode. For instance, rather than bind-and-elute chromatography, embodiments of the present disclosure can include (only) inherently continuous purification steps (e.g., ATP clarification and/or extraction, (alternating) tangential flow filtration, etc.) and/or flow through chromatography steps (e.g., ion exchange adapted for flow through processing). In such flow through steps, the product (e.g., biological molecule) of interest flows through the column, while the impurities are bound and/or retained. Accordingly, the purification process can be continuous over an extended period of time (e.g., rather than being interrupted by product binding to the column and resuming when product is eluted from the column).

In some embodiments, a continuous system can produce and/or yield the biological molecule at a rate of at least, greater than, equal to, and/or between about 100 g, 250 g, 500 g, 750 g, 1 kg, 2 kg, 2.5 kg, 3 kg, 4 kg, 5 kg, 6 kg, 8 kg, 10 kg, 12 kg, 15 kg, 20 kg, or more in less than, equal to, and/or between about (every) 1, 2, 6, 12, 18, 24, 36, or 48 hours of continuous operation.

Moreover, some embodiments can be run at fluid flow rates of up to, at least, greater than, equal to, between, and/or about 1 L/min, 2 L/min, 2.5 L/min, 3 L/min, 3.5 L/min, 5 L/min, 6 L/min, 7 L/min, 8 L/min, 9 L/min, 10 L/min, 12 L/min, 15 L/min, 20 L/min, 25 L/min, 30 L/min, 40 L/min, 50 L/min, 60 L/min, 70 L/min, 80 L/min, 90 L/min, 100 L/min, 125 L/min, 150 L/min, or more.

III. ADVANTAGES

Embodiments of the present disclosure can be advantageous over existing systems and/or methods by (i) increasing the speed and/or efficiency of extraction or purification, (ii) decreasing the size and/or cost of the system, including components thereof and reagents used therein, (iii) providing a system and/or method for extracting a molecule of interest for which extraction was previously unavailable (e.g., because of limitations in chemical engineering), (iv) providing a continuous flow system for purifying and/or processing a molecule of interest, and/or (v) providing other benefit(s).

For instance, implementation of some embodiments of the present disclosure can allow a system operator to maintain customary, typical, or existing system or component size, residence or operating time, and/or flow rate(s), while increasing the yield, purity, efficiency, and/or other benchmark(s) of sample purification or extraction. Similarly, implementation of certain embodiments of the present disclosure can allow a system operator to decrease the system or component size, decrease the residence or operating time, and/or increase the flow rate, while maintaining (or even increasing) the yield, purity, efficiency, and/or other benchmark(s) of sample purification or extraction. The provision and/or achievement of such efficiency-enhancing, time-, space-, money-, and/or resource-saving results, outcomes, and/or parameters, etc., without the corresponding drawback(s) or limitations has previously been unobtainable.

In certain embodiments, a single stage, (mixer-settler) extraction component can be fluid coupled with a perfusion bioreactor such that a continuous flow of biological sample from a cell culture can be introduced into the mixing compartment thereof and mixed with a two-phase fluid buffer system. Alternatively, the cell culture can be grown in batch form and the biological sample from the cell culture can be introduced into the extraction component or mixing compartment thereof (as a batch sample).

The two fluid (e.g., liquid) phases of the buffer system can also be introduced (continuously) into the mixing component (separately or together, with or separate from the biological sample). The mixer-settler component can thereby function as a continuous particle removal assembly in which a molecule of interest from the biological sample is transferred or becomes disposed in a first fluid phase and particulate matter from the biological sample is transferred or becomes disposed in a second fluid phase. This particle removal mechanism can replace more expensive, traditional centrifugation and/or filtration components, reducing the cost associated with more expensive components. Accordingly, in some embodiments, a (continuous flow) centrifuge and/or filtering component (or step) is not disposed (or performed) between the bioreactor and particle removal assembly.

In addition to the fluid coupling between the bioreactor and the particle removal assembly, the fluid buffer system can be formulated for particle extraction. For instance, the concentrations of buffer components in the first and second phases can effectuate the extraction of the particulate material and the biological molecule into different, immiscible phases, which can be settled into separate phase bodies for relatively simple continuous flow separation. One of the phases can be or comprise an organic phase having (water and) an organic molecule, such as a hydrophilic polymer or polymeric glycol (e.g., without a significant amount of salt, such as PO4, SO4, CO3, or citrate, and/or with little or no NaCl, KCl, etc.). The other phase can comprise an aqueous and/or salt phase having (water and) a suitable concentration of PO4, SO4, CO3, or citrate (e.g., with little or no NaCl, KCl, etc.). The phases or mixture thereof can also be substantially devoid of dextran in some embodiments. The formulation can effectuate substantial molecular transfer of the biological molecule into a first of the phases, and particle transfer of the particulate contaminant into the other phase. Thus, the particles can be extracted from the liquid sample prior to further processing.

With an efficient, inexpensive, and continuously-operating particle removal step, the cell culture can be grown for a longer period of time and/or to a higher cell density, thereby producing more biological molecules of interest. Similarly, perfusion cell cultures can be operated at higher perfusion cell density for long periods of time. Any cell lysis particles formed thereby can be removed by the two-phase buffer system in the particle extraction assembly prior to further processing.

Moreover, with a continuous flow particulate contaminant removal process, the sample can be (continuously) introduced (from the particulate removal component or assembly) into (multi-stage, liquid-liquid) extraction component (or column, assembly, etc.). This provides the ability to contain and/or maintain the sample under sterile conditions from the time the sample is introduced into the particulate removal assembly until the further processing steps are completed.

The further processing described above can include concentrating the sample (e.g., 2-fold, or less, to 10-fold, or more) prior to introducing the sample into a multi-stage liquid-liquid purification column. The pre-concentration particle extraction can ensure that particulate contaminants are not unintentionally and/or simultaneously concentrated with the biological molecule of interest. Such components and/or combinations thereof can be configured and/or adapted for continuous flow operation. The pre-purification particle extraction can ensure that particulate contaminants do not foul or clog the multi-stage liquid-liquid purification column. Thus, the continuous flow system can run longer without needing to stop the system for maintenance (e.g., cleaning of filters, columns, components, etc.). Longer (un-interrupted) running times can reduce the overall cost of sample production, which can reduce the price of the biological molecule product.

Moreover, after the sample has been clarified (by removal of particulate contaminants) and/or extracted (by multi-stage liquid-liquid extraction), the sample can be substantially devoid of many of the particulate and/or molecular contaminants that tend to foul or clog other chromatography columns by binding thereto. Thus, whereas existing systems are implemented using bind and elute chromatography (adapted to retain (only) the product of interest) in order to avoid fouling or clogging the column with contaminants, embodiments of the present disclosure, which have extremely low concentrations of particulate and/or molecular contaminants can be implemented using flow through chromatography. Because the highly concentrated product of interest does not substantially bind the column or resin, and because particulate and/or molecular contaminant concentrations are extremely low, the flow through chromatography columns can be operated for extended periods of time without substantial increases in pressure, without being stopped for cleaning or stripping, and/or without damaging, fouling, and/or clogging the column.

Some embodiments can be adapted for continuous, flow through, back-to-back, multi-modal ion exchange chromatography, in which the sample is continuously processed (in flow through mode) through a cation exchange column, followed by an anion exchange column, or vice versa.

Such processing can also purify the sample such that the sample can be continuously introduced into a viral filtration column. The flow inlet can include a (0.2 micron or 0.1 micron) bacterial filtration member to prevent and/or inhibit bacterial and/or fungal contamination and the substantial purity of the sample can prevent and/or inhibit fouling of the viral filtration column (which can be the most expensive component in the system).

The initial removal of major particulate and/or molecular contaminants through ATP clarification and extraction can also allow later chromatography steps to be performed at high flow rates (as described above) that are not attainable by existing systems for extended periods of time and/or in continuous purification processing. The chromatography columns can also be much smaller than typically used in existing systems because the product is not bound and eluted from the column and the binding contaminant concentration is extremely low. Thus, the present disclosure describes embodiments that can be scaled up to industrial purification levels and run for extended periods of time, which can significantly reduce the cost associated with producing therapeutic-grade biological molecules, in turn reducing costs to consumers.

IV. CONCLUSION

While the foregoing detailed description makes reference to specific exemplary embodiments, the present disclosure may be embodied in other specific forms without departing from its spirit or essential characteristics. Accordingly, the described embodiments are to be considered in all respects only as illustrative and not restrictive. For instance, various substitutions, alterations, and/or modifications of the inventive features described and/or illustrated herein, and additional applications of the principles described and/or illustrated herein, which would occur to one skilled in the relevant art and having possession of this disclosure, can be made to the described and/or illustrated embodiments without departing from the spirit and scope of the invention as defined by the appended claims. Such substitutions, alterations, and/or modifications are to be considered within the scope of this disclosure.

The scope of the invention is, therefore, indicated by the appended claims rather than by the foregoing description. The limitations recited in the claims are to be interpreted broadly based on the language employed in the claims and not limited to specific examples described in the foregoing detailed description, which examples are to be construed as non-exclusive and non-exhaustive. All changes which come within the meaning and range of equivalency of the claims are to be embraced within their scope.

It will also be appreciated that various features of certain embodiments can be compatible with, combined with, included in, and/or incorporated into other embodiments of the present disclosure. For instance, systems, methods, and/or products according to certain embodiments of the present disclosure may include, incorporate, or otherwise comprise features described in other embodiments disclosed and/or described herein. Thus, disclosure of certain features relative to a specific embodiment of the present disclosure should not be construed as limiting application or inclusion of said features to the specific embodiment.

In addition, unless a feature is described as being requiring in a particular embodiment, features described in the various embodiments can be optional and may not be included in other embodiments of the present disclosure. Moreover, unless a feature is described as requiring another feature in combination therewith, any feature herein may be combined with any other feature of a same or different embodiment disclosed herein. Furthermore, various well-known aspects of illustrative systems, methods, products, and the like are not described herein in particular detail in order to avoid obscuring aspects of the example embodiments. Such aspects are, however, also contemplated herein. Likewise, any steps recited in any method or process described herein and/or recited in the claims can be executed in any suitable order and are not necessarily limited to the order described and/or recited, unless otherwise stated (explicitly or implicitly). Such steps can, however, also be required to be performed in any suitable order in certain embodiments of the present disclosure.

What is claimed is:

1. A method of purifying a biological molecule in a continuous flow sample purification system, the method comprising:
   (i) providing a biological sample comprising a population of a biological molecule of interest and a population of particulate contaminants;
   (ii) mixing the biological sample with a first fluid phase and a second fluid phase to form an emulsion of the first fluid phase and the second fluid phase with the population of the biological molecule and the population of particulate contaminants dispersed in the emulsion as a colloidal suspension, the first fluid phase having a first density and the second fluid phase having a second density, the second density being different than the first density, the first fluid phase being immiscible with the second fluid phase wherein one of the first fluid phase or the second fluid phase comprises an organic molecule, hydrophilic polymer or polymeric glycol, and the other of the first fluid phase or the second fluid phase comprises a salt, the emulsion comprising, if any, less than about 5% by weight or by volume dextran;
   (iii) allowing the emulsion to settle into a first phase body comprising the first fluid phase and a second phase body comprising the second fluid phase, the first phase body being separable from the second phase body, wherein (i) greater than about 75% of the population of the biological molecule from the emulsion is disposed in a first one of the first phase body or the second phase body, and greater than about 75% of the population of particulate contaminants from the emulsion are disposed in a second one of the first phase body and the second phase body, and (ii) the first phase body has less than about 10% second fluid phase by volume disposed therein, and the second phase body has less than about 10% first fluid phase by volume disposed therein;
   (iv) separating the first phase body from the second phase body;
   (v) concentrating the population of the biological molecule disposed in the first phase body;
   (vi) extracting at least a portion of the population of the biological molecule from the first phase body, wherein extracting comprises:
      (a) providing a third fluid phase having a third density, the third density being different than the first density, the first fluid phase and the third fluid phase being immiscible;
      (b) mixing the first phase body with the third fluid phase to form a mixture, the mixture comprising the first fluid phase, the third fluid phase, and the portion of the population of the biological molecule;
      (c) allowing the mixture to settle into a first phase portion and a third phase portion, the third phase portion comprising the third fluid phase and the portion of the population of the biological molecule;
      (d) optionally applying an acoustic wave to a portion of the mixture, thereby enhancing formation of the first phase portion and the third phase portion; and
      (e) separating the third phase portion from the first phase portion;
   (vii) optionally performing sterile filtration of the third phase portion;
   (viii) performing a liquid buffer exchange on the third phase portion to produce a chromatography sample, the chromatography sample comprising the portion of the population of the biological molecule disposed in a chromatography buffer;
   (ix) performing a first ion exchange chromatographic purification step on the chromatography sample, the first ion exchange chromatographic purification step comprising multi-modal cation exchange or multi-modal anion exchange;
   (x) optionally performing a second ion exchange chromatographic purification step on the chromatography sample, the second ion exchange chromatographic purification step comprising multi-modal cation exchange or multi-modal anion exchange;
   (xi) performing bacterial filtration on the chromatography sample; and
   (xii) performing viral filtration on the chromatography sample.

2. The method of claim 1, wherein:
   (i) the biological molecule:
      (a) has a molecular weight of less than about 1000 kDa; and/or
      (b) is less than about 200 nm in size; and
   (ii) the particulate contaminants:
      (a) have a molecular weight greater than about 1000 kDa; and/or
      (b) are greater than about 200 nm in size.

3. The method of claim 1, wherein the emulsion:
(i) has a pH less than about 4.5; and/or
(ii) comprises, if any, less than or equal to 10% by weight sodium chloride or potassium chloride.

4. The method of claim 1, wherein:
(i) one of the first fluid phase or the second fluid phase comprises PEG having an average molecular weight of or between about 400 and/or 600 kDa at a concentration of about 15-20% by weight and the other of the first fluid phase or the second fluid phase comprises PO4, SO4 or Citrate at a concentration of about 12.5-17.5% by weight;
(ii) one of the first fluid phase or the second fluid phase comprises PEG having an average molecular weight of about 1450 kDa at a concentration of about 6-10% by weight and the other of the first fluid phase or the second fluid phase comprises PO4, SO4 or Citrate at a concentration of about 12-15% by weight;
(iii) one of the first fluid phase or the second fluid phase comprises PEG having an average molecular weight of about 3350 kDa at a concentration of about 5-9% by weight and the other of the first fluid phase or the second fluid phase comprises PO4, SO4 or Citrate at a concentration of about 10-13% by weight; and/or
(iv) one of the first fluid phase or the second fluid phase comprises PEG having an average molecular weight of about 6000 kDa at a concentration of about 4-8% by weight and the other of the first fluid phase or the second fluid phase comprises PO4, SO4 or Citrate at a concentration of about 9-12% by weight.

5. The method of claim 1, wherein the step of mixing the biological sample with the first fluid phase and the second fluid phase to form the emulsion is performed in a mixing compartment of a particulate removal assembly, the mixing compartment having means for mixing the biological sample with the first fluid phase and the second fluid phase, the particulate removal assembly further comprising:
a settling compartment in fluid communication with the mixing compartment such that the emulsion flows from the mixing compartment into the settling compartment, the emulsion being allowed to settle in the settling compartment; and
a shielding element disposed between the mixing compartment and the settling compartment so as to at least partially separate the mixing compartment from the settling compartment.

6. The method of claim 5, wherein the particulate removal assembly is adapted for continuous flow operation wherein:
(i) the biological sample, the first fluid phase, and the second fluid phase are continuously introduced into the mixing compartment and mixed by the means for mixing, thereby continuously forming the emulsion, during a period of time;
(ii) the emulsion continuously flows from the mixing compartment to the settling compartment and is allowed to continuously settle into the first phase body and the second phase body in the settling compartment during the period of time;
(iii) the first phase body continuously fluidly exits the settling compartment through a first phase body outlet formed in a first end of the settling compartment during the period of time; and/or
(iv) the second phase body continuously fluidly exits the settling compartment through a second phase body outlet formed in a second end of the settling compartment during the period of time, the first end being separated from the second end by a vertical distance.

7. The method of claim 1, wherein the step of extracting at least the portion of the population of the biological molecule from the first phase body is performed in a multi-stage liquid-liquid extraction component, the multi-stage liquid-liquid extraction component being in fluidic communication with:
(i) a particulate removal assembly in which the step of mixing the first phase body with the third fluid phase to form the mixture and the step of allowing the mixture to settle into the first phase portion and the third phase portion are each performed; and/or
(ii) a sample concentrating element, optionally comprising a tangential flow filtration member, in which the step of concentrating the population of the biological molecule disposed in the first phase body is performed.

8. The method of claim 7, further comprising:
performing sterile filtration of the third phase portion; and
performing the second ion exchange chromatographic purification step on the chromatography sample, the second ion exchange chromatographic purification step comprising multi-modal cation exchange or multi-modal anion exchange.

9. The method of claim 8, wherein the multi-stage liquid-liquid extraction component is in fluidic communication with a sample processing assembly, the sample processing assembly comprising:
a sterile filtration component, by which the step of performing sterile filtration is performed;
a buffer exchange component, by which the step of performing a liquid buffer exchange on the third phase portion is performed;
a first ion exchange chromatographic purification device or assembly by which the step of performing the first ion exchange chromatographic purification step is performed;
a second ion exchange chromatographic purification device or assembly by which the step of performing the second ion exchange chromatographic purification step is performed;
a bacterial filtration component by which the step of performing bacterial filtration on the chromatography sample is performed; and
a viral filtration component by which the step of performing viral filtration on the chromatography sample is performed.

10. The method of claim 1, wherein:
(i) the biological molecule comprises a monoclonal antibody, enzyme, antibiotic, painkiller, or sedative; and
(ii) the particulate contaminants comprises cells and/or cell fragments.

* * * * *